United States Patent
Babaei

(10) Patent No.: US 11,252,750 B2
(45) Date of Patent: *Feb. 15, 2022

(54) SCHEDULING OF A PRIMARY CELL FROM A SECONDARY CELL

(71) Applicant: PanPsy Technologies, LLC, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/344,227

(22) Filed: Jun. 10, 2021

(65) Prior Publication Data

US 2021/0298053 A1 Sep. 23, 2021

Related U.S. Application Data

(63) Continuation of application No. 17/135,410, filed on Dec. 28, 2020, now Pat. No. 11,064,513.

(Continued)

(51) Int. Cl.
*H04W 72/12* (2009.01)
*H04W 36/00* (2009.01)

(52) U.S. Cl.
CPC ... *H04W 72/1278* (2013.01); *H04W 36/0061* (2013.01)

(58) Field of Classification Search
CPC ............. H04W 72/1278; H04W 36/0061
See application file for complete search history.

(56) References Cited

U.S. PATENT DOCUMENTS 8,917,605 B2 12/2014 Pelletier et al.
9,237,555 B2 1/2016 Kim et al.
(Continued)

FOREIGN PATENT DOCUMENTS

EP 3148262 A1 3/2017
EP 3151622 A1 4/2017
(Continued)

OTHER PUBLICATIONS

3GPP TS 38.211 V15.7.0 (Sep. 2019); Technical Specification; 3rd Generation Partnership Project; Technical Specification Group Radio Access Network; NR; Physical channels and modulation; (Release 15).

(Continued)

*Primary Examiner* — Ajay Cattungal
(74) *Attorney, Agent, or Firm* — Alireza Babaei

(57) ABSTRACT

A wireless device receives configuration parameters of one or more first search spaces of a primary cell and one or more second search spaces of a secondary cell. The secondary cell may be a scheduling cell for the primary cell. The wireless device may receive scheduling information associated with scheduling of the primary cell. In response to the secondary cell being deactivated, receiving the scheduling information may comprise monitoring the one or more first search spaces. In response to the secondary cell being activated, receiving the scheduling information may comprise monitoring the one or more second search spaces. The wireless device may transmit or receive a transport block, via the primary cell, based on the scheduling information.

20 Claims, 42 Drawing Sheets

Related U.S. Application Data

(60) Provisional application No. 62/954,642, filed on Dec. 29, 2019.

(56) References Cited

U.S. PATENT DOCUMENTS

| | | | |
|---|---|---|---|
| 9,420,572 B2* | 8/2016 | Lee | H04L 5/001 |
| 9,426,801 B2 | 8/2016 | Yang et al. | |
| 9,491,793 B2 | 11/2016 | Pelletier et al. | |
| 9,887,828 B2 | 2/2018 | Pelletier et al. | |
| 9,900,142 B2 | 2/2018 | Yi et al. | |
| 10,172,124 B2 | 1/2019 | Dinan | |
| 10,172,125 B2 | 1/2019 | Kusashima et al. | |
| 10,187,136 B2 | 1/2019 | Shimezawa et al. | |
| 10,298,306 B2 | 5/2019 | Shimezawa et al. | |
| 10,314,078 B2 | 6/2019 | Ouchi et al. | |
| 10,341,958 B2 | 7/2019 | Kusashima et al. | |
| 2018/0042016 A1* | 2/2018 | Babaei | H04L 5/0032 |
| 2018/0139665 A1* | 5/2018 | Park | H04W 36/0005 |
| 2019/0207663 A1 | 7/2019 | Shimezawa et al. | |
| 2019/0254110 A1* | 8/2019 | He | H04L 5/0048 |
| 2019/0281585 A1* | 9/2019 | Dinan | H04L 5/0091 |
| 2019/0335368 A1* | 10/2019 | Park | H04L 27/0006 |
| 2020/0313833 A1* | 10/2020 | Yi | H04W 52/0212 |
| 2020/0313838 A1* | 10/2020 | Jin | H04W 72/0453 |
| 2020/0314671 A1* | 10/2020 | He | H04W 72/042 |
| 2020/0314745 A1* | 10/2020 | Yi | H04W 28/04 |

FOREIGN PATENT DOCUMENTS

| | | |
|---|---|---|
| WO | 2011063244 A2 | 5/2011 |
| WO | 2014209049 A1 | 12/2014 |

OTHER PUBLICATIONS

3GPP TS 38.212 V15.7.0 (Sep. 2019); Technical Specification; 3rd Generation Partnership Project; Technical Specification Group Radio Access Network; NR; Multiplexing and channel coding; (Release 15).

3GPP TS 38.213 V15.7.0 (Sep. 2019); Technical Specification; 3rd Generation Partnership Project; Technical Specification Group Radio Access Network; NR; Physical layer procedures for control; (Release 15).

3GPP TS 38.214 V15.7.0 (Sep. 2019); Technical Specification; 3rd Generation Partnership Project; Technical Specification Group Radio Access Network; NR; Physical layer procedures for data; (Release 15).

3GPP TS 38.300 V15.7.0 (Sep. 2019); Technical Specification; 3rd Generation Partnership Project; Technical Specification Group Radio Access Network; NR; NR and NG-RAN Overall Description; Stage 2; (Release 15).

3GPP TS 38.321 V15.7.0 (Sep. 2019); Technical Specification; 3rd Generation Partnership Project; Technical Specification Group Radio Access Network; NR; Medium Access Control (MAC) protocol specification; (Release 15).

3GPP TS 38.331 V15.7.0 (Sep. 2019); Technical Specification; 3rd Generation Partnership Project; Technical Specification Group Radio Access Network; NR; Radio Resource Control (RRC); Protocol specification; (Release 15 ).

3GPP TSG-RAN Meeting #86; RP-192677; Sitges, Spain, Dec. 9-12, 2019; Agenda item: 9.1.1; Source Ericsson (moderator); Title: Summary of Rel-17 email discussion on NR dynamic spectrum sharing; Document for: Discussion and Decision.

3GPP TSG RAN Meeting #86; RP-192797; Sitges, Spain, Dec. 9-12, 2019; Agenda Item: 9.1.1; Source: Huawei, HiSilicon; Title: NR CA enhancements and DSS; Document for: Discussion and Decision.

3GPP TSG RAN Meeting #86; RP-193260; Sitges, Spain, Dec. 9-12, 2019; Source: Ericsson; Title: New WID on NR Dynamic spectrum sharing (DSS); Document for: Approval; Agenda Item: 9.1.1.

* cited by examiner

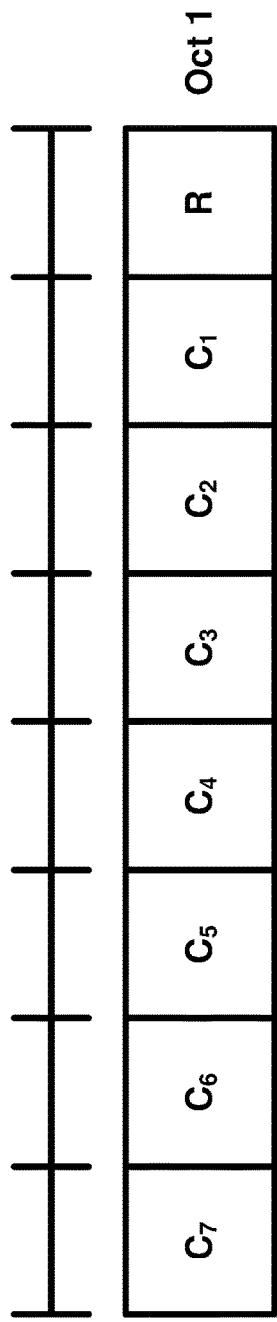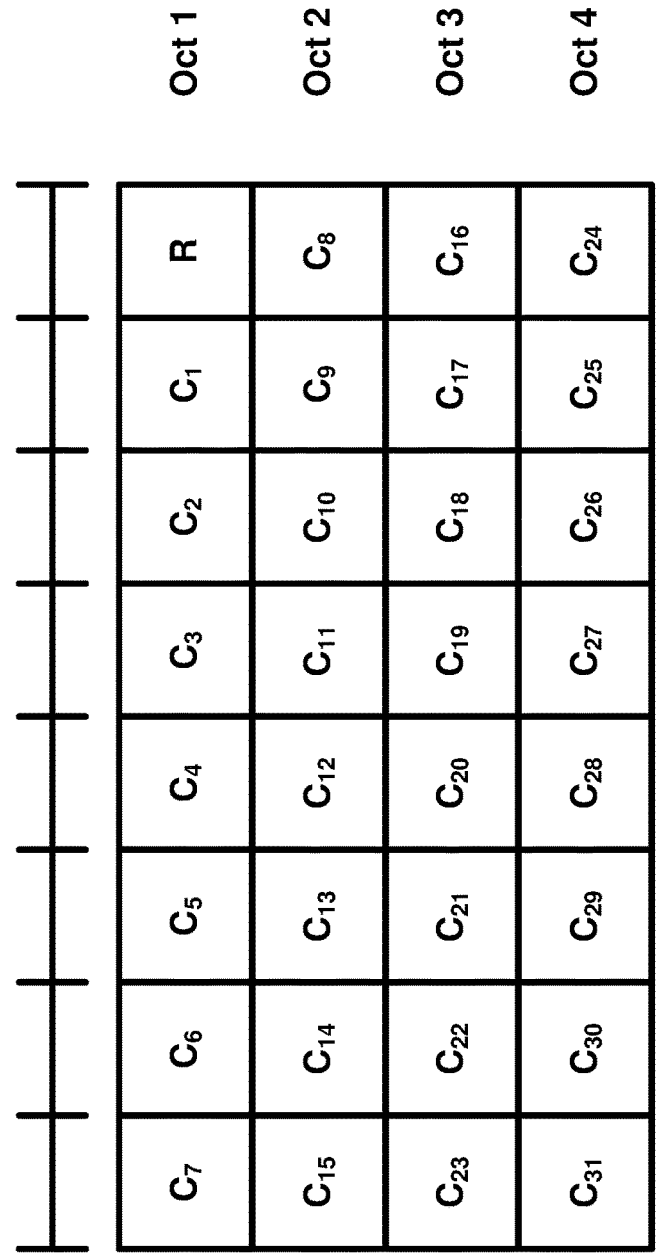
FIG. 16A
FIG. 16B

- Receive configuration parameters of a primary cell, a 1st Scell and a 2nd SCell

- The 1st SCell is not a scheduling cell for the primary cell

- The 2nd SCell is a scheduling cell for the primary cell

- The configuration parameters comprise a deactivation timer parameter for the 1st SCell

- The configuration parameters do not comprise a deactivation timer parameter for the 2nd SCell

3910

- Receive, via the 2nd SCell, a DCI associated with scheduling of the primary cell

- The 2nd SCell is activated

3920

Transmit or receive, based on the DCI, a TB via the primary cell

- Receive configuration parameters of a primary cell and a SCell

- The configuration parameters comprise 1st configuration parameters of search space(s), of the SCell, associated with scheduling cell for the primary cell

- The configuration parameters do not comprise a deactivation timer parameter for the SCell

4010

- Receive, via the SCell, a DCI associated with scheduling of the primary cell

- The SCell is activated

4020

Transmit or receive, based on the DCI, a TB via the primary cell

- Receive configuration parameters of a primary cell, a 1st Scell and a 2nd SCell

- The configuration parameters comprise 1st configuration parameters of search space(s), of the 2nd SCell, associated with scheduling of the primary cell

- The configuration parameters do not comprise parameters of a search space, of the first secondary cell, associated with scheduling of the primary cell

- The configuration parameters comprise a deactivation timer parameter indicating a value of a first deactivation timer of the first secondary cell

- The configuration parameters do not comprise a deactivation timer parameter for the second secondary cell

4110

- Receive, via the 2nd SCell, a DCI associated with scheduling of the primary cell

- The 2nd SCell is activated

4120

Transmit or receive, based on the DCI, a TB via the primary cell

- Receive configuration parameters of a primary cell and a SCell

- The SCell is a scheduling cell for the primary cell

- Based on the SCell being a scheduling cell for the primary cell, the configuration parameters comprise 1st configuration parameters of search space(s), of a 1st type, for the SCell

4210

- Receive a DCI based on monitoring search spaces(s) of the 1st type

4220

FIG. 42

SCHEDULING OF A PRIMARY CELL FROM A SECONDARY CELL

CROSS-REFERENCE TO RELATED APPLICATIONS

This application is a continuation of U.S. application Ser. No. 17/135,410, filed Dec. 28, 2020, which claims the benefit of U.S. Provisional Application No. 62/954,642, filed Dec. 29, 2019, which is hereby incorporated by reference in its entirety.

BRIEF DESCRIPTION OF THE DRAWINGS

FIG. 16A and FIG. 16B show example formats of cell activation/deactivation MAC control element in accordance with several of various embodiments of the present disclosure.

FIG. 39 shows an example flow diagram in accordance with several of various embodiments of the present disclosure.

FIG. 40 shows an example flow diagram in accordance with several of various embodiments of the present disclosure.

FIG. 41 shows an example flow diagram in accordance with several of various embodiments of the present disclosure.

FIG. 42 shows an example flow diagram in accordance with several of various embodiments of the present disclosure.

DETAILED DESCRIPTION

The exemplary embodiments of the disclosed technology enable operation of carrier aggregation in a wireless device and/or one or more base stations. The exemplary disclosed embodiments may be implemented in the technical field of wireless communication systems. More particularly, the embodiment of the disclosed technology may relate to scheduling of a primary cell from a secondary cell.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
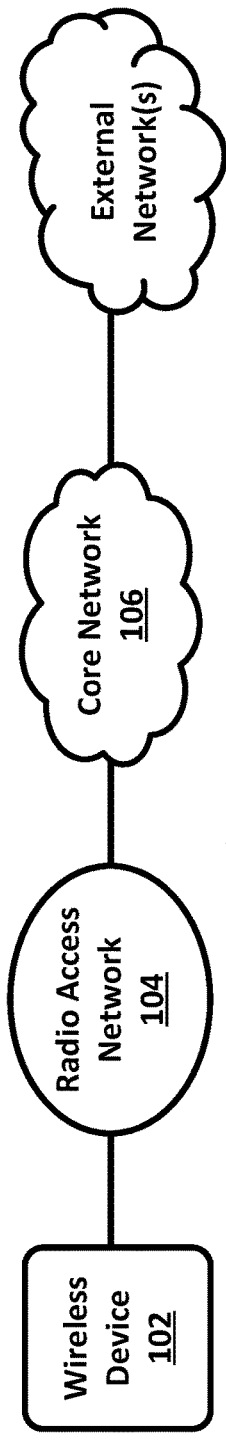
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some example, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
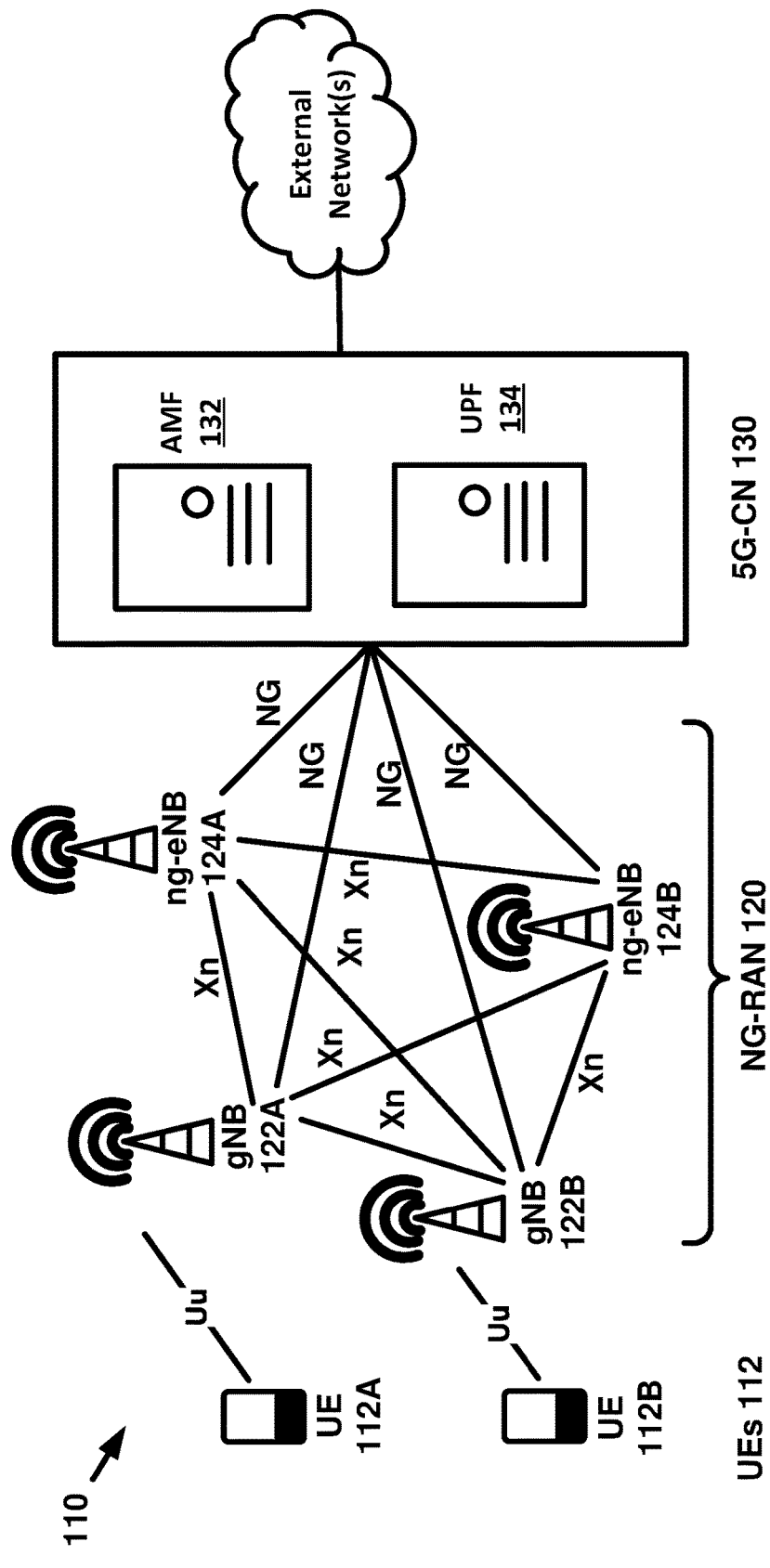

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNBs 122 and/or an ng-eNBs 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
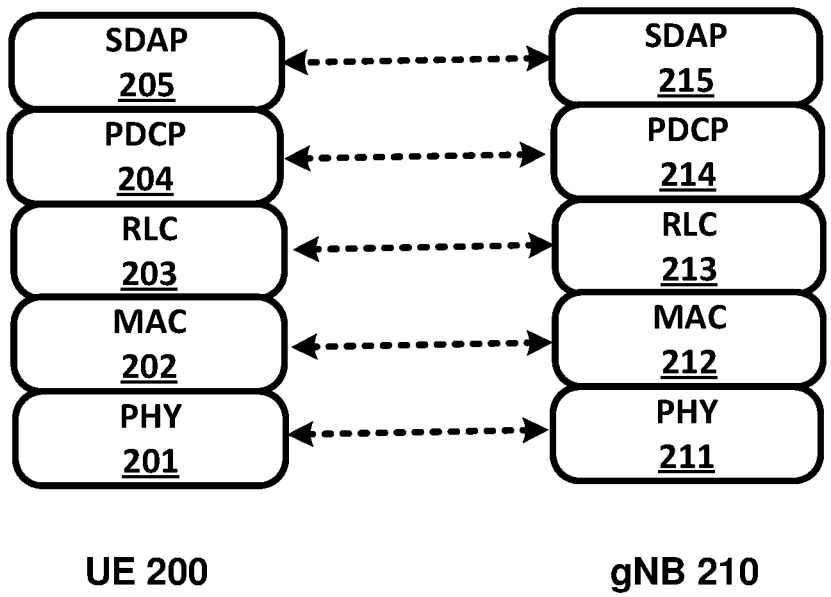
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
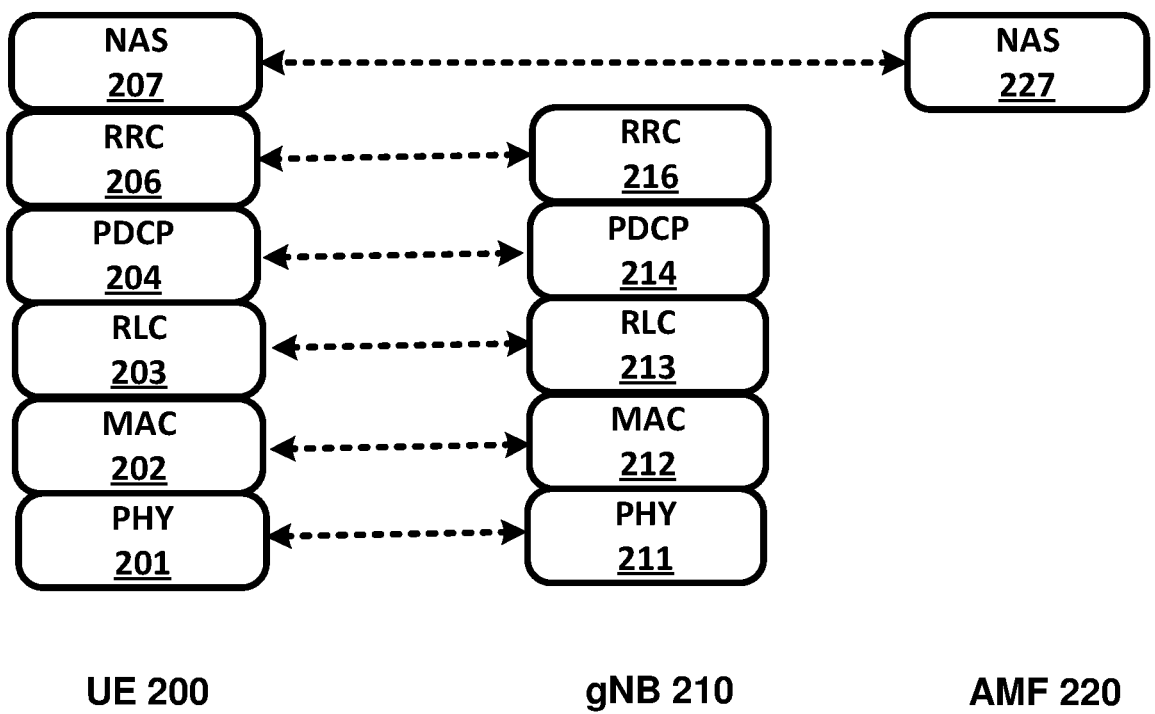

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
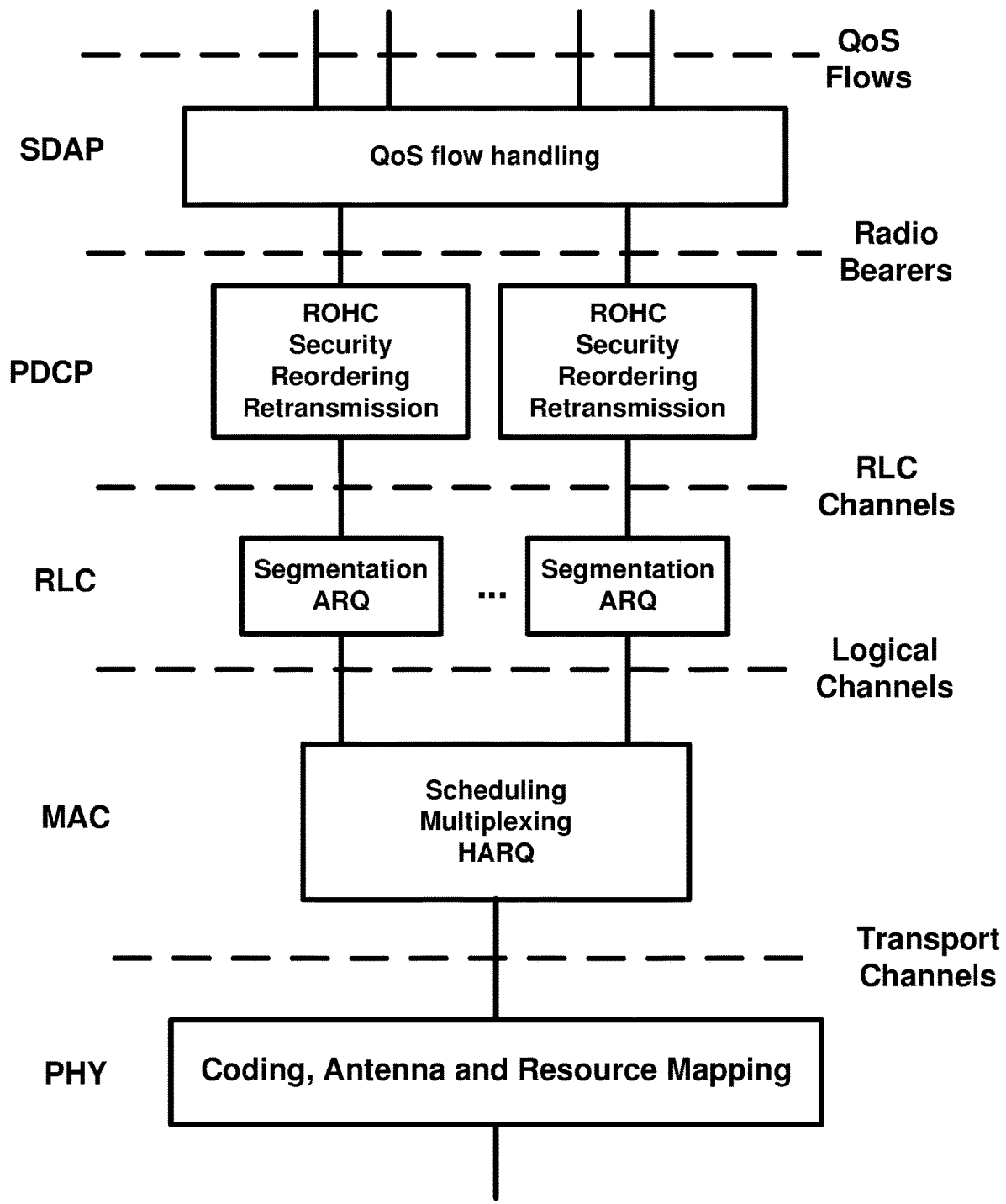
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
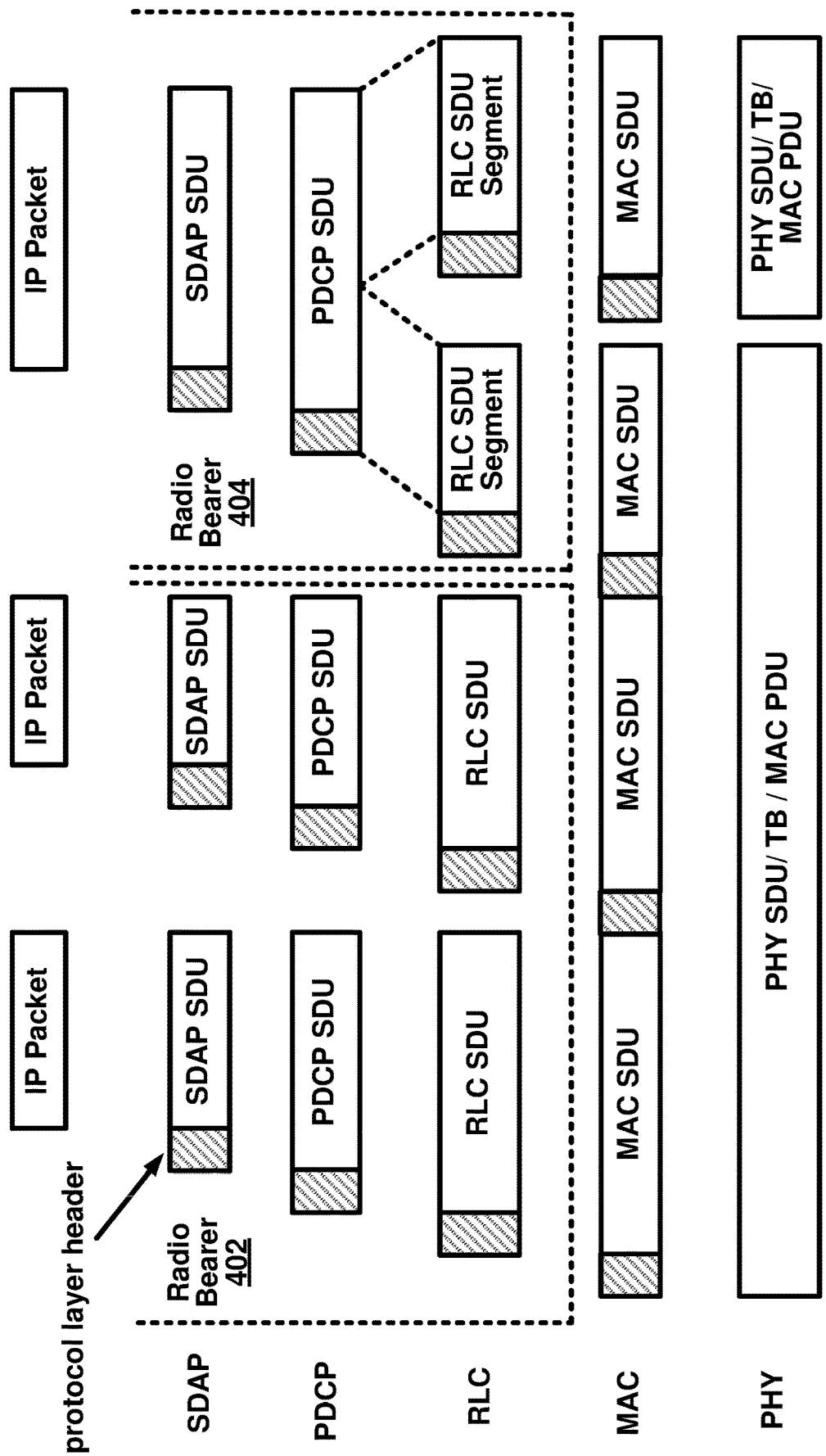
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
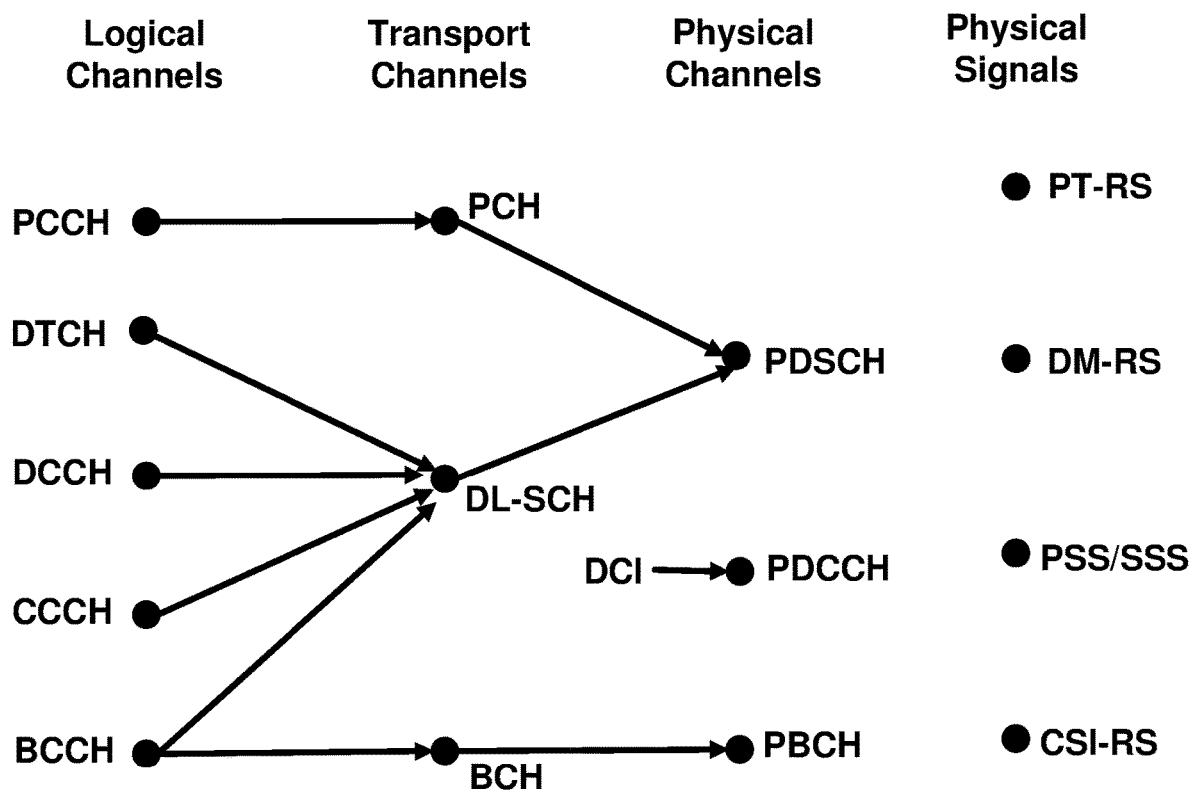
FIG. 5A shows example mapping of channels between layers of the protocol stack and different physical signals in downlink in accordance with several of various embodiments of the present disclosure.
Figure 5B:
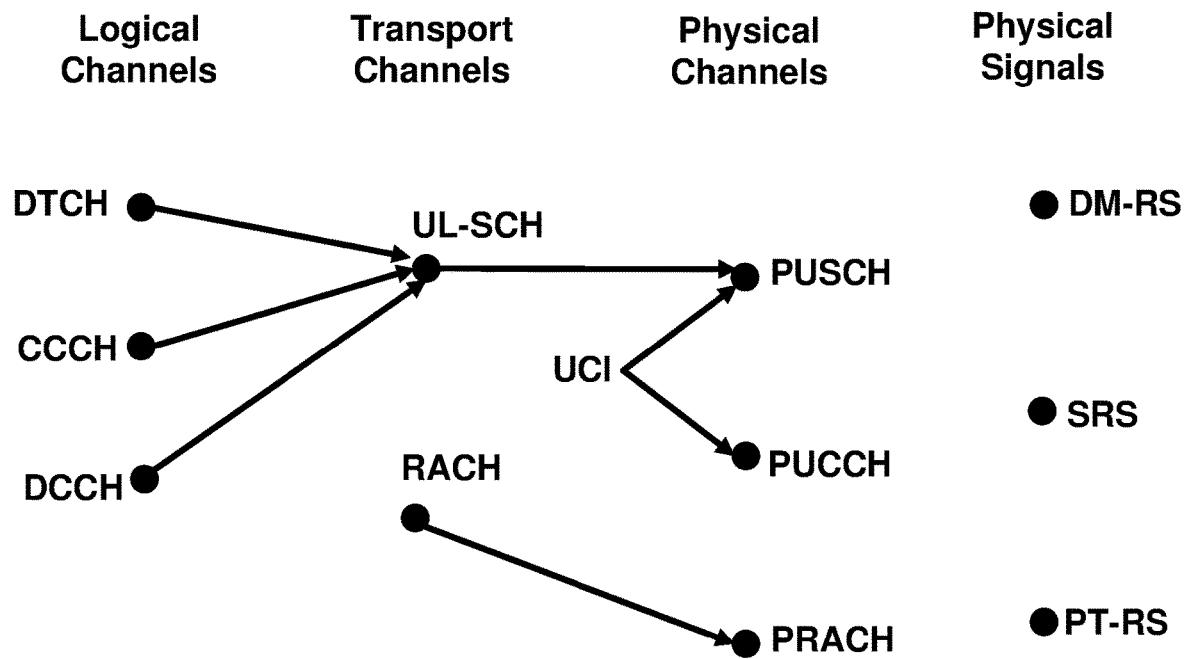
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
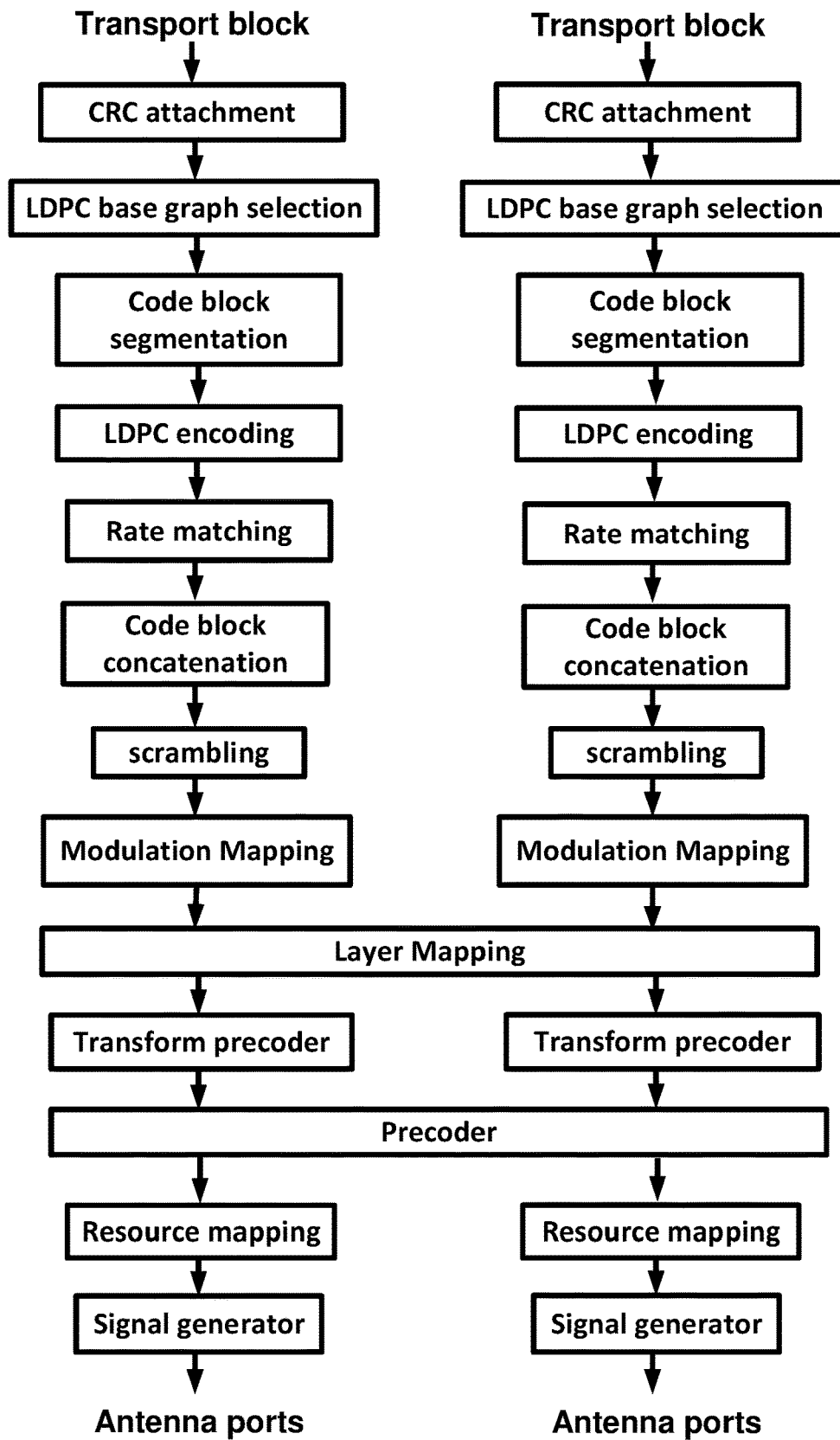
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
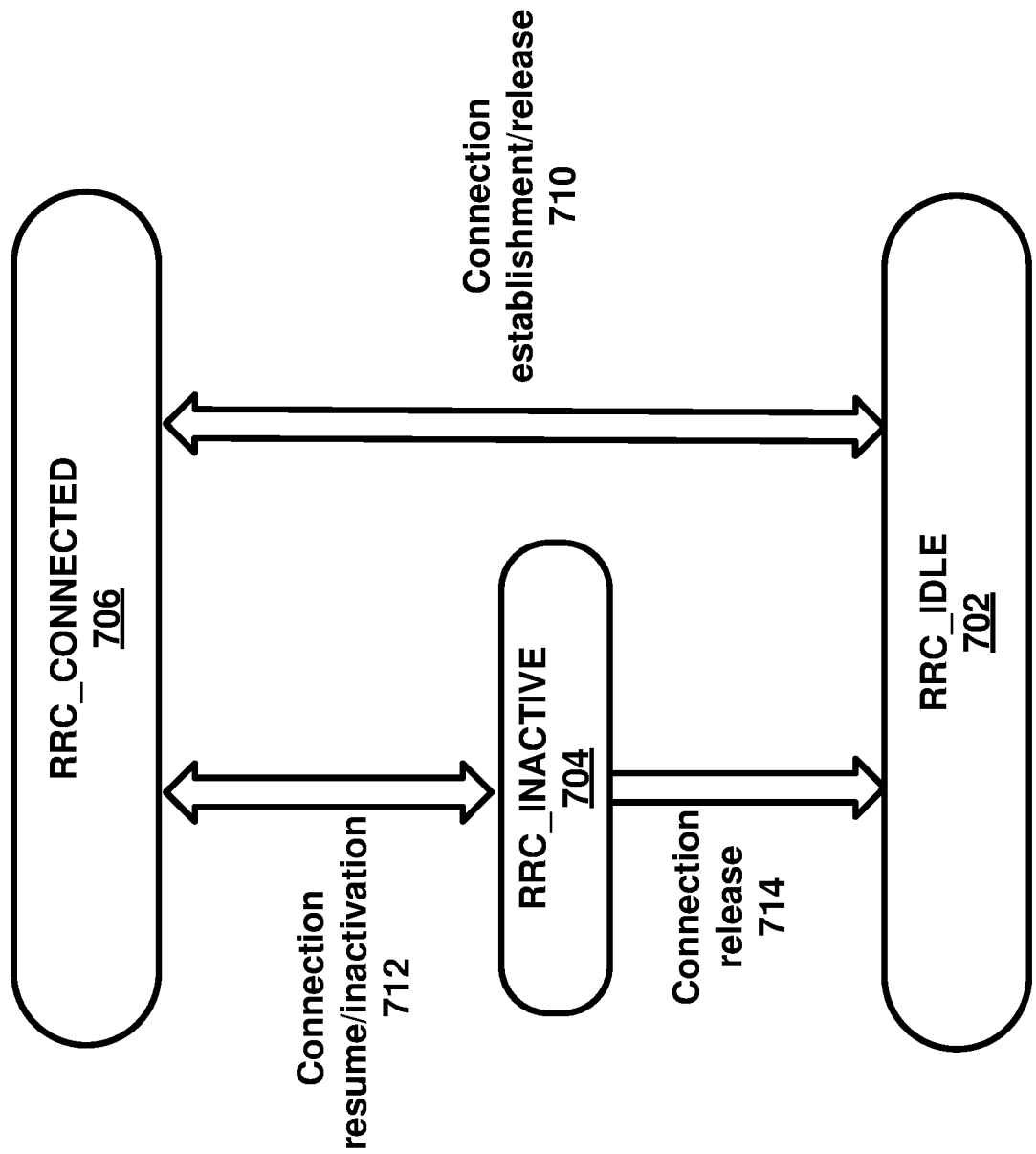
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu = 0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g. the μ value).

Figure 8:
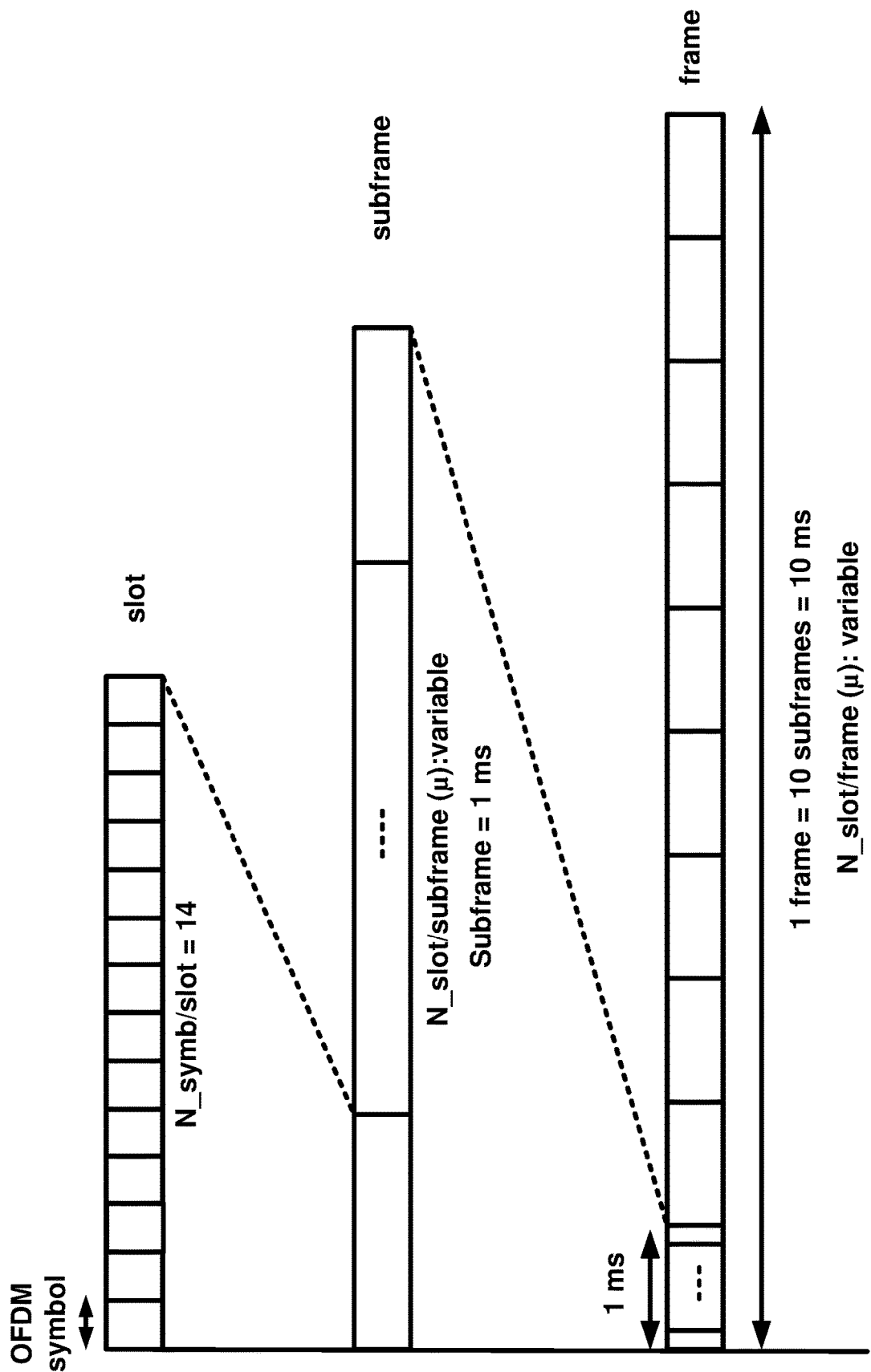
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally expressed as $n_{slot}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
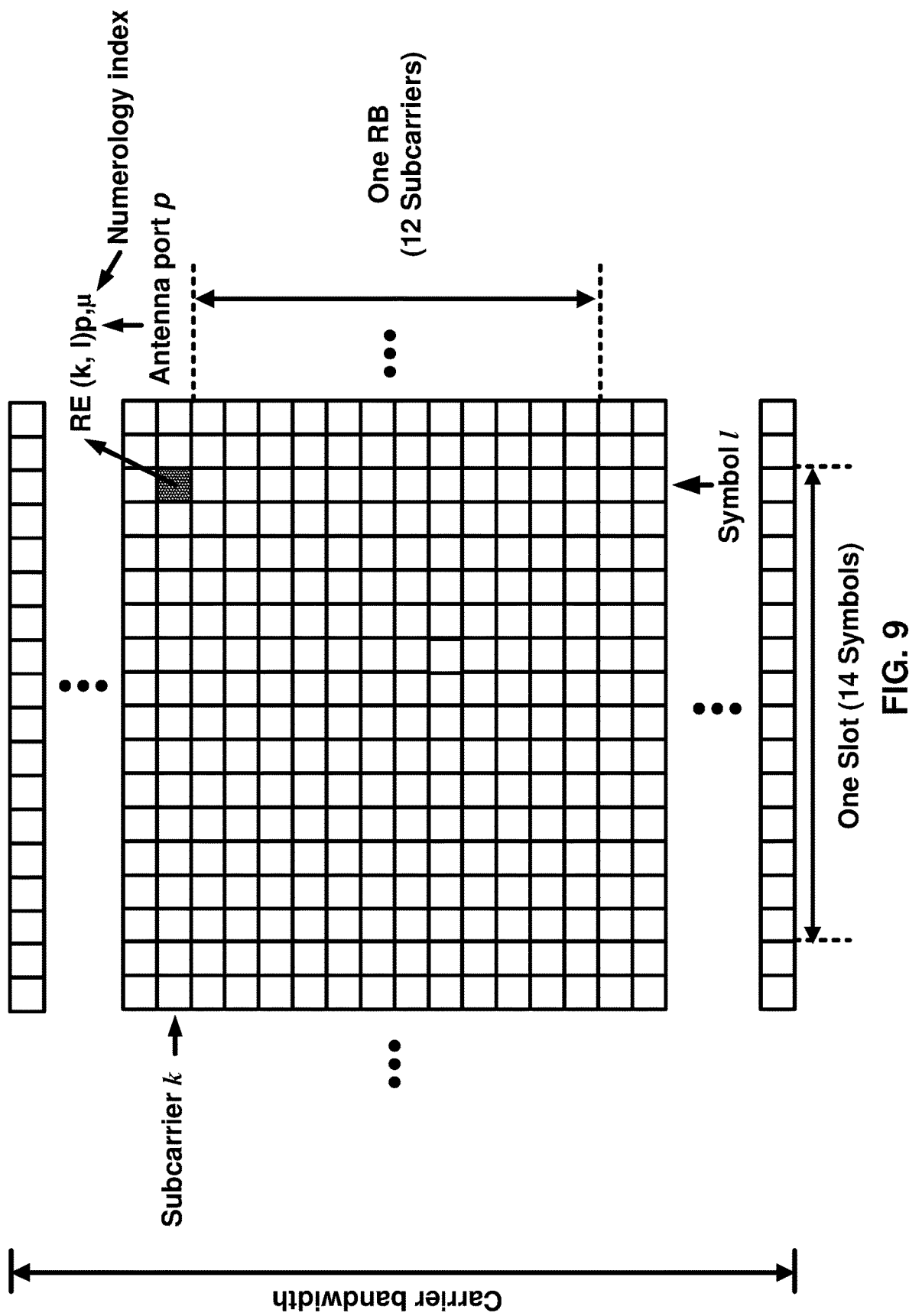
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k,l)_{p,\mu}$ where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., μ=0), a resource block may be 180 KHz and for a subcarrier spacing of 30 KHz (e.g., μ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g. shrink during period of low activity to save power); the location of the transmit and/or receive bandwidth may move in the frequency domain (e.g. to increase scheduling flexibility); and the subcarrier spacing of the transmit or receive bandwidth may change (e.g. to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
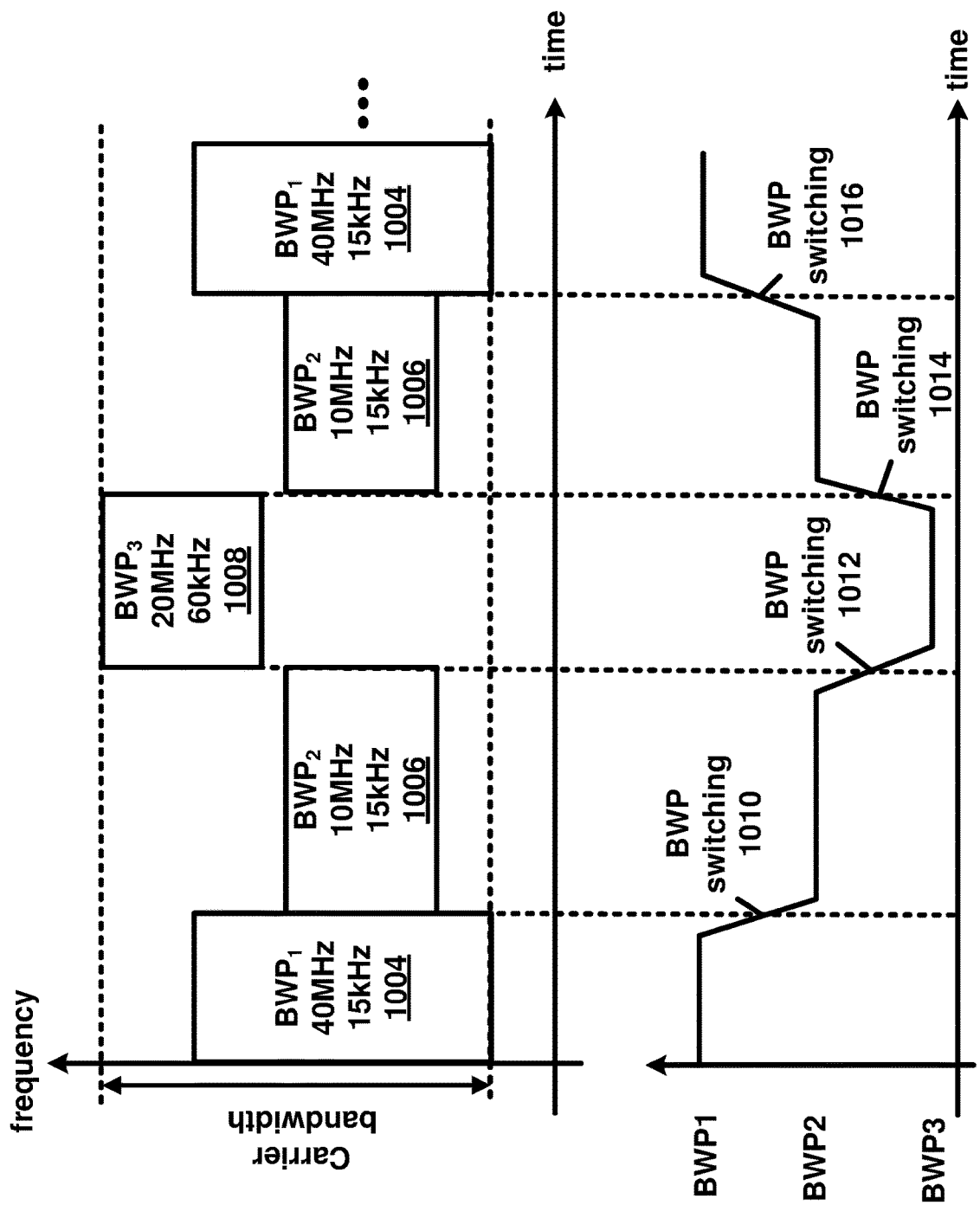
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
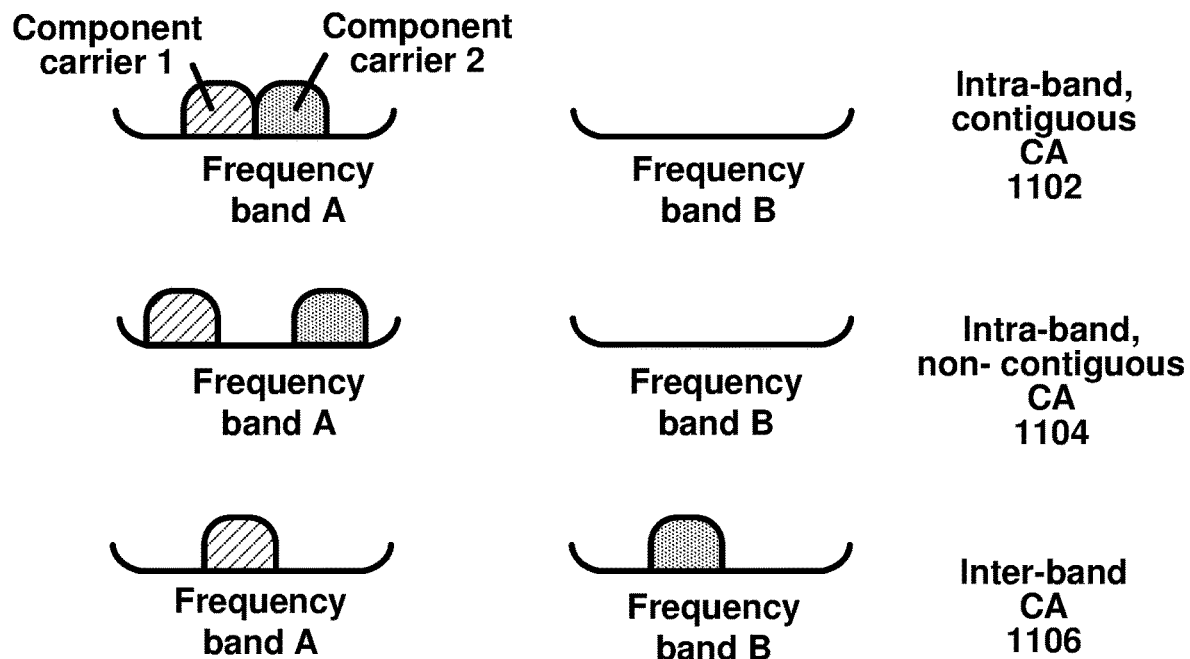
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
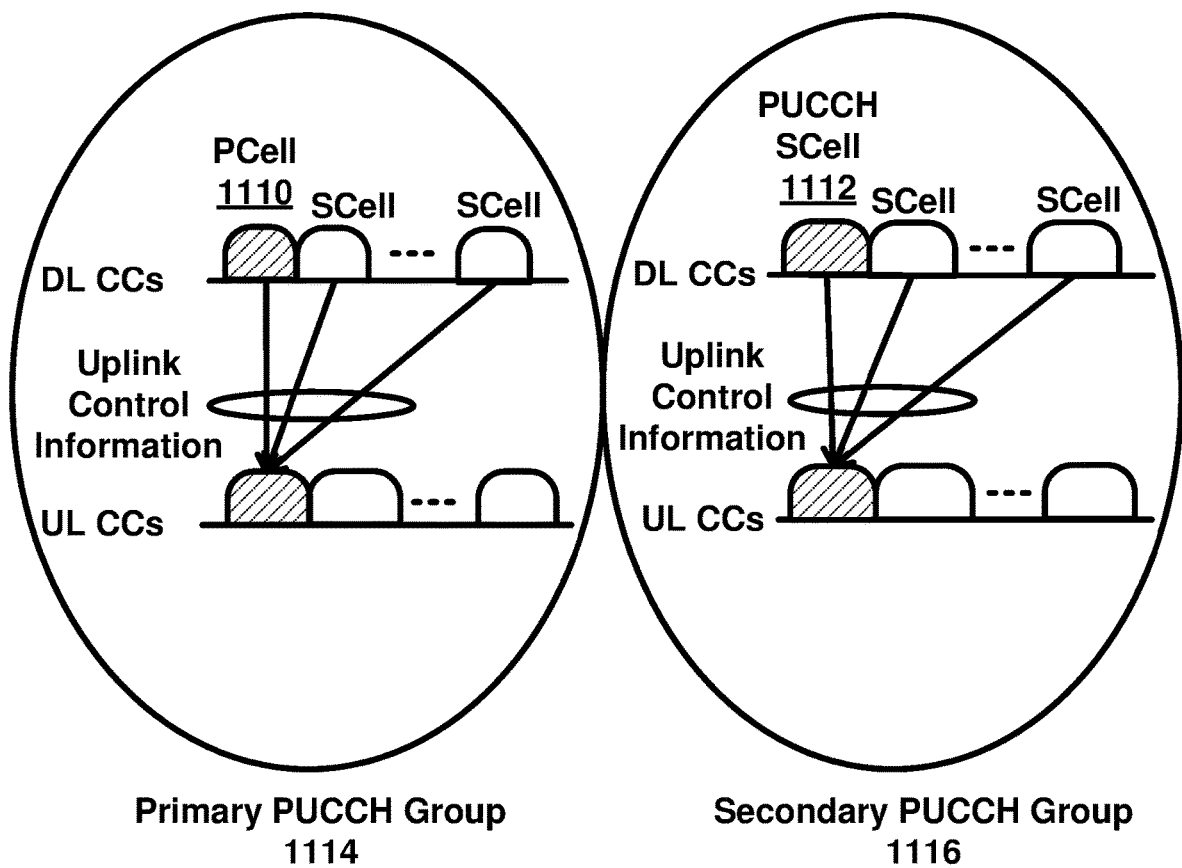
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figures 12A, 12B, 12C:
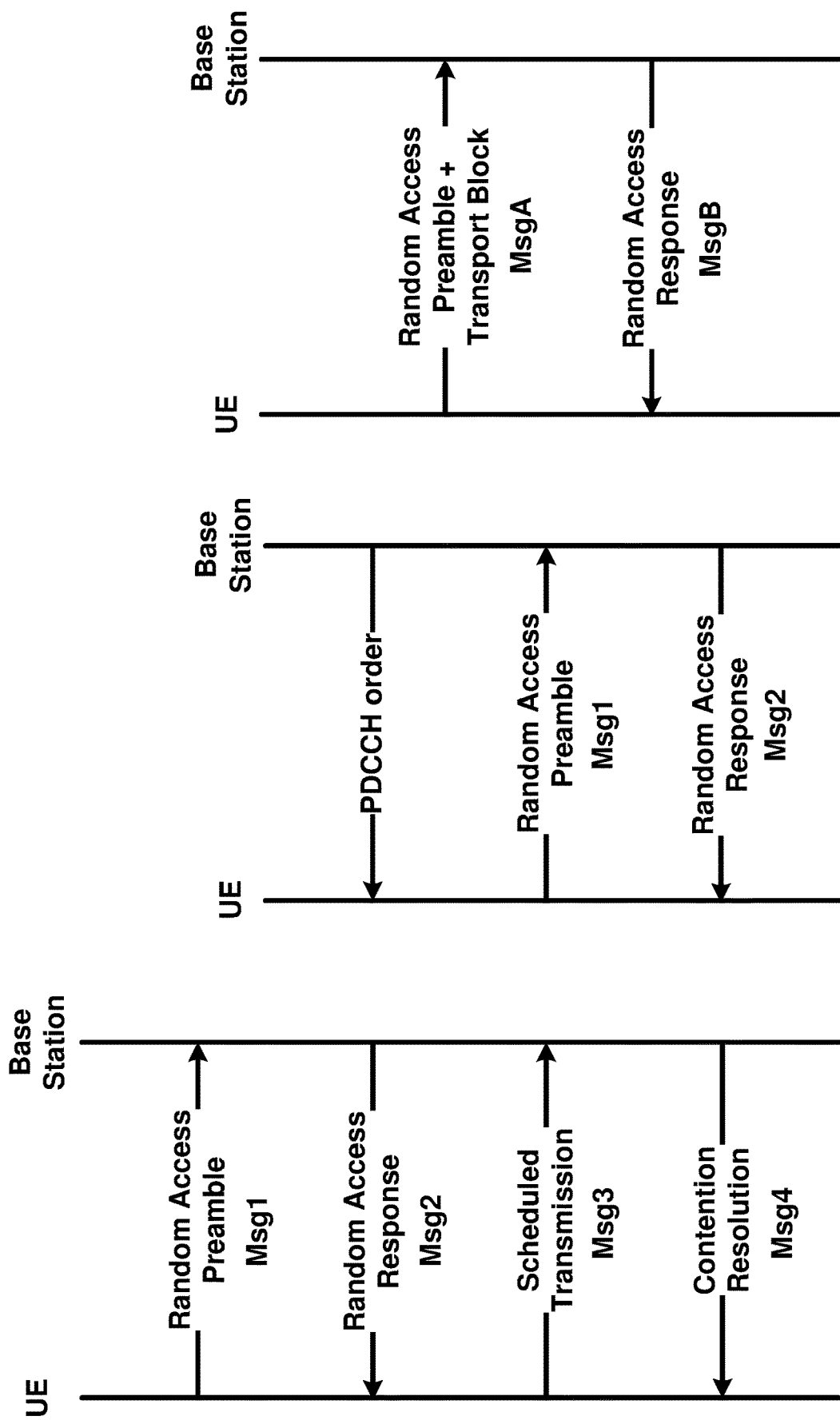
FIG. 12A, FIG. 12B and FIG. 12C show example random access processes in accordance with several of various embodiments of the present disclosure.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. The are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
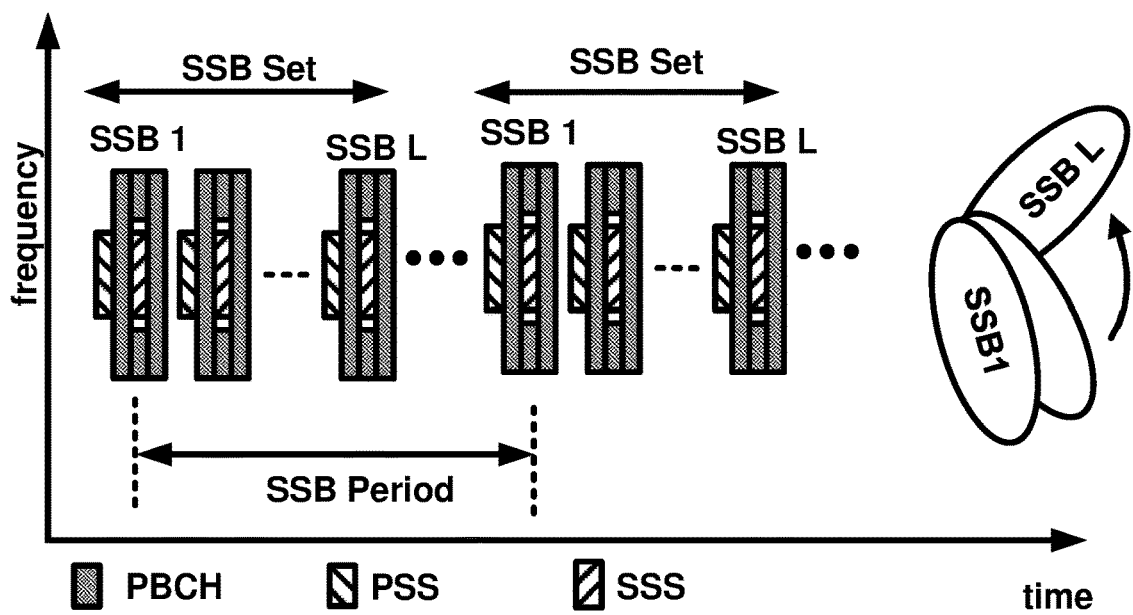
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
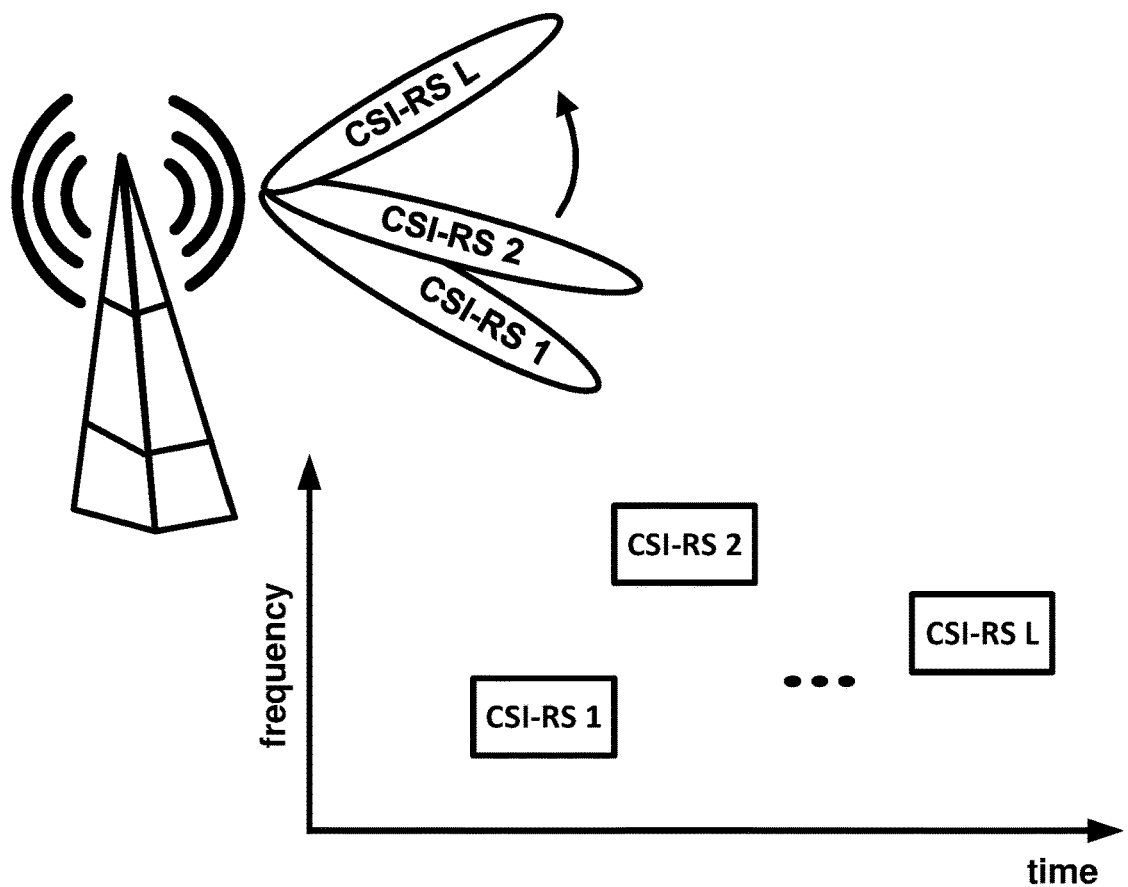
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
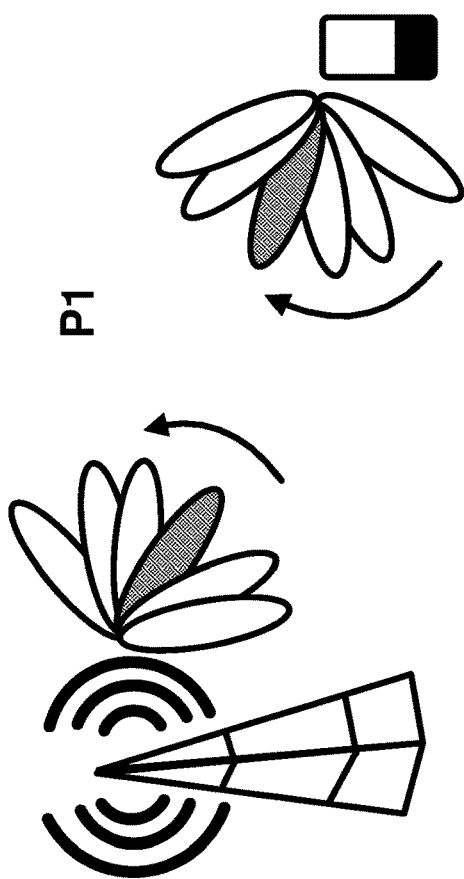
FIG. 14A, FIG. 14B and FIG. 14C show example beam management processes in accordance with several of various embodiments of the present disclosure.
Figure 14C:
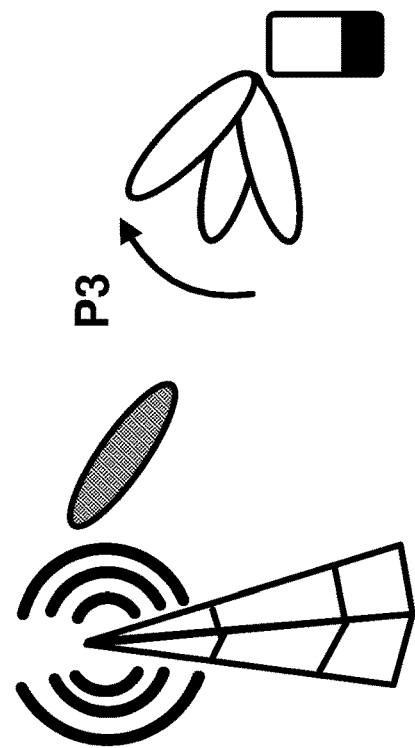
Figure 14B:
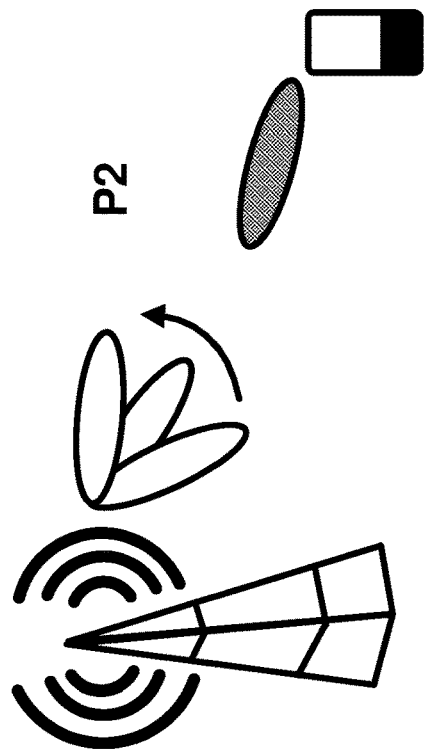

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
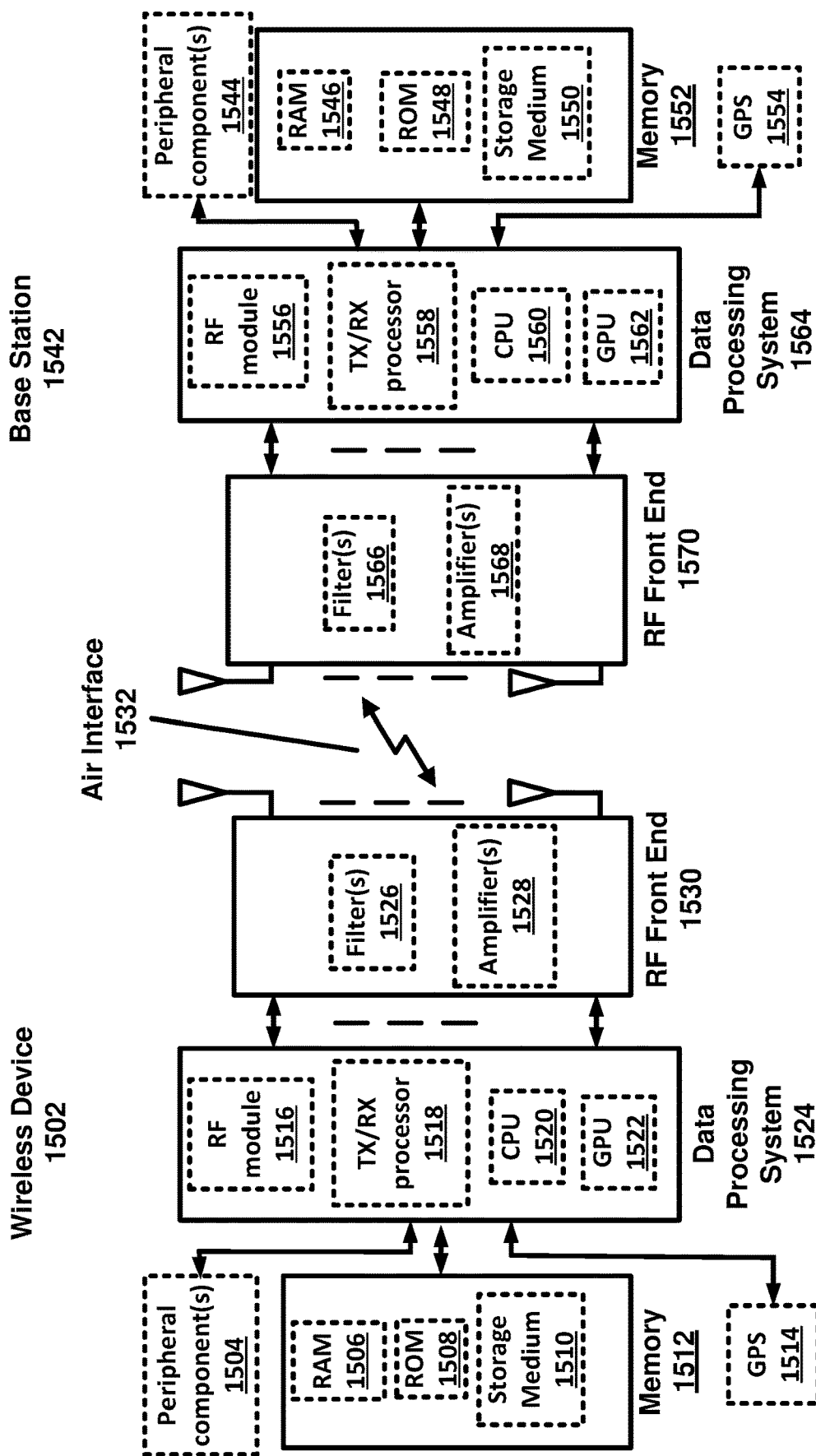
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters.

For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, a serving Cell may be configured with one or multiple BWPs. The BWP switching for a Serving Cell may be used to activate an inactive BWP and deactivate an active BWP at a time. The BWP switching may be controlled by the PDCCH indicating a downlink assignment or an uplink grant, by the bwp-InactivityTimer, by RRC signaling, or by the MAC entity itself upon initiation of Random Access procedure.

In an example, upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively may be active without receiving PDCCH indicating a downlink assignment or an uplink grant. The active BWP for a Serving Cell may be indicated by RRC or PDCCH. For unpaired spectrum, a DL BWP may be paired with a UL BWP, and BWP switching may be common for both UL and DL.

In an example, for an activated Serving Cell configured with a BWP, if a BWP is activated, the MAC entity may transmit on UL-SCH on the BWP; transmit on RACH on the BWP, if PRACH occasions are configured; monitor the PDCCH on the BWP; transmit PUCCH on the BWP, if configured; report CSI for the BWP; transmit SRS on the BWP, if configured; receive DL-SCH on the BWP; (re-)initialize suspended configured uplink grants of configured grant Type 1 on the active BWP according to the stored configuration, if any, and to start in a symbol.

In an example, for an activated Serving Cell configured with a BWP, if a BWP is deactivated, the MAC entity may not transmit on UL-SCH on the BWP; the MAC entity may not monitor the PDCCH on the BWP; the MAC entity may not transmit PUCCH on the BWP; the MAC entity may not report CSI for the BWP; the MAC entity may not transmit SRS on the BWP; the MAC entity may not receive DL-SCH on the BWP; the MAC entity may clear configured downlink assignment and configured uplink grant of configured grant Type 2 on the BWP; the MAC entity may suspend configured uplink grant of configured grant Type 1 on the inactive BWP.

In an example, upon initiation of the Random Access procedure on a Serving Cell, the wireless device may select a carrier for performing Random Access procedure. The PRACH occasions may not be configured for the active UL BWP. The MAC entity may, for the selected carrier of this Serving Cell, switch the active UL BWP to BWP indicated by initialUplinkBWP. If the Serving Cell is an SpCell, the MAC entity may, for the selected carrier of this Serving Cell, switch the active DL BWP to BWP indicated by initialDownlinkBWP.

In an example, upon initiation of the Random Access procedure on a Serving Cell, the wireless device may select a carrier for performing Random Access procedure. The PRACH occasions may be configured for the active UL BWP. If the Serving Cell is an SpCell, if the active DL BWP does not have the same bwp-Id as the active UL BWP, the MAC entity may, for the selected carrier of this Serving Cell, switch the active DL BWP to the DL BWP with the same bwp-Id as the active UL BWP.

In an example, upon initiation of the Random Access procedure on a Serving Cell, the wireless device may select a carrier for performing Random Access procedure. The MAC entity may for the selected carrier of this Serving Cell, stop the bwp-InactivityTimer associated with the active DL BWP of this Serving Cell, if running. If the Serving Cell is SCell, the MAC entity may, for the selected carrier of this Serving Cell, stop the bwp-InactivityTimer associated with the active DL BWP of SpCell, if running. The MAC entity may, for the selected carrier of this Serving Cell, perform the Random Access procedure on the active DL BWP of SpCell and active UL BWP of this Serving Cell.

In an example, if the MAC entity receives a PDCCH for BWP switching of a Serving Cell, if there is no ongoing Random Access procedure associated with this Serving Cell; or if the ongoing Random Access procedure associated with this Serving Cell is successfully completed upon reception of this PDCCH addressed to C-RNTI, the MAC entity may perform BWP switching to a BWP indicated by the PDCCH.

In an example, if the MAC entity receives a PDCCH for BWP switching for a Serving Cell while a Random Access procedure associated with that Serving Cell is ongoing in the MAC entity, it may be up to wireless device implementation whether to switch BWP or ignore the PDCCH for BWP switching, except for the PDCCH reception for BWP switching addressed to the C-RNTI for successful Random Access procedure completion in which case the wireless device may perform BWP switching to a BWP indicated by the PDCCH. Upon reception of the PDCCH for BWP switching other than successful contention resolution, if the MAC entity decides to perform BWP switching, the MAC entity may stop the ongoing Random Access procedure and initiate a Random Access procedure after performing the BWP switching; if the MAC decides to ignore the PDCCH for BWP switching, the MAC entity may continue with the ongoing Random Access procedure on the Serving Cell.

In an example, upon reception of RRC (re-)configuration for BWP switching for a Serving Cell while a Random Access procedure associated with that Serving Cell is ongoing in the MAC entity, the MAC entity may stop the ongoing Random Access procedure and initiate a Random Access procedure after performing the BWP switching.

In an example, the defaultDownlinkBWP-Id may be configured, and the active DL BWP may not be the BWP indicated by the defaultDownlinkBWP-Id. In an example the defaultDownlinkBWP-Id may not configured, and the active DL BWP may not be the initialDownlinkBWP. A PDCCH addressed to C-RNTI or CS-RNTI indicating downlink assignment or uplink grant may be received on the active BWP; or a PDCCH addressed to C-RNTI or CS-RNTI indicating downlink assignment or uplink grant may be received for the active BWP; or a MAC PDU may be transmitted in a configured uplink grant or received in a configured downlink assignment. If there is no ongoing Random Access procedure associated with this Serving Cell; or if the ongoing Random Access procedure associated with this Serving Cell is successfully completed upon reception of this PDCCH addressed to C-RNTI: the MAC entity may start or restart the bwp-InactivityTimer associated with the active DL BWP.

In an example, the defaultDownlinkBWP-Id may be configured, and the active DL BWP may not be the BWP indicated by the defaultDownlinkBWP-Id. In an example the defaultDownlinkBWP-Id may not configured, and the active DL BWP may not bethe initialDownlinkBWP. The bwp-InactivityTimer associated with the active DL BWP may expire. If the defaultDownlinkBWP-Id is configured, the MAC entity may perform BWP switching to a BWP indicated by the defaultDownlinkBWP-Id. Otherwise, the MAC entity may perform BWP switching to the initial-DownlinkBWP.

In an example, if a Random Access procedure is initiated on an SCell, both this SCell and the SpCell may be associated with this Random Access procedure.

In an example, a PDCCH for BWP switching may be received, and the MAC entity may switch the active DL BWP. If the defaultDownlinkBWP-Id is configured, and the MAC entity switches to the DL BWP which is not indicated by the defaultDownlinkBWP-Id; or if the defaultDownlinkBWP-Id is not configured, and the MAC entity switches to the DL BWP which is not the initialDownlinkBWP, the MAC entity may start or restart the bwp-InactivityTimer associated with the active DL BWP.

In an example, a wireless device may be configured for operation in bandwidth parts (BWPs) of a serving cell. The wireless device may be configured by higher layers for the serving cell a set of bandwidth parts (BWPs) for receptions by the wireless device (e.g., DL BWP set) in a DL bandwidth by parameter BWP-Downlink or by parameter initialDownlinkBWP with a set of parameters configured by BWP-DownlinkCommon and BWP-DownlinkDedicated. In an example, the wireless device may be configured with a set of BWPs for transmissions by the wireless device (e.g., UL BWP set) in an UL bandwidth by parameter BWP-Uplink or by parameter initialUplinkBWP with a set of parameters configured by BWP-UplinkCommon and BWP-UplinkDedicated.

In an example, if a wireless device is not provided initialDownlinkBWP, an initial DL BWP may be defined by a location and number of contiguous physical resource blocks (PRBs), starting from a PRB with the lowest index and ending at a PRB with the highest index among PRBs of a CORESET for Type0-PDCCH common search space (CSS) set, and a subcarrier spacing (SCS) and a cyclic prefix for PDCCH reception in the CORESET for Type0-PDCCH CSS set. Otherwise, the initial DL BWP may be provided by initialDownlinkBWP. For operation on the primary cell or on a secondary cell, a wireless device may be provided an initial UL BWP by initialUplinkBWP. If the wireless device is configured with a supplementary UL carrier, the wireless device may be be provided an initial UL BWP on the supplementary UL carrier by initialUplinkBWP.

In an example, if a wireless device has dedicated BWP configuration, the wireless device may be provided by firstActiveDownlinkBWP-Id a first active DL BWP for receptions and by firstActiveUplinkBWP-Id a first active UL BWP for transmissions on a carrier of the primary cell.

In an example, for a DL BWP or UL BWP in a set of DL BWPs or UL BWPs, respectively, the wireless device may be provided the following parameters for the serving cell:a SCS by subcarrierSpacing, a cyclic prefix by cyclicPrefix, a common RB $N_{BWP}^{start}=O_{carrier}+RB_{start}$ and a number of contiguous RBs $N_{BWP}^{size}=L_{RB}$ provided by locationAndBandwidth that indicates an offset $RB_{start}$ and a length $L_{RB}$ as RIV, setting $N_{BWP}^{size}=275$, and a value $O_{carrier}$ provided by offsetToCarrier for the subcarrierSpacing, an index in the set of DL BWPs or UL BWPs by respective BWP-Id, a set of BWP-common and a set of BWP-dedicated parameters by BWP-DownlinkCommon and BWP-DownlinkDedicated for the DL BWP, or BWP-UplinkCommon and BWP-UplinkDedicated for the UL BWP.

In an example, for unpaired spectrum operation, a DL BWP from the set of configured DL BWPs with index provided by BWP-Id is linked with an UL BWP from the set of configured UL BWPs with index provided by BWP-Id when the DL BWP index and the UL BWP index are same. For unpaired spectrum operation, a UE may not expect to receive a configuration where the center frequency for a DL BWP is different than the center frequency for an UL BWP when the BWP-Id of the DL BWP is same as the BWP-Id of the UL BWP.

In an example, for a DL BWP in a set of DL BWPs of the PCell, or of the PUCCH-SCell, a wireless device may be configured CORESETs for every type of CSS sets and for USS. The wireless device may not expect to be configured without a CSS set on the PCell, or on the PUCCH-SCell, of the MCG in the active DL BWP.

In an example, if a wireless device is provided controlResourceSetZero and searchSpaceZero in PDCCH-ConfigSIB1 or PDCCH-ConfigCommon, the wireless device may determine a CORESET for a search space set from controlResourcesetZero and may determine corresponding PDCCH monitoring occasions. If the active DL BWP is not the initial DL BWP, the wireless device may determine PDCCH monitoring occasions for the search space set if the CORESET bandwidth is within the active DL BWP and the active DL BWP has same SCS configuration and same cyclic prefix as the initial DL BWP.

In an example, for an UL BWP in a set of UL BWPs of the PCell or of the PUCCH-SCell, the wireless device may be configured resource sets for PUCCH transmissions.

In an example, a wireless device may receive PDCCH and PDSCH in a DL BWP according to a configured SCS and CP length for the DL BWP. A wireless device may transmit PUCCH and PUSCH in an UL BWP according to a configured SCS and CP length for the UL BWP.

In an example, if a bandwidth part indicator field is configured in DCI format 1_1, the bandwidth part indicator field value may indicate the active DL BWP, from the configured DL BWP set, for DL receptions. If a bandwidth part indicator field is configured in DCI format 0_1, the bandwidth part indicator field value may indicate the active UL BWP, from the configured UL BWP set, for UL transmissions.

In an example, a bandwidth part indicator field may be configured in DCI format 0_1 or DCI format 1_1 and may indicate an UL BWP or a DL BWP different from the active UL BWP or DL BWP, respectively. For an information field in the received DCI format 0_1 or DCI format 1_1, if the size of the information field is smaller than the one required for the DCI format 0_1 or DCI format 1_1 interpretation for the UL BWP or DL BWP that is indicated by the bandwidth part indicator, respectively, the wireless device may prepend zeros to the information field until its size is the one required for the interpretation of the information field for the UL BWP or DL BWP prior to interpreting the DCI format 0_1 or DCI format 1_1 information fields, respectively. For an information field in the received DCI format 0_1 or DCI format 1_1, if the size of the information field is larger than the one required for the DCI format 0_1 or DCI format 11 interpretation for the UL BWP or DL BWP that is indicated by the bandwidth part indicator, respectively, the wireless device may use a number of least significant bits of DCI format 0_1 or DCI format 11 equal to the one required for the UL BWP or DL BWP indicated by bandwidth part indicator prior to interpreting the DCI format 0_1 or DCI format 1_1 information fields, respectively. For an information field in the received DCI format 0_1 or DCI format 1_1, the wireless device may set the active UL BWP or DL BWP to the UL BWP or DL BWP indicated by the bandwidth part indicator in the DCI format 0_1 or DCI format 1_1, respectively In an example, a wireless device may not expect to detect a DCI format 1_1 or a DCI format 0_1 indicating respectively an active DL BWP or an active UL BWP change with the corresponding time domain resource assignment field providing a slot offset value for a PDSCH reception or PUSCH transmission that is smaller than a delay required by the wireless device for an active DL BWP change or UL BWP change.

In an example, a wireless device may detect a DCI format 1_1 indicating an active DL BWP change for a cell. The wireless device may not be required to receive or transmit in the cell during a time duration from the end of the third symbol of a slot where the UE receives the PDCCH that includes the DCI format 1_1 in a scheduling cell until the beginning of a slot indicated by the slot offset value of the time domain resource assignment field in the DCI format 1_1.

In an example, a wireless device may detect a DCI format 0_1 indicating an active UL BWP change for a cell. The wireless device may not be required to receive or transmit in the cell during a time duration from the end of the third symbol of a slot where the wireless device receives the PDCCH that includes the DCI format 0_1 in the scheduling cell until the beginning of a slot indicated by the slot offset value of the time domain resource assignment field in the DCI format 0_1.

In an example, a wireless device may not expect to detect a DCI format 1_1 indicating an active DL BWP change or a DCI format 0_1 indicating an active UL BWP change for a scheduled cell within FR1 (or FR2) in a slot other than the first slot of a set of slots for the DL SCS of the scheduling cell that overlaps with a time duration where the wireless device is not required to receive or transmit for an active BWP change in a different cell from the scheduled cell within FR1 (or FR2).

In an example, a wireless device may expect to detect a DCI format 0_1 indicating active UL BWP change, or a DCI format 1_1 indicating active DL BWP change, if a corresponding PDCCH is received within the first 3 symbols of a slot.

In an example, for a serving cell, a wireless device may be provided by defaultDownlinkBWP-Id a default DL BWP among the configured DL BWPs. If a wireless device is not provided a default DL BWP by defaultDownlinkBWP-Id, the default DL BWP may be the initial DL BWP.

In an example, if a wireless device is provided by bwp-InactivityTimer a timer value for the serving cell and the timer is running, the wireless device may decrement the timer at the end of a subframe for FR1 or at the end of a half subframe for FR2 if the restarting conditions in [11, TS 38.321] are not met during the interval of the subframe for FR1 or of the half subframe for FR2.

In an example, for a cell where a wireless device changes an active DL BWP due to a BWP inactivity timer expiration and for accommodating a delay in the active DL BWP change or the active UL BWP change required by the wireless device, the wireless device may not be required to receive or transmit in the cell during a time duration from the beginning of a subframe for FR1, or of half of a subframe for FR2, that is after the BWP inactivity timer expires until the beginning of a slot where the wireless device may receive or transmit.

In an example, when a wireless device's BWP inactivity timer for a cell within FR1 (or FR2) expires within a time duration where the wireless device is not required to receive or transmit for an active UL/DL BWP change in the cell or in a different cell within FR1 (or FR2), the wireless device may delay the active UL/DL BWP change triggered by the BWP inactivity timer expiration until a subframe for FR1 or half a subframe for FR2 that is after the wireless device completes the active UL/DL BWP change in the cell or in the different cell within FR1 (or FR2).

In an example, if a wireless device is provided by firstActiveDownlinkBWP-Id a first active DL BWP and by firstActiveUplinkBWP-Id a first active UL BWP on a carrier of a secondary cell, the wireless device may use the indicated DL BWP and the indicated UL BWP as the respective first active DL BWP on the secondary cell and first active UL BWP on the carrier of the secondary cell.

In an example, for paired spectrum operation, a wireless device may not expect to transmit a PUCCH with HARQ-ACK information on a PUCCH resource indicated by a DCI format 1_0 or a DCI format 1_1 if the wireless device changes its active UL BWP on the PCell or PUCCH-SCell between a time of a detection of the DCI format 1_0 or the DCI format 1_1 and a time of a corresponding PUCCH transmission with HARQ-ACK information.

In an example, a wireless device may not expect to monitor PDCCH when the wireless device performs radio resource management (RRM) measurements over a bandwidth that is not within the active DL BWP for the wireless device.

In an example, an IE BWP may be used to configure generic parameters of a bandwidth part. For a serving cell, the network may configure at least an initial downlink bandwidth part and one (e.g., if the serving cell is configured with an uplink) or two (e.g., if using supplementary uplink (SUL)) initial uplink bandwidth parts. Furthermore, the network may configure additional uplink and downlink bandwidth parts for a serving cell. The uplink and downlink bandwidth part configurations are divided into common and dedicated parameters.

In an example, a parameter cyclicPrefix may indicate whether to use the extended cyclic prefix for a bandwidth part. If not set, the wireless device may use the normal cyclic prefix. Normal CP may be supported for all subcarrier spacings and slot formats.

In an example, a parameter locationAndBandwidth may indicate frequency domain location and bandwidth of a bandwidth part. The value of the field may be interpreted as resource indicator value (RIV). The first PRB may be a PRB determined by subcarrierSpacing of the BWP and offsetToCarrier (configured in SCS-SpecificCarrier contained within FrequencyInfoDL/FrequencyInfoUL/FrequencyInfoUL-SIB/FrequencyInfoDL-SIB within ServingCellConfigCommon/ServingCellConfigCommonSIB) corresponding to this subcarrier spacing. In case of TDD, a BWP-pair (UL BWP and DL BWP with the same bwp-Id) may have the same center frequency.

In an example, a parameter subcarrierSpacing may indicate subcarrier spacing to be used in a BWP for channels and reference signals unless explicitly configured elsewhere. For the initial DL BWP, this field may have the same value as the field subCarrierSpacingCommon in MIB of the same serving cell.

In an example, an IE BWP-Downlink may be used to configure an additional downlink bandwidth part (e.g., not for the initial BWP). A parameter bwp-Id may indicate an identifier for the bandwidth part. Other parts of the RRC configuration may use the BWP-Id to associate themselves with a particular bandwidth part. The network may configure the BWPs with consecutive IDs from 1. The Network may not include the value 0. The value 0 may be reserved for the initial BWP.

In an example, an IE BWP-DownlinkCommon may be used to configure the common parameters of a downlink BWP. The parameters may be cell specific and the network may ensure the necessary alignment with corresponding parameters of other UEs. The common parameters of the initial bandwidth part of the PCell may also be provided via system information. For other serving cells, the network may provide the common parameters via dedicated signalling.

In an example, an IE BWP-DownlinkDedicated may be used to configure the dedicated (UE specific) parameters of a downlink BWP.

Ina n example, an IE BWP-Id may be used to refer to Bandwidth Parts (BWP). The initial BWP may be referred to by BWP-Id 0. The other BWPs may be referred to by BWP-Id 1 to maxNrofBWPs.

In an example, an IE BWP-Uplink may be used to configure an additional uplink bandwidth part (e.g., not for the initial BWP).

In an example, an IE BWP-UplinkCommon may be used to configure the common parameters of an uplink BWP. The parameters may be cell specific and the network may ensure the necessary alignment with corresponding parameters of other wireless devices. The common parameters of the initial bandwidth part of the PCell may also be provided via system information. For other serving cells, the network may provide the common parameters via dedicated signaling.

In an example, an IE BWP-UplinkDedicated may be used to configure the dedicated (UE specific) parameters of an uplink BWP.

In an example, a MAC entity may be configured with one or more SCells. The base station may activate and/or deactivate the configured SCells. Upon configuration of an SCell, the SCell may be deactivated.

In an example, the configured SCell(s) may be activated and deactivated by receiving an SCell Activation/Deactivation MAC CE.

In an example, the SCell(s) configured for a wireless device may be activated and deactivated by configuring sCellDeactivationTimer timer for a configured SCell. In an example, a sCellDeactivationTimer timer may not be configured for a SCell configured with PUCCH. In an example, an SCell associated with a sCellDeactivationTimer timer may be deactivated upon the expiry of the sCellDeactivationTimer timer.

In an example, a wireless device may receive an SCell Activation/Deactivation MAC CE indicating activation of the SCell. The wireless device may activate the SCell according to a timing. The activation of the SCell may comprise applying normal SCell operation including: SRS transmissions on the SCell; CSI reporting for the SCell; PDCCH monitoring on the SCell; and PUCCH transmissions on the SCell, if configured.

In an example, a wireless device may receive an SCell Activation/Deactivation MAC CE indicating activation of the SCell. If the SCell was deactivated prior to receiving this SCell Activation/Deactivation MAC CE, the wireless device may activate the DL BWP and UL BWP indicated by firstActiveDownlinkBWP-Id and firstActiveUplinkBWP-Id respectively.

In an example, a wireless device may receive an SCell Activation/Deactivation MAC CE indicating activation of the SCell. The wireless device may start or restart the sCellDeactivationTimer associated with the SCell according to a timing based on the receiving the SCell Activation/Deactivation MAC CE.

In an example, a wireless device may receive an SCell Activation/Deactivation MAC CE indicating activation of the SCell. The wireless device may (re-)initialize suspended configured uplink grants of configured grant Type 1 associated with this SCell according to the stored configuration, if any, and may start in the symbol according to rules based on the receiving the SCell Activation/Deactivation MAC CE.

In an example, a wireless device may receive an SCell Activation/Deactivation MAC CE indicating activation of the SCell. The wireless device may trigger a PHR based on the receiving the SCell Activation/Deactivation MAC CE.

In an example, an SCell Activation/Deactivation MAC CE may be received indicating deactivation of the SCell or the sCellDeactivationTimer associated with the activated SCell may expire. Based on the SCell Activation/Deactivation MAC CE indicating deactivation of the SCell or based on the sCellDeactivationTimer associated with the activated SCell expiring, the wireless device may: deactivate the SCell according to a timing; stop the sCellDeactivationTimer associated with the SCell; stop the bwp-InactivityTimer associated with the SCell; deactivate active BWP associated with the SCell; clear configured downlink assignment and configured uplink grant Type 2 associated with the SCell respectively; clear PUSCH resource for semi-persistent CSI reporting associated with the SCell; suspend configured uplink grant Type 1 associated with the SCell; and flush HARQ buffers associated with the SCell.

In an example, if PDCCH on the activated SCell indicates an uplink grant or downlink assignment; or if PDCCH on the Serving Cell scheduling the activated SCell indicates an uplink grant or a downlink assignment for the activated SCell; or if a MAC PDU is transmitted in a configured uplink grant or received in a configured downlink assignment: the wireless device may restart the sCellDeactivationTimer associated with the SCell.

In an example, if the SCell is deactivated, the wireless device may: not transmit SRS on the SCell; not report CSI for the SCell; not transmit on UL-SCH on the SCell; not transmit on RACH on the SCell; not monitor the PDCCH on the SCell; not monitor the PDCCH for the SCell; not transmit PUCCH on the SCell.

In an example, HARQ feedback for the MAC PDU containing SCell Activation/Deactivation MAC CE may not be impacted by PCell, PSCell and PUCCH SCell interruptions due to SCell activation/deactivation.

In an example, when a SCell is deactivated, the ongoing Random Access procedure on the SCell, if any, may be aborted.

In an example, a SCell Activation/Deactivation MAC CE of one octet may be identified by a MAC subheader with a corresponding LCID. A SCell Activation/Deactivation MAC CE may have a fixed size and may comprise an octet containing seven C-fields and one R-field. An SCell Activation/Deactivation MAC CE with one octet may be defined. An example one-octet SCell Activation/Deactivation MAC CE is shown in FIG. 16A.

In an example, an SCell Activation/Deactivation MAC CE of four octets may be identified by a MAC subheader with a corresponding LCID. A SCell Activation/Deactivation MAC CE may have a fixed size and may comprise of four octets containing 31 C-fields and one R-field. An SCell Activation/Deactivation MAC CE of four octets may be defined. An example four-octet SCell Activation/Deactivation MAC CE is shown in FIG. 16B.

In an example, if there is an SCell configured for the MAC entity with SCellIndex i, the Ci field may indicate an activation/deactivation status of the SCell with SCellIndex i, otherwise the MAC entity may ignore the Ci field. The Ci field may be set to 1 to indicate that the SCell with SCellIndex i may be activated. The Ci field may be set to 0 to indicate that the SCell with SCellIndex i may be deactivated. The R field may be a Reserved bit and may be set to 0.

In an example, an IE SearchSpace may define how/where to search for PDCCH candidates. A search space may be associated with a ControlResourceSet. In an example, a parameter common may indicate that a search space is common search space (CSS) and may indicate DCI formats to monitor. A parameter controlResourceSetId may indicate the CORESET applicable for the SearchSpace. A parameter duration may indicate a number of consecutive slots that a SearchSpace may last in an occasion, e.g., upon a period as given in the periodicityAndOffset. If the field is absent, the wireless device may apply the value 1 slot, except for DCI format 2_0. The wireless device may ignore this field for DCI format 2_0. The maximum valid duration may be periodicity-1 (periodicity as given in the monitoringSlotPeriodicityAndOffset). The parameter monitoringSlotPeriodicityAndOffset may indicate slots for PDCCH Monitoring configured as periodicity and offset. The parameter monitoringSymbolsWithinSlot may indicate the first symbol(s) for PDCCH monitoring in the slots configured for PDCCH monitoring. The most significant (left) bit may represent the first OFDM in a slot, and the second most significant (left) bit represents the second OFDM symbol in a slot and so on. The bit(s) set to one may identify the first OFDM symbol(s) of the control resource set within a slot. If the cyclic prefix of the BWP is set to extended CP, the last two bits within the bit string may be ignored by the wireless device. The parameter nrofCandidates-SFI may indicate the number of PDCCH candidates specifically for format 2-0 for the configured aggregation level. The parameter searchSpaceId may identity the search space. SearchSpaceId=0 may identify a searchSpaceZero configured via PBCH (MIB) or ServingCellConfigCommon and may not be used in the SearchSpace IE. The searchSpaceId may be unique among the BWPs of a Serving Cell. In case of cross carrier scheduling, search spaces with the same searchSpaceId in scheduled cell and scheduling cell may be linked to each other. The wireless device may apply the search space for the scheduled cell if the DL BWPs in which the linked search spaces are configured in scheduling cell and scheduled cell are both active. The parameter searchSpaceType may indicate whether this is a common search space (present) or a UE specific search space as well as DCI formats to monitor for. The parameter ue-Specific may configure this search space as UE specific search space (USS). The UE may monitor the DCI format with CRC scrambled by C-RNTI, CS-RNTI (if configured), and SP-CSI-RNTI (if configured).

In an example, an IE SearchSpaceId may be used to identify Search Spaces. The ID space may be used across the BWPs of a Serving Cell. The search space with the SearchSpaceId=0 may identify the search space configured via PBCH (MIB) and in ServingCellConfigCommon (searchSpaceZero).

In an example, an IE SearchSpaceZero may be used to configure SearchSpace #0 of the initial BWP. The IE PDCCH-Config may be used to configure UE specific PDCCH parameters such as control resource sets (CORESET), search spaces and additional parameters for acquiring the PDCCH. In an example, a parameter controlResourceSetToAddModList may indicate a list of UE specifically configured Control Resource Sets (CORESETs) to be used by the wireless device. In an example, an IE PDCCH-ConfigCommon may be used to configure cell specific PDCCH parameters provided in SIB as well as in dedicated signaling. In an example, an IE ControlResourceSet may be used to configure a time/frequency control resource set (CORESET) in which to search for downlink control information. In an example, a ControlResourceSetId IE may indicate a short identity, used to identify a control resource set within a serving cell. The IE ControlResourceSetZero may be used to configure CORESET #0 of the initial BWP.

In an example, a set of PDCCH candidates for a wireless device to monitor may be defined in terms of PDCCH search space sets. A search space set may be a common search space (CSS) set or a UE-specific search space (USS) set. A wireless device may monitor PDCCH candidates in one or more of the following example types of search spaces sets

- a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG
- a Type0A-PDCCH CSS set configured by searchSpaceOtherSystemInformation in PDCCH-ConfigCommon for a DCI format with CRC scrambled by a SI-RNTI on the primary cell of the MCG
- a Type1-PDCCH CSS set configured by ra-SearchSpace in PDCCH-ConfigCommon for a DCI format with CRC scrambled by a RA-RNTI or a TC-RNTI on the primary cell
- a Type2-PDCCH CSS set configured by pagingSearchSpace in PDCCH-ConfigCommon for a DCI format with CRC scrambled by a P-RNTI on the primary cell of the MCG
- a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and
- a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

In an example, an IE PDCCH-ConfigCommon may be used to configure cell specific PDCCH parameters provided in SIB as well as in dedicated signaling. The parameter ra-SearchSpace may indicate ID of the Search space for random access procedure. If the field is absent, the UE may not receive RAR in this BWP.

In an example, an IE BeamFailureRecoveryConfig may be used to configure the UE with RACH resources and candidate beams for beam failure recovery in case of beam failure detection. The parameter recoverySearchSpaceId may indicate search space to use for BFR RAR. The network configures this search space to be within the linked DL BWP (i.e., within the DL BWP with the same bwp-Id) of the UL BWP in which the BeamFailureRecoveryConfig is provided. The CORESET associated with the recovery search space cannot be associated with another search space. Network always configures the UE with a value for this field when contention free random access resources for BFR are configured. The parameter ra-OccasionList may indicate RA occasions that the UE may use when performing BFR upon selecting the candidate beam identified by a CSI-RS. The network may ensure that the RA occasion indexes provided herein are also configured by prach-ConfigurationIndex and msg1-FDM. A RACH occasion may be sequentially numbered, first, in increasing order of frequency resource indexes for frequency multiplexed PRACH occasions; second, in increasing order of time resource indexes for time multiplexed PRACH occasions within a PRACH slot and Third, in increasing order of indexes for PRACH slots. If the field is absent the UE may use the RA occasion associated with the SSB that is QCLed with CSI-RS.

In an example, an IE CrossCarrierSchedulingConfig may be used to specify the configuration when the cross-carrier scheduling is used in a cell. A parameter cif-Presence may indicate whether carrier indicator field is present (value true) or not (value false) in PDCCH DCI formats. If cif-Presence is set to true, the CIF value indicating a grant or assignment for this cell may be 0. The parameter cif-InSchedulingCell may indicate the CIF value used in the scheduling cell to indicate a grant or assignment applicable for the cell being scheduled. In an example an IE other may indicate parameters for cross-carrier scheduling, e.g., a serving cell being scheduled by a PDCCH on another (scheduling) cell. The IE own may indicate parameters for self-scheduling, e.g., a serving cell being scheduled by its own PDCCH. The parameter schedulingCellId may indicate which cell signals the downlink allocations and uplink grants, if applicable, for the SCell. In case the wireless device is configured with dual connectivity, the scheduling cell may be part of the same cell group (e.g., MCG or SCG) as the scheduled cell.

Figure 17:
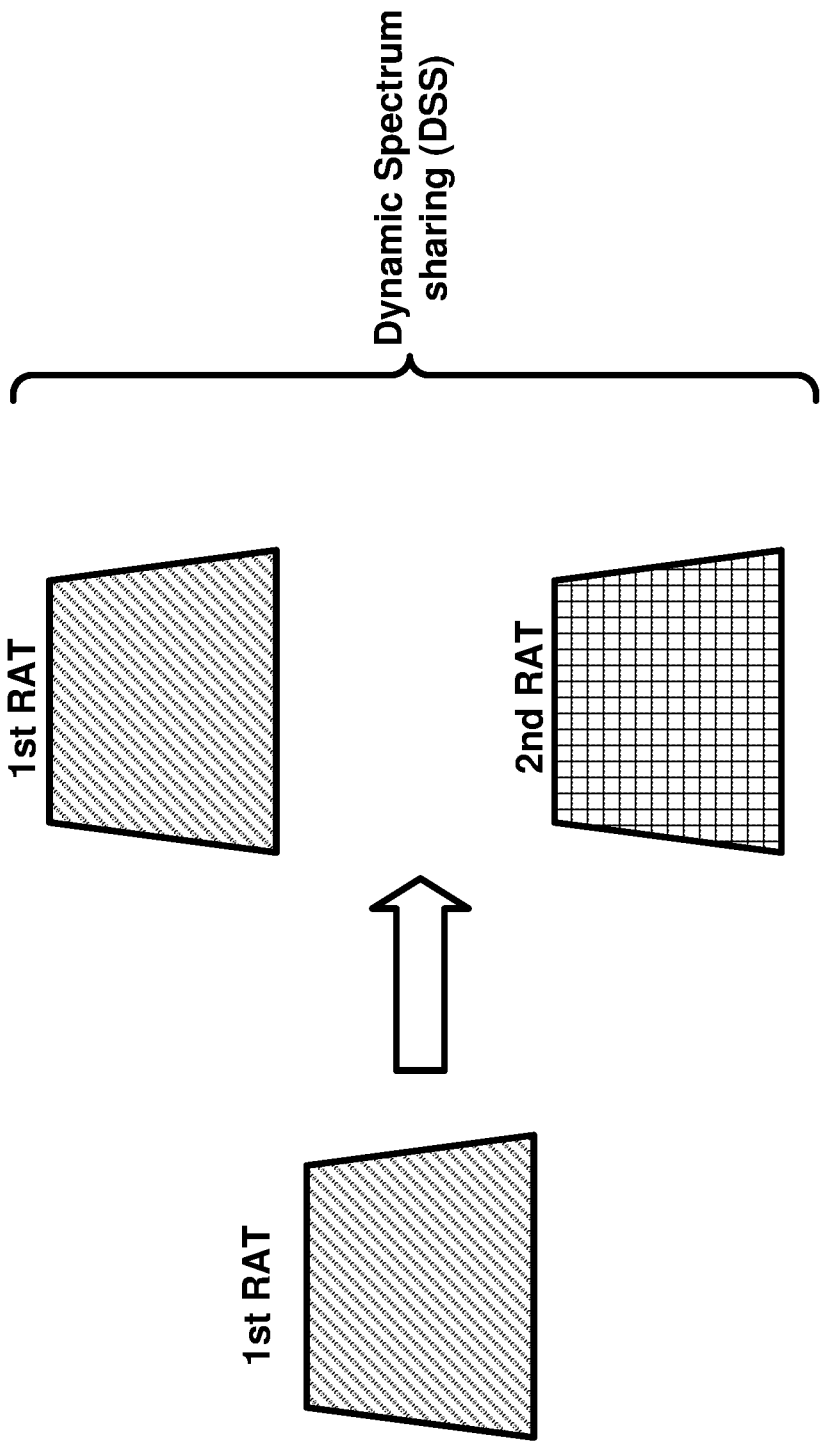
FIG. 17 shows an example dynamic spectrum sharing (DSS) in accordance with several of various embodiments of the present disclosure.

With the introduction of new generations of mobile communications, coexistence of multiple communication systems with different radio access technologies in the same frequency band is important. To improve efficiency, different radio access technologies (for example LTE and NR) may dynamically share the spectrum using dynamic spectrum sharing (DSS). Different frequency bands, particularly in lower frequency ranges, may use DSS. As shown in FIG. 17, with dynamic spectrum sharing, each radio access technology may retain the full bandwidth and corresponding peak data rates for each technology. Furthermore, the overall spectrum capacity may be dynamically assigned to match the traffic conditions on each technology. For example, LTE/NR spectrum coexistence may be achieved based on dynamic scheduling of both LTE and NR. Example NR features that enable LTE/NR spectrum coexistence include availability of the LTE-compatible 15 kHz NR numerology that allows for LTE and NR to operate on a common time/frequency grid; the possibility to define reserved resources based on bitmaps; and the possibility for NR PDSCH mapping to avoid resource elements corresponding to LTE cell-specific reference signals.

In an example, coexistence between LTE and NR may be in both downlink and uplink. In an example, coexistence between LT and NR may be uplink-only coexistence. An example use case for uplink-only coexistence may be the deployment of a supplementary uplink carrier. An example coexistence in the uplink direction may be based on scheduling coordination/constraints. NR and LTE uplink scheduling may be coordinated to avoid collision between LTE and NR PUSCH transmissions. The NR scheduler may be constrained to avoid resources used for LTE uplink layer 1 control signaling (PUCCH) and vice versa. Depending on the level of interaction between the eNB and gNB, such coordination and constraints may be more or less dynamic.

Scheduling coordination may also be used to avoid collision between scheduled LTE and NR transmissions. The LTE downlink may include several non-scheduled always-on signals that may not be readily scheduled around. Example such signals include: the LTE PSS and SSS, which may be transmitted over two OFDM symbols and six resource blocks in the frequency domain once every fifth subframe; the LTE PBCH, which may be transmitted over four OFDM symbols and six resource blocks in the frequency domain once every frame; and the LTE CRS, which may be transmitted regularly in the frequency domain and in four or six symbols in every subframe depending on the number of CRS antenna ports. In an example, NR PDSCH may be rate matched around these signals. Rate matching around the LTE PSS/SSS may be done by defining reserved resources according to bitmaps. For example, a single reserved resource given by a {bitmap-1, bitmap-2, bitmap-3} triplet may be defined as follows: a bitmap-1 of a length equal to the number of NR resource blocks in the frequency domain, indicating the six resource blocks within which LTE PSS and SSS are transmitted; a bitmap-2 of length 14 (one slot), indicating the two OFDM symbols within which the PSS and SSS are transmitted within an LTE subframe; a bitmap-3 of length 10 indicating the two subframes within which the PSS and SSS are transmitted within a 10 ms frame. In an example, similar approach may be used to rate match around the LTE PBCH. In an example, PDSCH may be rate matched around resource elements corresponding to CRS of an overlaid LTE carrier.

Figure 18B:
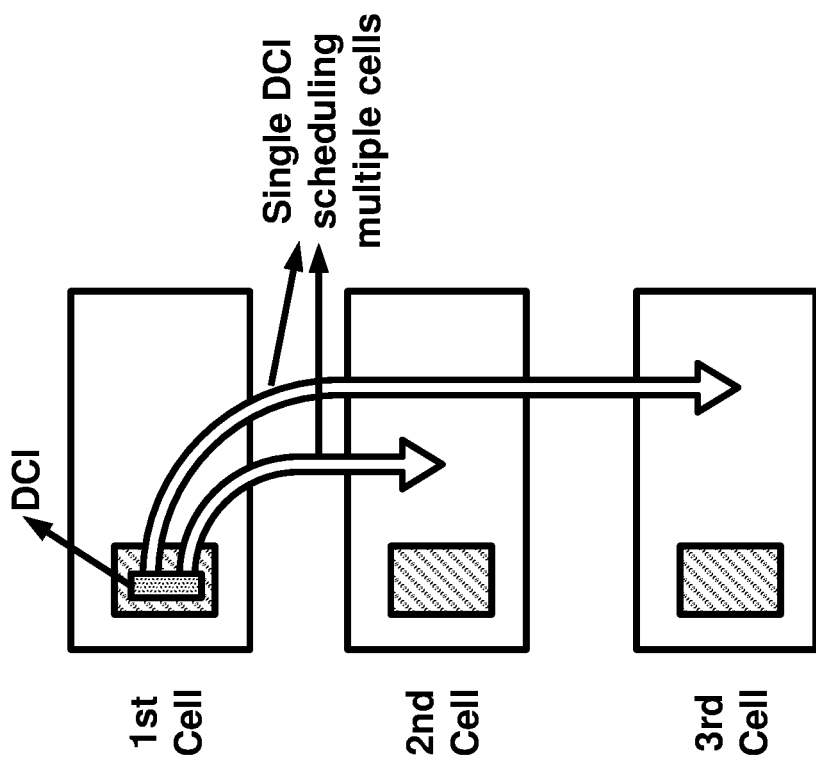
FIG. 18A and FIG. 18B show example cross-carrier scheduling in accordance with several of various embodiments of the present disclosure.
Figure 18A:
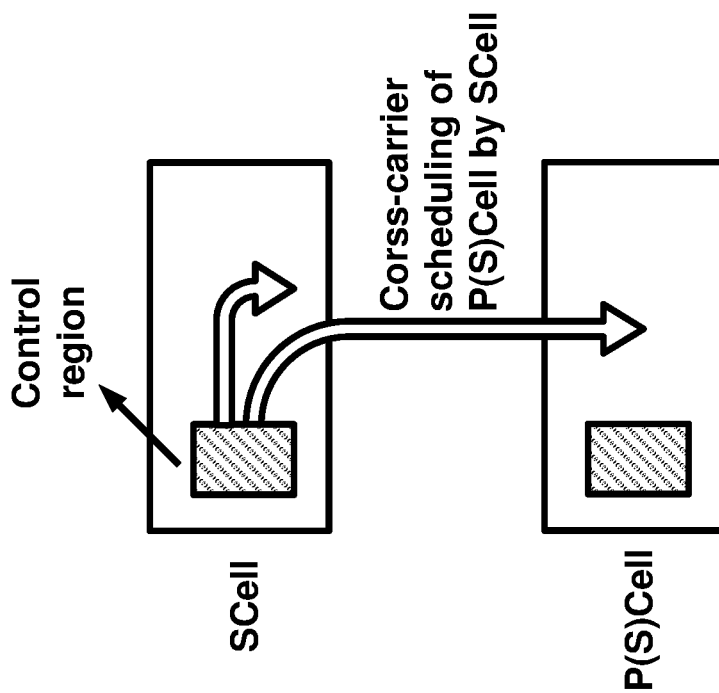

In an example, with carrier aggregation, a DSS cell (e.g., a cell that is dynamically shared between multiple RATs such as LTE and NR) may be a PCell or a SCell. With dynamic spectrum sharing on a DSS cell (e.g., a DSS PCell), the scheduling capacity for NR UEs on the DSS cell may be limited. In an example as shown in FIG. 18A, a SCell (e.g., a non-DSS SCell) may schedule uplink or downlink transmissions (e.g., PDSCH or PUSCH) on PCell (e.g., a DSS PCell). The wireless device may receive downlink control information, for example, indicating downlink assignments or uplink grants on the PCell. In an example as shown in FIG. 18B, to enable PDCCH overhead reduction, a single PDCCH may schedule multiple cells.

In an example, a PDCCH of SCell may schedule PDSCH or PUSCH on P(S)Cell. In an example, PDCCH of P(S)Cell/SCell may schedule PDSCH on multiple cells using a single DCI. The scheduling of P(S)Cell by SCell or scheduling of PDSCH on multiple cells using a single DCI may not be specific to DSS and may be generally applicable to cross-carrier scheduling in carrier aggregation.

With carrier aggregation, a wireless device may be configured with a primary cell and one or more secondary cells. A primary cell may be an anchor cell that carries important uplink control information, and the secondary cells may be semi-statically configured and dynamically activated or deactivated based on capacity demands. In some scenarios, such as dynamic spectrum sharing, a primary cell for one radio access technology (such as NR) may be dynamically shared with a different radio access technology (such as LTE) leading to control channel capacity issues. Existing solutions for the control channel capacity issues include cross-carrier scheduling of a primary cell by a secondary cell. Existing carrier aggregation processes when a primary cell is scheduled by a secondary cell may lead to inefficient uplink and downlink scheduling, inefficient bandwidth part operation and inefficiency of random access processes. There is a need to enhance the existing carrier aggregation processes. Example embodiments enhance the existing carrier aggregation processes.

In an example, a wireless device may receive one or more messages comprising configuration parameters. The one or more messages may comprise one or more RRC messages. The one or more messages may comprise configuration parameters of a plurality of cells. The plurality of cells may comprise a primary cell and one or more secondary cells. The plurality of cells may be provided using a carrier aggregation mechanism. The cells in the plurality of cells may be aggregated using intra-band carrier aggregation or inter-band carrier aggregations. In an example, the plurality of cells may correspond to one or more frequency bands. A cell in the plurality of cells may be a dynamic spectrum sharing (DSS) cell, wherein a plurality of radio access technologies (RATs, such as LTE and NR) may share and use the DSS cell using dynamic scheduling and/or other coexistence mechanisms. The DSS may be a primary cell or a secondary cell.

In an example, the plurality of cells may comprise a plurality of cell groups. The plurality of cell groups may be provided by a plurality of base stations. The plurality of base stations may comprise a master base station and one or more secondary base stations. In an example, the master base station may configure the wireless device with the plurality of cell groups. A cell group, in the plurality of cell groups, may be provided by a base station. A cell group provided by a secondary base station (e.g., a secondary cell group (SCG)) may comprise a primary secondary cell (PSCell) and one or more secondary cells. A cell in the SCG (e.g., a PSCell or a SCell) may be a DSS cell.

In an example, the configuration parameters may indicate whether a cell is a self-scheduling cell or whether the cell is cross-carrier scheduled by another cell. The configuration parameters of a cell may comprise a first parameter indicating a choice between self-scheduling or cross-carrier scheduling wherein, for the case of cross-carrier scheduling, a serving cell index of the scheduling cell may be indicated by the configuration parameters. In an example, the configuration parameters may indicate whether a cell cross-carrier schedules another cell.

In an example, the configuration parameters of a cell may comprise PDCCH configuration parameters. The PDCCH configuration parameters may comprise CORESET configuration and search space configuration parameters of CORESETs and search spaces for the cell. The CORESET configuration parameters may frequency domain resources of a CORESET, a time duration of CORESET in number of symbols, an identifier of the CORESET, etc. The search space configuration parameters may indicate configuration parameters for monitoring the search space for downlink control information, for example, a monitoring slot periodicity and offset parameter, a duration parameter, a parameter indicating a monitoring symbol within a slot, a search space type (e.g., common vs. UE specific), an identifier of the search space, etc.

In an example, the configuration parameters may comprise a SCell deactivation timer of a secondary cell. For example, configuration of a serving cell may comprise a sCellDeactivationTimer parameter indicating a deactivation timer value for the SCell. The deactivation timer value for the SCell may be in terms of milliseconds. The wireless device may start a deactivation timer for a SCell, with a configured deactivation timer value for the SCell, based on one or more conditions (e.g., receiving an uplink grant or downlink assignment on/for the SCell, etc.). The wireless device may deactivate a SCell for which a corresponding SCell deactivation timer is expired.

Figure 19:
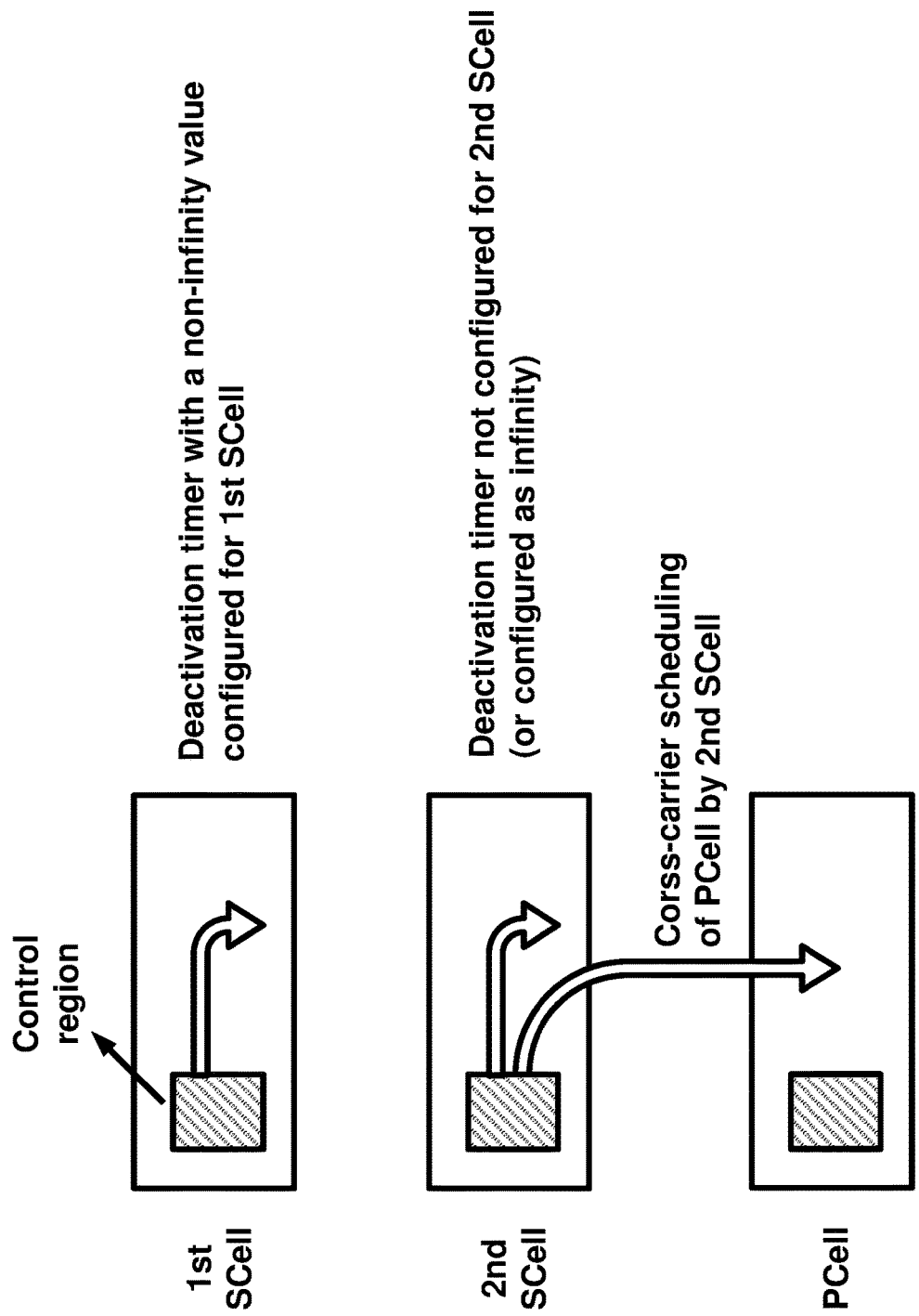
FIG. 19 shows an example process for cell deactivation timer configuration in accordance with several of various embodiments of the present disclosure.

In an example embodiment as shown in FIG. 19, a wireless device may receive configuration parameters of a plurality of cells comprising a primary cell and a secondary cell. The primary cell and the secondary cell may be in a same cell group (e.g., MCG or SCG). For example, the primary cell and the secondary cell may be in an MCG (cell group provided by a master base station). For example, the primary cell and the secondary cell may be in a SCG (cell group provided by a secondary base station) and the primary cell may be a primary secondary cell (PSCell). In an example, the primary cell and the secondary cell may be in different frequency bands and may be aggregated using inter-band carrier aggregation. In an example, the primary cell may be a DSS cell and may be shared by a different radio access technology (e.g., LTE).

The configuration parameters may indicate that the secondary cell is a scheduling cell for the primary cell or may indicate that the secondary cell is not a scheduling cell for the primary cell or may not indicate that the secondary cell is a scheduling cell for the primary cell. For example, the configuration parameters of the primary cell may comprise a first parameter indicating that the secondary cell is a scheduling cell for the primary cell or is not a scheduling cell for the primary cell. The first parameter may indicate, for example, a serving cell index if the secondary cell as a scheduling cell for the primary cell. In an example the configuration parameters of the secondary cell may indicate that the secondary cell is a scheduling cell for the primary cell or is not a scheduling cell for the primary cell. For example, the configuration parameters of the secondary cell may comprise a second parameter indicating that the secondary cell is a scheduling cell for the primary cell or is not a scheduling cell for the primary cell. In an example, configuration parameters may implicitly indicate that the secondary cell is or is not a scheduling cell for the primary cell based on one or more configurations on the secondary cell (e.g., configuration of one or more CORESETs/search spaces, etc.). In an example, the base station may dynamically indicate (e.g., by using physical layer downlink control signaling or MAC layer signaling) that the secondary cell is a scheduling cell for the primary cell. For example, a first DCI received on the secondary cell may comprise a field, a value of the field may indicate that scheduling information in the first DCI is for the primary cell. For example, the secondary cell may be the scheduling cell for the primary cell until reception of a second DCI on a second secondary cell comprising scheduling information for the primary cell.

Based on the secondary cell being configured as a scheduling cell for the primary cell or not configured as a scheduling cell for the primary cell, the secondary cell may be configured with a deactivation timer value or not. For example, based on the configuration parameters indicating that the secondary cell is a scheduling cell for the primary cell or is not a scheduling cell for the primary cell (e.g., do not indicate that the secondary cell is a scheduling cell for the primary cell), the configuration parameters may indicate a deactivation timer for the secondary cell or may not indicate a deactivation timer for the secondary cell. For example, based on the configuration parameters indicating that the secondary cell is a scheduling cell for the primary cell or is not a scheduling cell for the primary cell (e.g., do not indicate that the secondary cell is a scheduling cell for the primary cell), the configuration parameters may indicate a non-infinity deactivation timer value for the secondary cell or may indicate an infinity deactivation timer value for the secondary cell.

In an example embodiment, based on the secondary cell being configured as a scheduling cell for the primary cell, the secondary cell may not be configured with a deactivation timer value. For example, based on the configuration parameters indicating that the secondary cell is a scheduling cell for the primary cell, the configuration parameters may not indicate a deactivation timer for the secondary cell. For example, based on the configuration parameters indicating that the secondary cell is a scheduling cell for the primary cell, the configuration parameters may indicate an infinity deactivation timer value for the secondary cell.

In an example, the configuration parameters may indicate one or more search spaces on the secondary cell. The one or more search spaces on the secondary cell may be for receiving downlink control information used for resource assignment on the primary cell. The resource assignment may be for an uplink transmission, for example, via a physical shared channel or the resource assignment may be for a downlink reception, for example, via a physical downlink shared channel. In an example, the wireless device may determine that the one or more search spaces are for receiving resource assignment on the primary cell based on the configuration parameters of the one or more search spaces, for example, based on one or more identifiers of the one or more search spaces. In an example, the wireless device may determine that the secondary cell is a scheduling cell for the primary cell based on the configuration of the one or more search spaces on the secondary cell.

In an example, a first search space of the secondary cell and a second search space of the primary cell with the same search space identifiers may be linked to each other. The wireless device may apply the search space for the scheduled cell (e.g., the primary cell) if the DL BWPs in which the linked search spaces are configured in scheduling cell (e.g., the secondary cell) and scheduled cell (e.g., the primary cell) are both active.

In an example, the wireless device may receive a reconfiguration message (e.g., an RRC reconfiguration message) indicating reconfiguration of one or more parameters. For example, the reconfiguration message may indicate a reconfiguration of a primary cell. For example, the reconfiguration message may indicate reconfiguration of/changing a primary cell from a first serving cell to a second serving cell. The reconfiguration message may further indicate a deactivation timer for the secondary cell based on the secondary cell not being a scheduling cell for the second serving cell (the new primary cell). In an example, the reconfiguration message may indicate that the secondary cell remains a scheduling cell for the second secondary cell (the new primary cell). In an example, the configuration parameters (e.g., the configuration parameters of the secondary cell) may indicate that the secondary cell is a scheduling cell for the primary cell regardless of the primary cell and may remain the scheduling cell for the primary cell when the primary cell is changed/reconfigured.

In an example, the wireless device may receive a downlink control information on the secondary cell. The DCI may indicate an uplink grant or a downlink assignment for transmission or reception of a transport block on the primary cell, respectively. The wireless device may monitor one or more CORESETs/search spaces on the secondary cell for receiving a DCI comprising a resource assignment for the primary cell based on the secondary cell being configured as a scheduling cell for the primary cell. In an example, a field of the DCI (e.g., a carrier indicator field or one or more bits of a carrier indicator field) may indicate that the DCI is for cross-carrier scheduling of the primary cell. The wireless device may determine that the DCI is for cross-carrier scheduling of the primary cell based on the value of the field. In an example, an RNTI associated with the DCI may indicate that the DCI is for cross-carrier scheduling of the primary cell. The wireless device may determine that the DCI is for cross-carrier scheduling of the primary cell based on the RNTI associated with the DCI. In an example, a search space/CORESET configured for the secondary cell may be configured for receiving DCI indicating cross-carrier scheduling of the primary cell. The wireless device may determine that a received DCI is for cross-carrier carrier scheduling of the primary cell based on the receiving the DCI in the search space/CORESET of the secondary cell configured for cross-carrier scheduling of the primary cell. The wireless device may transmit or receive a transport block on the primary cell based on the DCI.

Figure 20:
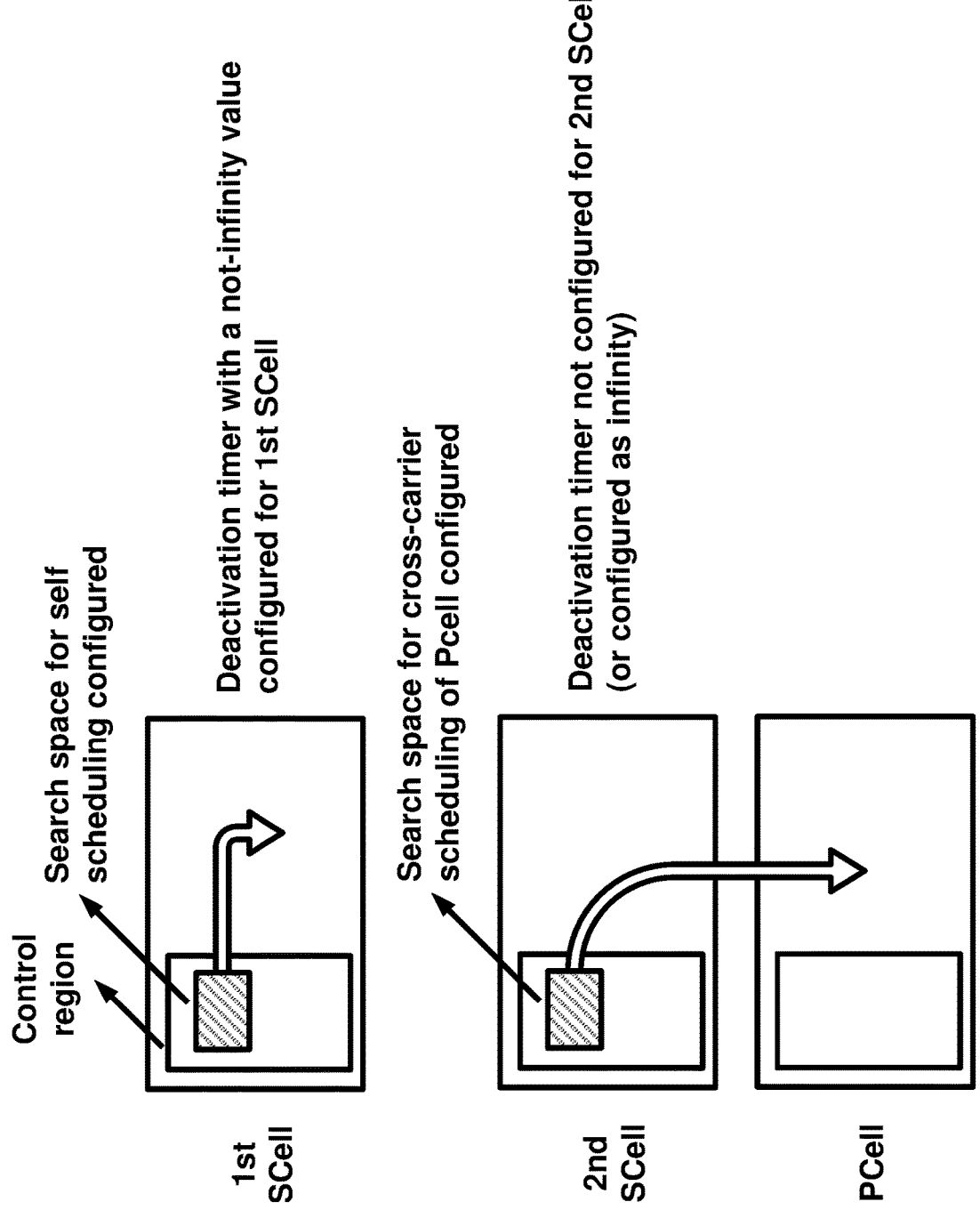
FIG. 20 shows an example process for cell deactivation timer configuration in accordance with several of various embodiments of the present disclosure.

In an example embodiment as shown in FIG. 20, based on the configuration parameters comprising or not comprising first configuration parameters of one or more search spaces on the secondary cell for receiving control signaling related to uplink transmissions/downlink receptions on the primary cell, the secondary cell may be configured with a deactivation timer value or not. For example, based on the configuration parameters comprising or not comprising first configuration parameters of one or more search spaces on the secondary cell for receiving control signaling related to uplink transmissions/downlink receptions on the primary cell, the configuration parameters may indicate a non-infinity deactivation timer value for the secondary cell or may indicate an infinity deactivation timer value for the secondary cell.

In an example embodiment, based on the configuration parameters comprising first configuration parameters of one or more search spaces on the secondary cell for receiving control signaling related to uplink transmissions/downlink receptions on the primary cell, the secondary cell may not be configured with a deactivation timer value. For example, based on the configuration parameters comprising first configuration parameters of one or more search spaces on the secondary cell for receiving control signaling related to uplink transmissions/downlink receptions on the primary cell, the configuration parameters may indicate an infinity deactivation timer value for the secondary cell.

Figure 22:
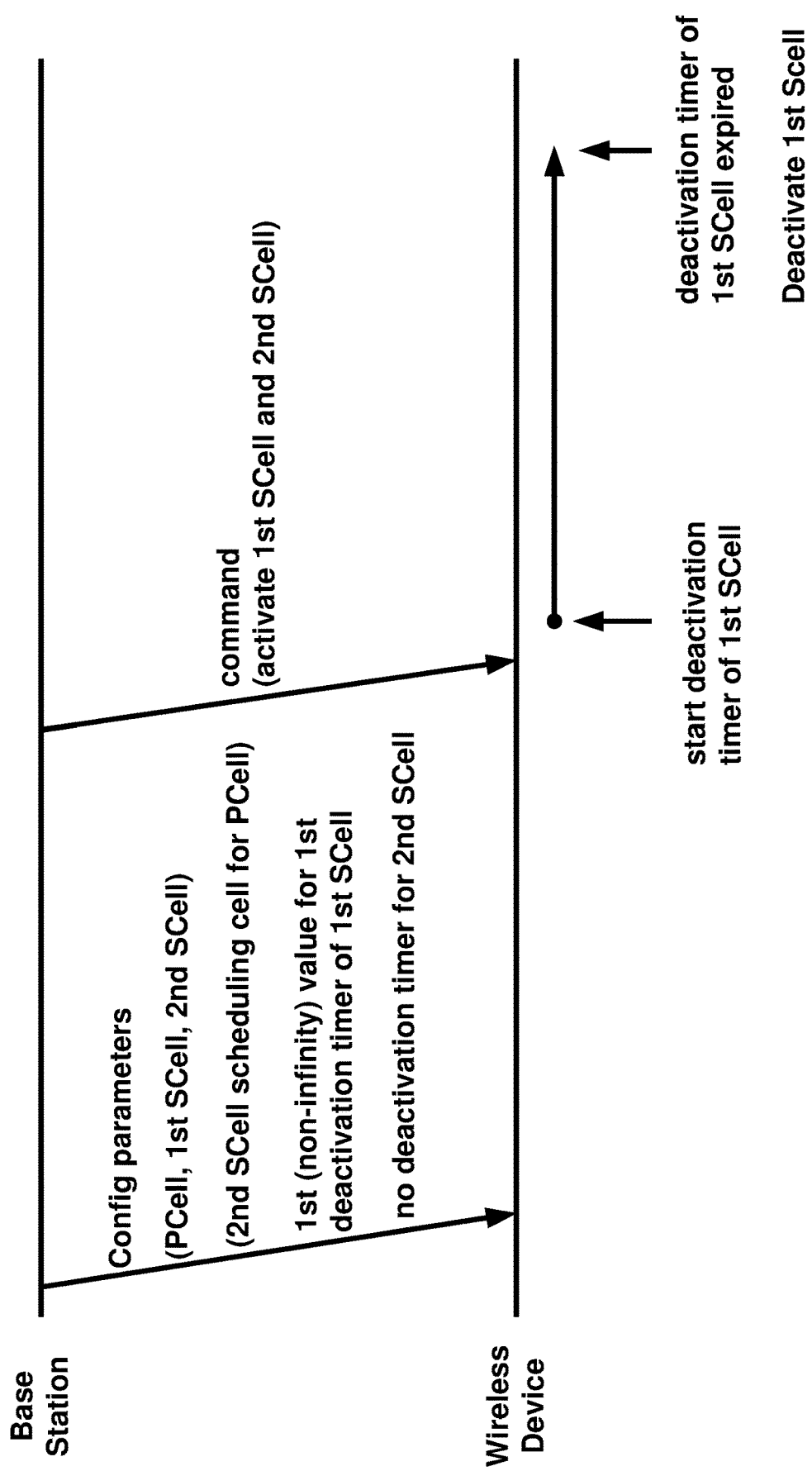
FIG. 22 shows an example process in accordance with several of various embodiments of the present disclosure.

In an example embodiment as shown in FIG. 22, a wireless device may receive configuration parameters of a primary cell, a first secondary cell and a second secondary cell. In an example, the primary cell, the first secondary cell and the second secondary cell may be in a first cell group. In an example, the first cell group may be an MCG. In an example, the first cell group may be a SCG and the primary cell may be a primary secondary cell (PSCell).

The first secondary cell may be configured for self-scheduling or cross-carrier scheduling. The configuration parameters of the first secondary cell may comprise a parameter indicating a choice between self-scheduling or cross-carrier scheduling. In case of cross-carrier scheduling, the parameter may indicate a serving cell identifier of a scheduling cell for the first secondary cell. The first secondary cell may not be configured as a scheduling cell for the primary cell. In an example, the first secondary cell may be a scheduling cell for a secondary cell but not a scheduling cell for the primary cell. Based on the first secondary cell not being configured as a scheduling cell for the primary cell, the configuration parameters may indicate a first (non-infinity) value for a first deactivation timer of the first secondary cell.

The second secondary cell may be configured as a scheduling cell for the primary cell. In an example, the configuration parameters of the second secondary cell may comprise one or more first parameters indicating that the secondary cell is a scheduling cell for the primary cell. In an example, the one or more first parameters may indicate one or more search spaces on the second secondary cell for receiving scheduling information for the primary cell. In an example, the configuration parameters of the primary cell may comprise one or more second parameters indicating that the second secondary cell is a scheduling cell for the primary cell. In an example, the one or more second parameters may indicate an identifier (e.g., a serving cell identifier) of the second secondary cell.

Based on the second secondary cell being configured as a scheduling cell for the primary cell, the configuration parameters may not indicate (e.g., may indicate no) deactivation timer for the second secondary cell. Based on the second secondary cell being configured as a scheduling cell for the primary cell, the secondary cell may not be configured with a deactivation timer. In an example, based on the second secondary cell being configured as a scheduling cell for the primary cell and based on the primary cell being in a first frequency band, the secondary cell may not be configured with a deactivation timer. For example, based on the second secondary cell being configured as a scheduling cell for the primary cell, the configuration parameters may indicate a second value set/configured to infinity for a second deactivation timer of the second secondary cell. In an example, based on the second secondary cell being configured as a scheduling cell for the primary cell and based on the primary cell being in a first frequency band, the configuration parameters may indicate a second value set/configured to infinity for a second deactivation timer of the second secondary cell. In an example, the first frequency band may be a dynamic spectrum sharing (DSS) and the primary cell may be shared between multiple radio access technologies (such as NR and LET).

In an example, the wireless device may receive a command indicating activation of first secondary cell. In an example, the command may be received via a MAC CE (e.g., a cell activation/deactivation MAC CE). The wireless device may start a cell deactivation timer of the first secondary cell based on the receiving the command. The wireless device may deactivate the first secondary cell based on the deactivation timer of the first secondary cell expiring.

In an example the wireless device may receive one or more commands indicating activation of the first secondary cell and the second secondary cell. For example, a first field in an activation command may indicate activation of the first secondary cell and a second field in the activation command may indicate activation of the secondary cell. In an example, a first activation command may indicate activation of the first secondary cell and a second activation command may indicate activation of the second secondary cell. The wireless device may start a deactivation timer of the first secondary cell based on the receiving the one or more commands. The wireless device may not start a deactivation timer for the second secondary cell based on the receiving the one or more commands. The wireless device may deactivate the first secondary cell based on the deactivation timer expiring.

In an example, the second secondary cell may not be deactivated at least until the primary cell is not changed and or is not reconfigured. The wireless device may receive a reconfiguration message indicating reconfiguration of the primary cell. The reconfiguration message may comprise reconfiguration of one or more parameters of the primary cell. In an example, the reconfiguration message may indicate changing the primary cell from a first serving cell to a second serving cell. In an example, the reconfiguration message may indicate that the second secondary cell is not a scheduling cell for the primary cell. The reconfiguration message may comprise a deactivation timer of the second secondary cell based on the reconfiguration of the primary cell.

In an example, the configuration parameters may comprise one or more parameters indicating that the second secondary cell is a scheduling cell for the primary cell. For example, the configuration parameters of the second secondary cell may comprise a first parameter indicating that the second secondary cell is a scheduling cell for the primary cell. In an example, the configuration parameters of primary cell may comprise a second parameter indicating that the second secondary cell is a scheduling cell for the primary cell. For example, the second parameter may indicate a serving cell identifier of the second secondary cell as a scheduling cell for the primary cell. The one or more parameters may indicate that the second secondary cell is configured with one or more search spaces/CORESETs for receiving resource assignment for the primary cell.

In an example, the configuration parameters may indicate one or more first search spaces/CORESETs, of one or more search spaces/CORESETs, on the second secondary cell for receiving a resource assignment on the primary cell.

In an example, the configuration parameters may further indicate one or more second search spaces/CORESETs, of one or more search spaces/CORESETs, on the second secondary cell for receiving a resource assignment on a serving cell other than a primary cell.

In an example, the wireless device may receive a downlink control information on the second secondary cell indicating resource assignment for the primary cell. For example, the downlink control information may indicate a downlink resource assignment for receiving a transport block (e.g., via a physical downlink shared channel) on the primary cell. For example, the downlink control information may indicate an uplink grant for transmission of a transport block (e.g., via a physical uplink shared channel) on the primary cell.

In an example, the configuration parameters may indicate that the second secondary cell is configured with one or more common search spaces. The one or more common search spaces may comprise at least one of: a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control commands for SRS).

Figure 21:
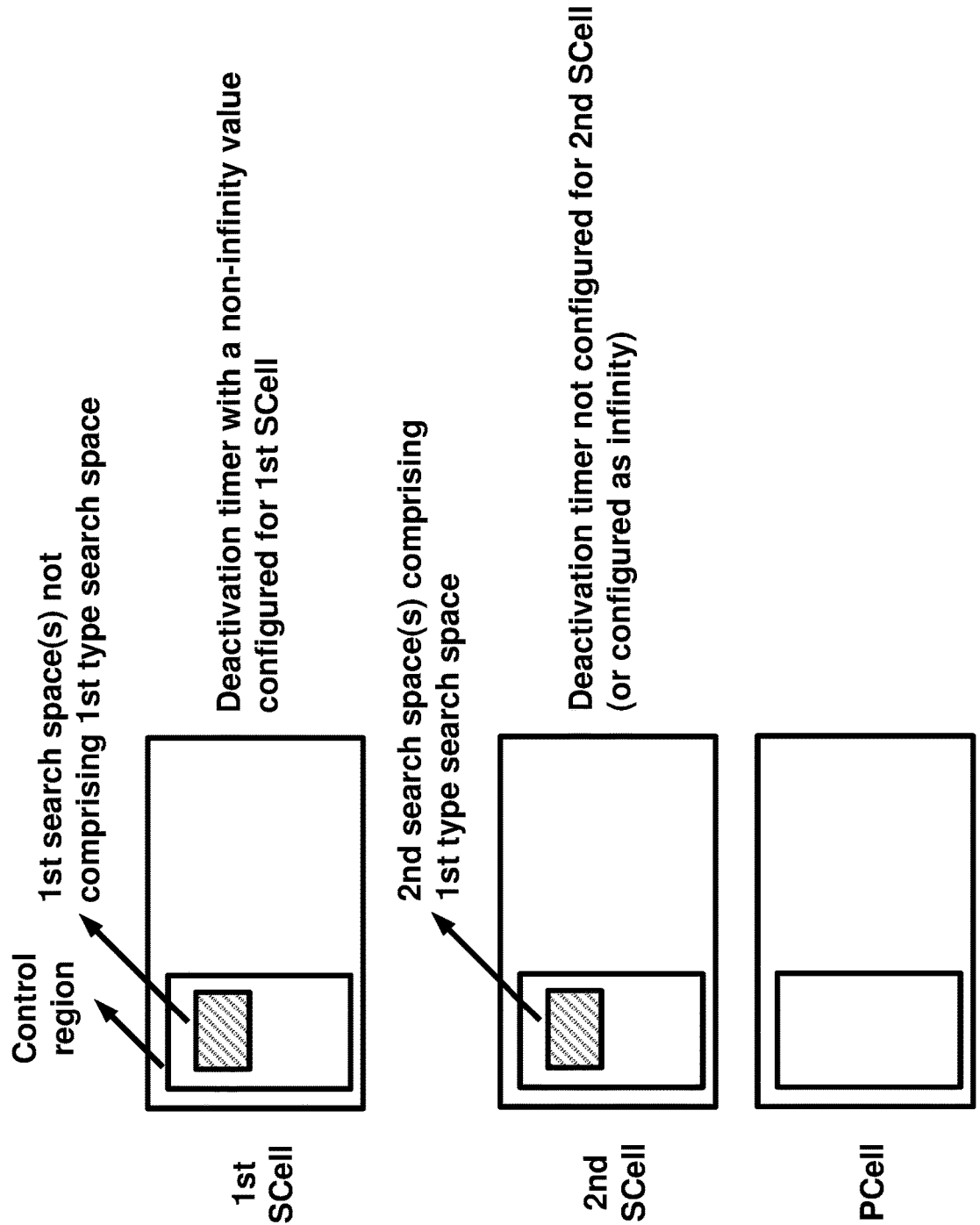
FIG. 21 shows an example process for cell deactivation timer configuration in accordance with several of various embodiments of the present disclosure.
Figure 24:
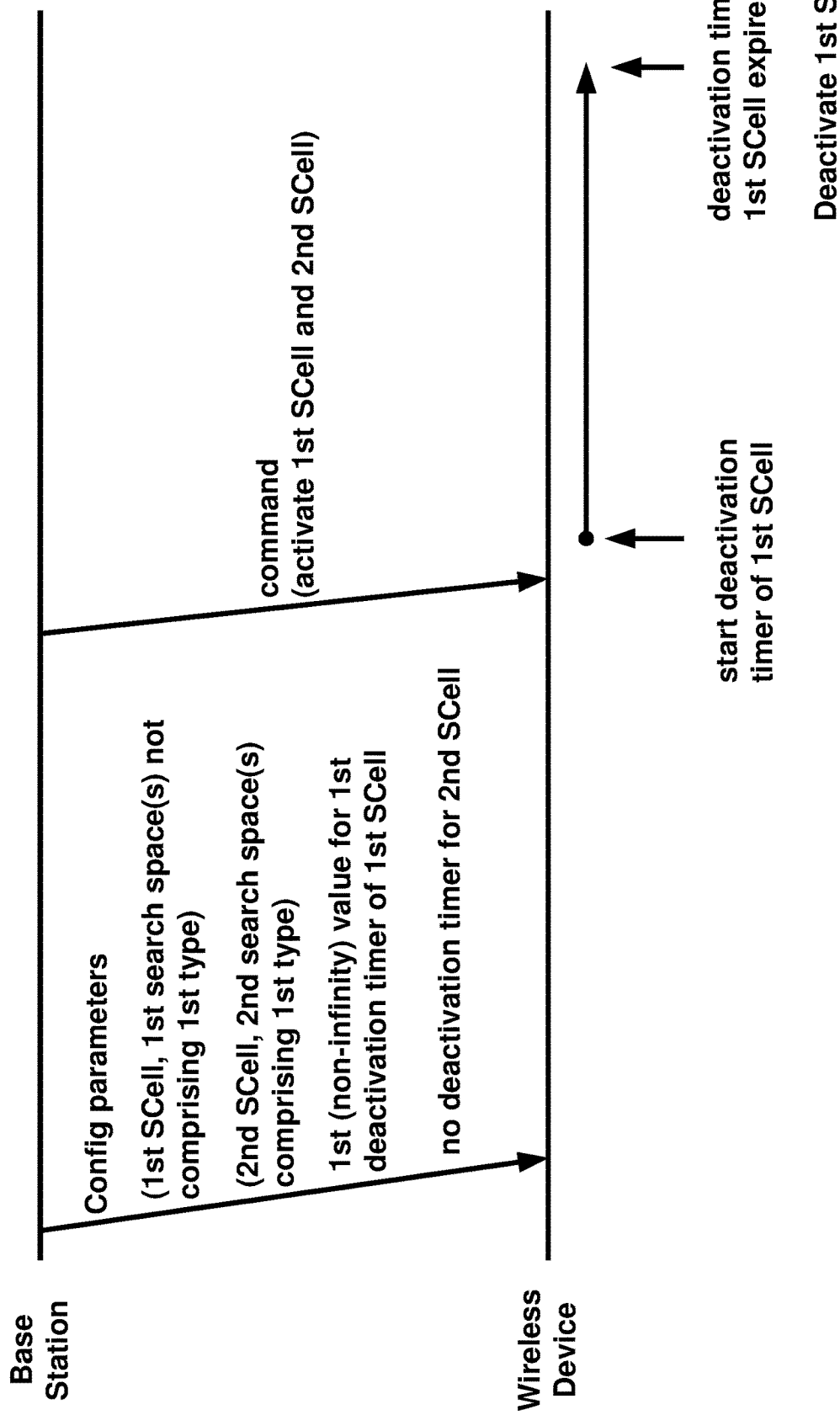
FIG. 24 shows an example process in accordance with several of various embodiments of the present disclosure.

In an example embodiment as shown in FIG. 21 and FIG. 24, a wireless device may receive one or more messages comprising first configuration parameters, of a first secondary cell and a second secondary cell, and cell activation/deactivation configuration parameters. The first configuration parameters may indicate one or more first search spaces on the first secondary cell and one or more second search spaces for the second secondary cell. In an example, the one or more first search spaces may comprise one or more common search space. In an example, the one or more first search spaces may comprise one or more UE-specific search spaces. In an example, the one or more second search spaces may comprise one or more common search space. In an example, the one or more second search spaces may comprise one or more UE-specific search spaces. In an example, the first configuration parameters may indicate one or more first identifiers of the one or more first search spaces and one or more second identifiers of the one or more second search spaces.

In an example, the one or more messages may further comprise third configuration parameters of a primary cell. The one or more messages may comprise one or more parameters indicating that the wireless device is configured to receive scheduling information for the primary cell via the second secondary cell.

In an example, the configuration parameters may comprise search space type parameters indicating types of search spaces for the one or more first search spaces and the one or more second search spaces. In an example the wireless device may determine whether a secondary cell is of a first type based on configuration of search spaces and/or their types for the secondary cell. For example, based on the secondary cell having a first type or being configured with a first type of search space or being configured as a scheduling cell for the primary cell, the wireless device may keep the secondary cell as active and/or may not start a deactivation timer for the secondary cell or may not be configured with a deactivation timer for the secondary cell. In an example, based on receiving a reconfiguration message indicating reconfiguration of the secondary cell as a first type of secondary cell (e.g., secondary cell with a first type of search space or as a scheduling cell for the primary cell), the wireless device may stop a deactivation timer of the secondary cell.

The one or more first search spaces may not comprise a first type of search space. In an example, the first type of search space may be a common search space. In an example, the first type of search space may be a common search space for receiving downlink control information indicating downlink assignment for receiving random access responses corresponding to one or more random access processes. In an example the first type of search space may be at least one of: a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control commands for SRS).

Based on the one or more first search spaces not comprising the first type of search space, the cell activation/deactivation configuration parameters may comprise a first non-infinity value for a first deactivation timer of the first secondary cell. The one or more second search spaces may comprise the first type of search space. Based on the one or more second search spaces comprising the first type of search space, the cell activation/deactivation configuration parameters may not comprise a deactivation timer for the second secondary cell. In an example, based on the one or more second search spaces comprising the first type of search space, the cell activation/deactivation configuration parameters may comprise an infinity deactivation timer value for the second secondary cell. In an example, further based on the wireless device being configured to receive the scheduling information for the primary cell via the second secondary cell, the cell activation/deactivation configuration parameters may not comprise a deactivation timer value for the second secondary cell or may comprise an infinity deactivation timer value for the second secondary cell.

In an example, the wireless device may receive a command indicating activation of the first secondary cell. The command may be received via a cell activation/deactivation MAC CE. For example, the cell activation/deactivation MAC CE may comprise a field, the value of field may indicate that the cell is deactivated. The wireless device may start a deactivation timer of the first secondary cell based on the receiving the command. The wireless device may deactivate the first secondary cell based on the first deactivation timer of the first secondary cell expiring.

Figure 23:
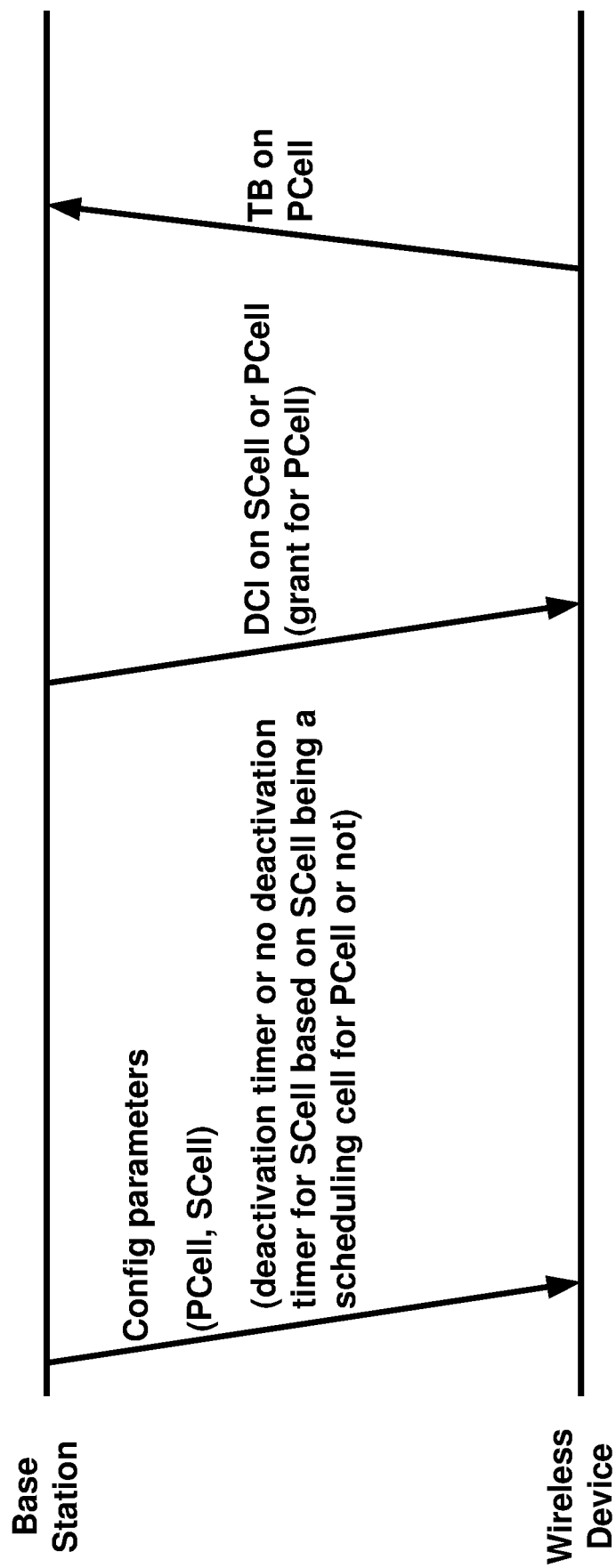
FIG. 23 shows an example process in accordance with several of various embodiments of the present disclosure.

In an example embodiment as shown in FIG. 23, a wireless device may receive configuration parameters of a plurality of cells comprising a primary cell and a secondary cell. The configuration parameters may not indicate that the secondary cell and/or one or more search spaces of the secondary cell is used for receiving downlink control information for uplink or downlink scheduling of the primary cell. For example, the configuration parameters may indicate that the secondary cell or a search space of the secondary cell is not used for scheduling of the primary cell. Based on the configuration parameters not indicating that the secondary cell and/or one or more search spaces of the secondary cell is used for receiving downlink control information for uplink or downlink scheduling of the primary cell or indicating that the secondary cell or a search space of the secondary cell is not used for scheduling of the primary cell, the configuration parameters may comprise a non-infinity deactivation timer value for the secondary cell. Otherwise, based on the configuration parameters indicating that the secondary cell and/or one or more search spaces of the secondary cell is used for receiving downlink control information for uplink or downlink scheduling of the primary cell or indicating that the secondary cell or a search space of the secondary cell is used for scheduling of the primary cell, the configuration parameters may comprise an infinity deactivation timer value for the secondary cell.

The wireless device may receive a downlink control information for scheduling transmission of a transport block on the primary cell. The wireless device may receive the downlink control information on the primary cell or the secondary cell (e.g., in case the secondary cell is configured as a scheduling cell for the primary cell) based on the configuration parameters. The wireless device may transmit the transport block based on the downlink control information.

Figure 25:
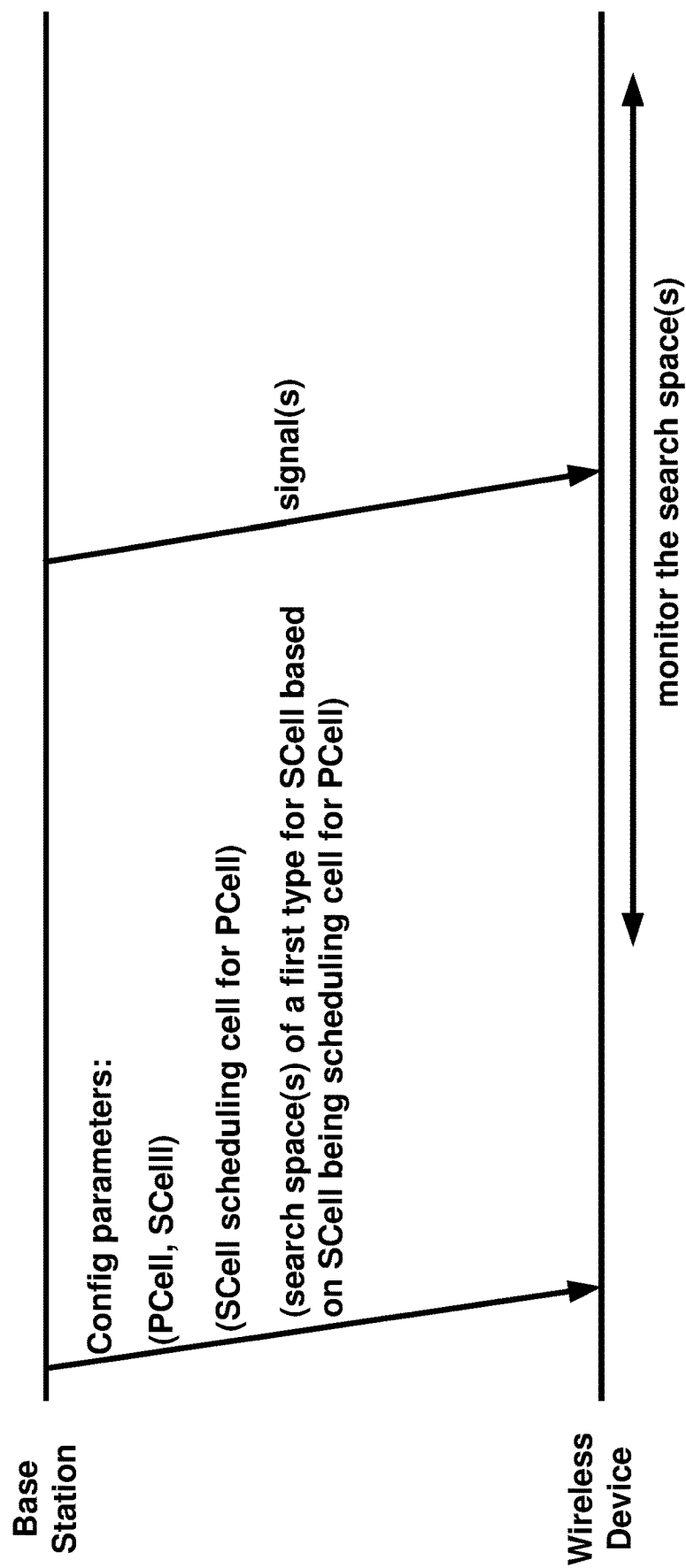
FIG. 25 shows an example process in accordance with several of various embodiments of the present disclosure.

In an example embodiment as shown in FIG. 25, a wireless device may receive configuration parameters of a primary cell and a secondary cell. The configuration parameters may indicate the secondary cell is a scheduling cell for the primary cell. Based on the secondary cell being configured as a scheduling cell for the primary cell, the configuration parameters may indicate one or more search spaces of a first type for the secondary cell. The wireless device may not expect to be configured without one or more search spaces of a first type for the secondary cell based on the secondary cell being configured as a scheduling cell for the primary cell. The base station may transmit, to the wireless device, configuration parameters of one or more search spaces of a first type for the secondary cell based on configuring the secondary cell as a scheduling cell for the primary cell.

In an example, the first type of the one or more search spaces may be common search space. In an example, the one or more search spaces may comprise at least one of: a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control commands for SRS).

The wireless device may monitor the one or more search spaces for a downlink control channel. The wireless device may receive one or more signals based on the monitoring. In an example, the one or more signals may comprise at least one of: system information, random access response in a random access process, a contention resolution message in a random access process, pre-emption/interruption indication, paging information, slot format information and group power control commands (e.g., for PUSCH, PUCCH and SRS).

Figure 26:
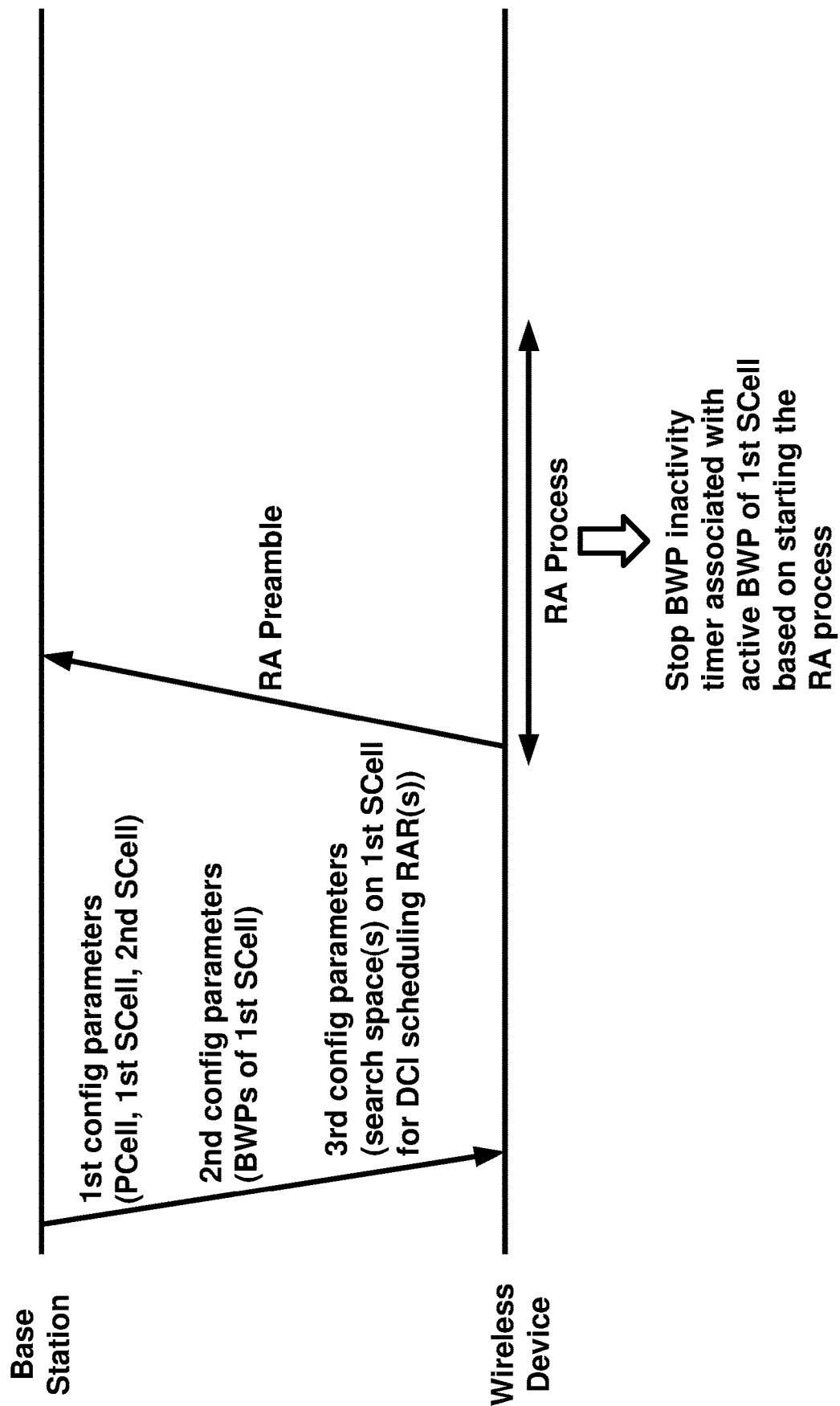
FIG. 26 shows an example process in accordance with several of various embodiments of the present disclosure.

In an example embodiment as shown in FIG. 26, a wireless device may receive one or more message comprising first configuration parameters, second configuration parameters and third configuration parameters. The first configuration parameters may be for a primary cell, a first secondary cell and a second secondary cell. The primary cell, the first secondary cell and the second secondary cells may be in the same cell group (e.g., an MCG or a SCG). The primary cell may be a PSCell based on the cell group being a SCG. The second configuration parameters may be for a plurality of bandwidth parts of the first secondary cell. The second configuration parameters may comprise bandwidth part inactivity timer values for the plurality of bandwidth parts of the first secondary cell. The third configuration parameters may be for one or more search spaces on the first secondary cell for receiving downlink assignments of one or more random access responses corresponding to one or more random access processes. The wireless device may start a random access process on the primary cell or on the second secondary cell. The wireless device may stop the bandwidth part inactivity timer associated with an active bandwidth part of the first secondary cell based on the starting the random access process and based on the one or more search spaces being configured for the first secondary cell.

In an example, the one or more messages may indicate that the one or more search spaces on the first secondary cell are for receiving downlink assignments of one or more random access responses corresponding to one or more random access processes on one or more cells. The one or more messages may indicate the one or more cells whose random access processes are associated with the first secondary cell. In an example, the one or more messages may indicate that random access processes on one or more first cells are associated with the first secondary cell and random access processes on one or more second cells are associated with a different cell (e.g., a different secondary cell or the primary cell). For example, the wireless device may receive downlink assignment for reception of random access responses for random access processes on the one or more first cells on the first secondary cell and downlink assignment for reception of random access responses for random access processes on the one or more second cells on a different cell.

In an example embodiment, a wireless device may receive configuration parameters of one or more search spaces on a secondary cell. The configuration parameters may be for receiving downlink assignment of one or more random access responses corresponding to one or more random access processes. In an example, the configuration parameters may indicate types of the one or more search spaces indicating that the one or more search spaces are for receiving the downlink assignment for the one or more random access responses. The wireless device may start a random access process. In an example, the random access process may be a contention-based random access process. In an example, the random access process may be a contention-free random access process. The wireless device may start the random access process on a serving cell other than the secondary cell (e.g., on a second secondary cell or on a primary cell). The wireless device may stop a bandwidth part inactivity timer associated with a first bandwidth part of the secondary cell based on the starting the random access process and based on the one or more search spaces being configured for the secondary cell.

In an example, the random access process may be for beam failure recovery. The one or more search spaces of the secondary cell may comprise a first search space for receiving random access response for beam failure recovery. The first search space may be associated with a beam failure recovery search space identifier. In an example, the configuration parameters may indicate the beam failure recovery search space identifier.

In an example embodiment, a wireless device may receive configuration parameters indicating that a secondary cell is configured to receive scheduling information for one or more random access responses associated with one or more random access processes. The wireless device may start a random access process on a serving cell other than the secondary cell (e.g., on a second secondary cell or on a primary cell). In an example, the random access process may be a contention-based random access process. In an example, the random access process may be a contention-free random access process. The wireless device may stop a bandwidth part inactivity timer associated with a first bandwidth part of the secondary cell based on the starting the random access process and based on the secondary cell being configured to receive the scheduling information for the one or more random access processes. In an example, the first bandwidth part may be a current active bandwidth part of the secondary cell.

In an example, the wireless device may receive a DCI indicating a downlink assignment or an uplink grant for the first bandwidth part of the secondary cell or on the first bandwidth part of the secondary cell. The random access process may be completed. The wireless device may start the bandwidth part inactivity timer of the first bandwidth part of the secondary cell based on the receiving the DCI and based on the random access process being completed. In an example, the wireless device may start the bandwidth part inactivity timer of the first bandwidth part of the secondary cell based on the receiving the DCI and based on the random access process being successfully completed. In an example, the wireless device may switch from the first bandwidth part of the secondary cell to a default bandwidth part of the secondary cell the bandwidth part inactivity timer of the first bandwidth part expiring.

In an example, the wireless device may receive a downlink control information indicating switching from a first bandwidth part of the secondary cell to a second bandwidth part of the secondary cell while the random access process is ongoing. The wireless device may stop the random access process. The wireless device may switch from the first bandwidth part to the second bandwidth part based on the receiving the downlink control information. In an example, the wireless device may start a second random access process based on the switching the bandwidth part on the secondary cell.

In an example, the wireless device may receive a downlink control information indicating switching from an active bandwidth part of the secondary cell to a second bandwidth part of the secondary cell while the random access process is ongoing. The wireless device may ignore the downlink control information. The wireless device may continue the random access process based on the ignoring the downlink control information.

In an example, the downlink assignment, for the one or more random access responses, may be addressed to and/or associated with random access radio network temporary identifier. The random access radio network temporary identifier may be may be based on radio resource (e.g., time and frequency domain parameters of the radio resource/PRACH occasion, an uplink carrier identifier, etc.) used for transmission of a preamble during the random access process.

In an example, the wireless device may start a random access process on a first serving cell. The wireless device may stop one or more bandwidth part inactivity timers of one or more active bandwidth parts of one or more serving cells associated with the first serving cells. The one or more serving cells associated with the first serving cell may comprise the first serving cell and the secondary cell (the secondary cell configured to receive the scheduling information for the one or more random access responses and/or configured with the one or more search spaces).

Figure 27:
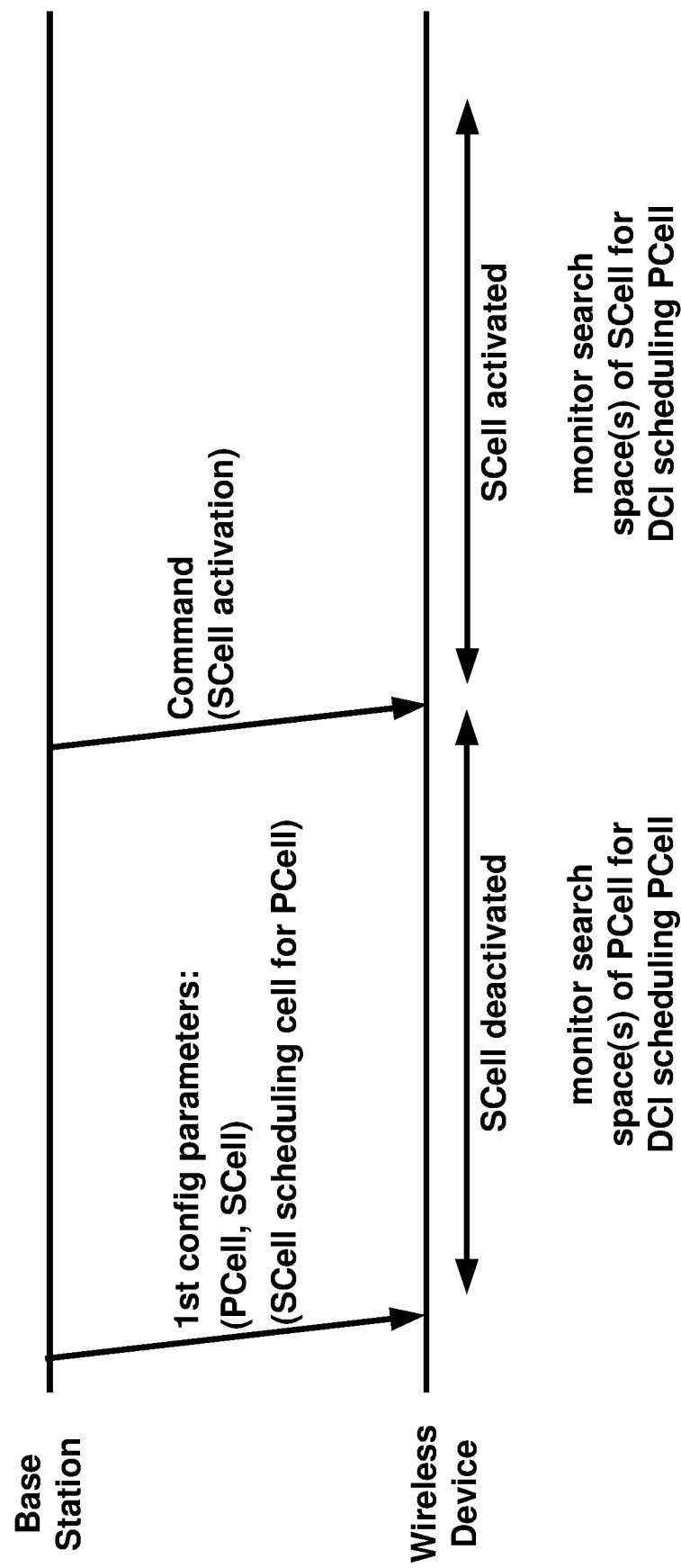
FIG. 27 shows an example process in accordance with several of various embodiments of the present disclosure.

In an example embodiment as shown in FIG. 27, a wireless device may receive configuration parameters of a plurality of cells comprising a primary cell and a secondary cell. The configuration parameters may indicate that the secondary cell is a scheduling cell for the primary cell. For example, the configuration parameters of the secondary cell may comprise a first parameter indicating that the secondary cell is a scheduling cell for the primary cell. For example, the configuration parameters of the primary cell may comprise a second parameter indicating that the secondary cell is a scheduling cell for the primary cell. For example, the second parameter may indicate a serving cell identifier of the secondary cell as a scheduling cell for the primary cell. The wireless device may monitor one or more first search spaces of the primary cell for receiving downlink control information associated with scheduling of the primary cell based on the secondary cell being in a deactivated state. The wireless device may receive a command indicating activation of the secondary cell. The wireless device may monitor one or more second search spaces on the secondary cell for receiving downlink control information associated with scheduling of the primary cell based on the receiving the command. In an example, the wireless device may monitor one or more second search spaces on the secondary cell for receiving downlink control information associated with scheduling of the primary cell based on the secondary cell being in an activated state.

Figure 28:
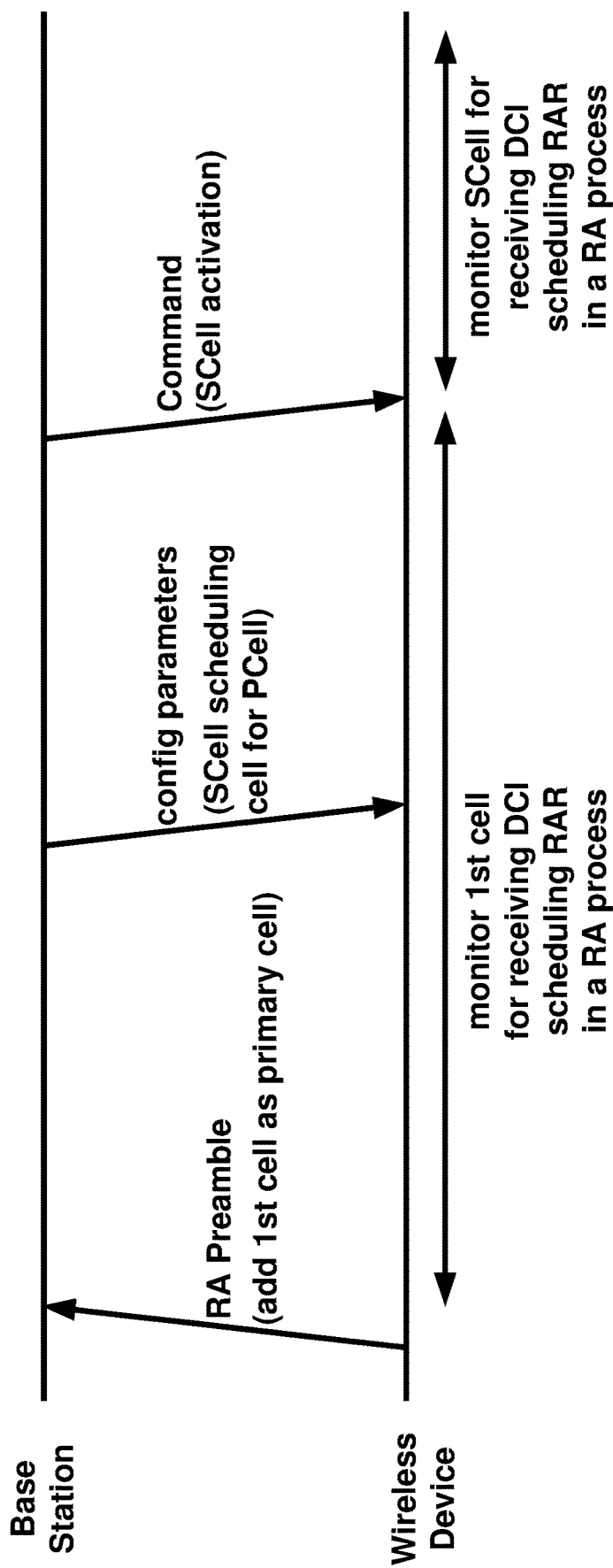
FIG. 28 shows an example process in accordance with several of various embodiments of the present disclosure.

In an example embodiment as shown in FIG. 28, a wireless device may transmit a random access preamble to start a first random access process on a first cell to add a first cell as a primary cell. For example, the first random access process may be for initial access. For example, the first random access process may be during a handover process for adding a cell of a target base station as a primary cell. For example, the first random access process may be for adding a cell during a secondary base station addition process for dual connectivity. The wireless device may monitor the first cell for receiving a random access response. The wireless device may monitor the first cell for receiving a random access response based on the first random access process being for addition of the first cell (e.g., as a primary cell or as a primary secondary cell). The wireless device may receive configuration parameters of a secondary cell. The configuration parameters may indicate that the secondary cell is a scheduling cell for the primary cell. In an example, the configuration parameters may indicate that the secondary cell is for receiving a downlink assignment for one or more random access responses associated with one or more random access processes. The wireless device may receive a command indicating activation of the secondary cell. For example, the command may be a cell activation/deactivation MAC CE. In an example, the cell activation/deactivation MAC CE may comprise a field, the value of the field may indicate activation of the secondary cell. The wireless device may start a second random access process. The wireless device may monitor the secondary cell for receiving a random access response based on the secondary cell being in an activated state.

In an example, the wireless device may not monitor the one or more first search spaces of the primary cell, for receiving downlink control information associated with scheduling of the primary cell or for receiving a random access response, based on the secondary cell being in an activated state. In an example, the wireless device may not monitor the one or more search spaces of the primary cell for one or more RNTIs based on the secondary cell being in an activated state. The one or RNTIs may comprise C-RNTI, CS-RNTI and/or RA-RNTI.

In an example embodiment, a wireless device may receive configuration parameters of a plurality of cells comprising a primary cell and a secondary cell. In an example, the secondary cell may be configured as a scheduling cell for the primary cell. In an example, the secondary cell may not be configured as a scheduling cell for the primary cell. Based on the secondary cell being configured as a scheduling cell for the primary cell or not being configured as a scheduling cell for the primary cell, the configuration parameters may indicate that the secondary cell is configured with a deactivation timer or is not configured with a deactivation timer. In an example, based on the secondary cell being configured as a scheduling cell for the primary cell or not configured as a scheduling cell for the primary cell, a deactivation timer of the secondary cell may be set/configured to an infinity value or a non-infinity value.

In an example, the configuration parameters may comprise one or more first parameters indicating whether the secondary cell is configured as a scheduling cell for the primary cell or not.

In an example embodiment, a wireless device may receive configuration parameters of a plurality of cells comprising a primary cell and a secondary cell. The secondary cell may be configured as a scheduling cell for the primary cell. In an example, based on the secondary cell being configured as a scheduling cell for the primary cell, the secondary cell may not be configured with a deactivation timer. In an example, based on the secondary cell being configured as a scheduling cell for the primary cell, the configuration parameters may indicate that the secondary cell is not configured with a deactivation timer. In an example, based on the secondary cell being configured as a scheduling cell for the primary cell, the configuration parameters may not indicate a deactivation timer for the secondary cell. In an example, based on the secondary cell being configured as a scheduling cell for the primary cell, a value of a deactivation timer of the secondary cell may be set/configured to infinity.

In an example, the configuration parameters may comprise one or more first parameters indicating that the secondary cell is a scheduling cell for the primary cell. In an example, configuration parameters of the secondary cell may comprise a first parameter indicating that the secondary cell is a scheduling cell for the primary cell. In an example, configuration parameters of the primary cell may comprise a first parameter indicating the secondary cell as a scheduling cell of the primary cell. In an example, the first parameter may indicate a serving cell identifier of the secondary cell.

In an example, the configuration parameters may indicate one or more search spaces on the secondary cell for receiving downlink control information indicating resource assignment on the primary cell. In an example, the wireless device may determine that the secondary cell is a scheduling cell for the primary cell based on the configuration of the one or more search spaces on the secondary cell.

In an example, a first search space of the secondary cell and a second search space of the primary cell with the same search space identifier may be linked to each other.

In an example, the resource assignment may be for an uplink transmission. In an example, the uplink transmission may be via physical uplink shared channel.

In an example, the resource assignment may be for a downlink reception. In an example, the downlink reception may be via physical downlink shared channel.

In an example, the primary cell and the secondary cell may be in a cell group. The cell group may comprise a plurality of cells provide by a base station. In an example, the wireless device may be configured with a plurality of cell groups, comprising the cell group, provided by a plurality of base stations, comprising the base station.

In an example, the wireless device may receive a reconfiguration message indicating: a reconfiguration of the primary cell from a first serving cell to a second serving cell. The reconfiguration message may indicate a deactivation timer for the secondary cell based on the secondary cell not being a scheduling cell for the second serving cell.

In an example, the wireless device may receive a DCI on the secondary cell, the DCI comprising a resource assignment for transmission of a transport block on the primary cell. The wireless device may transmit the transport block based on the DCI. In an example, the wireless device may receive a DCI on the secondary cell, the DCI comprising a resource assignment for reception of a transport block on the primary cell. The wireless device may receive the transport block based on the DCI.

In an example embodiment, a wireless device may receive configuration parameters of a plurality of cells comprising a primary cell and a secondary cell. In an example, the configuration parameters may comprise first configuration parameters of one or more search spaces on the secondary cell for receiving downlink signaling for transmissions/receptions on the primary cell. In an example, the configuration parameters may not comprise parameters for a search space on the secondary cell for receiving downlink signaling for transmissions/receptions on the primary cell. The secondary cell may be configured or not configured with a deactivation timer based on the configuration parameters comprising or not comprising first configuration parameters of one or more search spaces on the secondary cell for receiving downlink signaling for transmissions/receptions on the primary cell. In an example, a deactivation timer of the secondary cell may be set/configured to an infinity value or a non-infinity value based on the configuration parameters comprising or not comprising first configuration parameters of one or more search spaces on the secondary cell for receiving downlink signaling for transmissions/receptions on the primary cell.

In an example embodiment, a wireless device may receive configuration parameters of a plurality of cells comprising a primary cell and a secondary cell. In an example, the secondary cell may not be configured with a deactivation timer based on the configuration parameters comprising first configuration parameters of one or more search spaces on the secondary cell for receiving downlink signaling for transmissions/receptions on the primary cell. In an example, a deactivation timer of the secondary cell may be set/configured to an infinity value based on the configuration parameters comprising first configuration parameters of one or more search spaces on the secondary cell for receiving downlink signaling for transmissions/receptions on the primary cell.

In an example embodiment, a wireless device may receive configuration parameters of a plurality of cells comprising a primary cell, a first secondary cell and a second secondary cell. The configuration parameters may indicate a first (non-infinity) value for a first deactivation timer of the first secondary cell based on the first secondary cell not being configured as a scheduling cell for the primary cell. In an example, the configuration parameters may not indicate a deactivation timer (e.g., may indicate no deactivation timer) for the second secondary cell based on the second secondary cell being configured as a scheduling cell for the primary cell. In an example, the second secondary cell may not be configured with a deactivation timer based on the second secondary cell being configured as a scheduling cell for the primary cell. In an example, the configuration parameters may indicate a second value set/configured to infinity for a second deactivation timer of the second secondary cell based on the second secondary cell being configured as a scheduling cell for the primary cell.

In an example, a deactivation timer may not be configured for the second secondary cell further based on the primary cell being in a first band. In an example, a deactivation timer of the second secondary cell may be set/configured to infinity further based on the primary cell being in a first band. In an example, the first band may be a dynamic spectrum sharing (DSS) band.

In an example, the wireless device may receive a command indicating activation of the first secondary cell. In an example, the command may be received via a cell activation/deactivation MAC CE. The wireless device may start a deactivation timer of the first secondary cell based on the receiving the command. The wireless device may deactivate the first secondary cell based on the deactivation timer expiring.

In an example, the wireless device may receive one or more commands indicating activation of the first secondary cell and the second secondary cell. The wireless device may start a deactivation timer of the first secondary cell based on the receiving the one or more commands. The wireless device may not start a deactivation timer for the second secondary cell based on the receiving the one or more commands. The wireless device may deactivate the first secondary cell based on the deactivation timer expiring.

In an example, the second secondary cell may not be deactivated while the primary cell is not reconfigured.

In an example, the wireless device may receive a reconfiguration message indicating a reconfiguration of the primary cell, wherein the reconfiguration message comprise a deactivation timer value for the second secondary cell based on the reconfiguration message indicating reconfiguration of the primary cell.

In an example, the configuration parameters may comprise one or more parameters indicating that the second secondary cell is a scheduling cell for the primary cell. In an example, configuration parameters of the second secondary cell may comprise a first parameter indicating that the second secondary cell is a scheduling cell for the primary cell. In an example, configuration parameters of the primary cell may comprise a first parameter indicating that the second secondary cell is a scheduling cell for the primary cell. In an example, the first parameter may indicate a serving cell identifier of the second secondary cell.

In an example, the configuration parameters may comprise one or more parameters indicating that the second secondary cell is a scheduling cell for the primary cell. In an example, the one or more parameters may indicate that the second secondary cell is configured with one or more first search spaces/CORESETs for receiving a resource assignment for the primary cell.

In an example, the configuration parameters may indicate one or more first search spaces/CORESETs, of one or more search spaces/CORESETs on the second secondary cell, for receiving a resource assignment on the primary cell.

In an example, the configuration parameters may further indicate one or more second search spaces/CORESETs, of one or more search spaces/CORESETs on the secondary cell, for receiving a resource assignment on a serving cell other than a primary cell.

In an example, a wireless device may receive a downlink control information on the second secondary cell indicating resource assignment for the primary cell. The wireless device may transmit a transport block on the primary cell based on the downlink control information.

In an example, a wireless device may receive a downlink control information on the second secondary cell indicating resource assignment for the primary cell. The wireless device may receive a transport block on the primary cell based on the downlink control information.

In an example, the configuration parameters further indicate that the second secondary cell is configured with one or more common search spaces for at least one of: a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control commands for SRS).

In an example embodiment, a wireless device may receive one or more messages comprising first configuration parameters of a first secondary cell and a second secondary cell. The first configuration parameters may indicate one or more first search spaces for the first secondary cell and one or more second search spaces for the second secondary cell. The one or more messages may comprise cell activation/deactivation configuration parameters. The cell activation/deactivation configuration parameters may comprise a first (non-infinity) value for a first deactivation timer of the first secondary cell based on the one or more search spaces not comprising a first type of search space. In an example, the cell activation/deactivation configuration parameters may comprise no deactivation timer for the second secondary cell based on the one or more second search spaces comprising the first type of search space. In an example, the cell activation/deactivation configuration parameters may indicate an infinity value for a second deactivation timer of the second secondary cell based on the one or more second search spaces comprising the first type of search space. The wireless device may deactivate the first secondary cell based on the first deactivation timer expiring.

In an example, the first type of search space may be a common search space. In an example, the first type of search space may be a common search space for receiving downlink control information indicating downlink assignment for receiving one or more random access responses. In an example, the first type of search space may be at least one of: a common search space for receiving a DCI format with CRC scrambled by a SI-RNTI, for example, to receive system information; a common search space for receiving a DCI format with CRC scrambled by a RA-RNTI or a TC-RNTI, for example to receive random access response; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control commands for SRS).

In an example, the wireless device may receive a command indicating activation of the first secondary cell. The wireless device may start the first deactivation timer based on the receiving the command.

In an example, one or more search space type parameters, in the first configuration parameters, indicate types of one or more first search spaces and the one or more second search spaces.

In an example, the one or more messages further comprise: third configuration parameters of a primary cell; and one or more parameters indicating that the wireless device is configured to receive scheduling information for the primary cell via the second secondary cell.

In an example, the cell activation/deactivation configuration parameters may indicate no deactivation timer for the second secondary cell further based on the wireless device being configured to receive the scheduling information for the primary cell via the second secondary cell. In an example, the cell activation/deactivation configuration parameters may indicate an infinity value for a second deactivation timer of the second secondary cell further based on the wireless device being configured to receive the scheduling information for the primary cell via the second secondary cell.

In an example embodiment, a wireless device may receive configuration parameters of a plurality of cells comprising a primary cell and a secondary cell. In an example, the configuration parameters may not indicate that the secondary cell and/or a search space of the secondary cell may be used for receiving downlink control information for uplink or downlink scheduling of the primary cell. In an example, the configuration parameters may indicate that the secondary sell is not used for receiving uplink or downlink scheduling of the primary cell. In an example, based on the configuration parameters not indicating that the secondary cell and/or a search space of the secondary cell being used for receiving downlink control information for uplink or downlink scheduling of the primary cell, the configuration parameters may comprise a (non-infinity) deactivation timer value for the secondary cell, otherwise the configuration parameters may not comprise/indicate a deactivation timer value for the secondary cell or may comprise an infinity deactivation timer value for the secondary cell. In an example, based on the configuration parameters indicating that the secondary cell and/or a search space of the secondary cell not being used for receiving downlink control information for uplink or downlink scheduling of the primary cell, the configuration parameters may comprise a (non-infinity) deactivation timer value for the secondary cell, otherwise the configuration parameters may not comprise a deactivation timer value for the secondary cell or may comprise an infinity deactivation timer value for the secondary cell. Based on the configuration parameters, the wireless device may receive a downlink control information on the primary cell or the secondary cell indicating transmission parameters of a transport block on the primary cell. The wireless device may transmit the transport block based on the downlink control information.

In an example embodiment, a wireless device may receive configuration parameters of a primary cell and a secondary cell, the configuration parameters indicating that the secondary cell is a scheduling cell for the primary cell. In an example, the configuration parameters may indicate one or more search spaces of a first type for the secondary cell based on the secondary cell being configured as a scheduling cell for the primary cell. In an example, the wireless device may not expect to be configured without one or more search spaces of a first type for the secondary cell based on the secondary cell being configured as a scheduling cell for the primary cell. The wireless device may monitor the one or more search spaces for a downlink control channel. The wireless device may receive one or more signals based on the monitoring.

In an example, the first type of the one or more search spaces is a common search space. In an example, the one or more search spaces comprise common search space for at least one of: a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control (TPC) commands for SRS).

In an example, the one or more signals comprise at least one of: system information, random access response in a random access process, a contention resolution message in a random access process, pre-emption/interruption indication, paging information, slot format information and group power control commands (e.g., group power control commands for PUSCH, PUCCH or SRS).

In an example embodiment, a wireless device may receive one or more messages comprising: first configuration parameters of a primary cell, a first secondary cell and a second secondary cell; second configuration parameters of a plurality of bandwidth parts of the first secondary cell; and third configuration parameters of one or more search spaces on the first secondary cell for receiving downlink assignment of one or more random access responses corresponding to one or more random access processes. The wireless device may start a random access process on the primary cell or on the second secondary cell. The wireless device may stop a bandwidth part inactivity timer associated with an active bandwidth part of the first secondary cell based on: the starting the random access process; and the one or more search spaces being configured for the first secondary cell.

In an example embodiment, a wireless device may receive configuration parameters of one or more search spaces, on a secondary cell, for receiving downlink assignment of one or more random access responses corresponding to one or more random access processes. The wireless device may start a random access process. The wireless device may start the random access process on a serving cell other than the secondary cell (e.g., on a second secondary cell or on a primary cell). The wireless device may stop a bandwidth part inactivity timer associated with a first bandwidth part of the secondary cell based on: the starting the random access process; and the one or more search spaces being configured for the secondary cell.

In an example embodiment, a wireless device may receive configuration parameters indicating that a secondary cell is configured to receive scheduling information for one or more random access responses associated with one or more random access processes. The wireless device may start a random access process. The wireless device may start the random access process on a serving cell other than the secondary cell (e.g., on a second secondary cell or on a primary cell). The wireless device may stop a bandwidth part inactivity timer associated with a first bandwidth part of the secondary cell based on: the starting the random access process; and the secondary cell being configured to receive the scheduling information for the one or more random access responses.

In an example, the wireless device may receive a DCI indicating a downlink assignment or an uplink grant for the first bandwidth part of the secondary cell. In an example, the wireless device may receive a DCI on the first bandwidth part of the secondary cell, the DCI indicating a downlink assignment or an uplink grant. The wireless device may start the bandwidth part inactivity timer based on the receiving the DCI and based on the random access process being completed. In an example, the wireless device may start the bandwidth inactivity timer based on the receiving the DCI and based on the random access process being successfully completed. In an example, the wireless device may switch from the first bandwidth part to a default bandwidth part as an active bandwidth part of the secondary cell based on the bandwidth part inactivity timer expiring.

In an example, the wireless device may receive a downlink control information indicating switching from an active bandwidth part of the secondary cell to a second bandwidth part of the secondary cell while the random access process is ongoing. The wireless device may stop the random access process. The wireless device may switch from the first bandwidth part of the secondary cell to a second bandwidth part of the secondary cell. In an example, the wireless device may start a second random access process.

In an example, the wireless device may receive a downlink control information indicating switching from an active bandwidth part of the secondary cell to a second bandwidth part of the secondary cell while the random access process is ongoing. The wireless device may ignore the downlink control information.

In an example, the downlink assignment may be associated with (e.g., addressed to) a random access radio network temporary identifier. In an example, the random access radio network temporary identifier may be based on a resource used for transmission of a random access preamble during the random access process.

In an example, the first bandwidth part may be a current active downlink bandwidth part of the secondary cell.

In an example, the random access process may be for beam failure recovery. The one or more search spaces may comprise a first search space for receiving random access response for beam failure recovery. In an example, the first search space may be associated with a recovery search space identifier.

In an example, the random access process may be a contention-based random access process.

In an example, the random access process may be a contention-free random access process.

In an example, the one or more random access responses may be for one or more random access processes comprising the random access process.

In an example, the wireless device may stop one or more bandwidth part inactivity timers of one or more active bandwidth parts of one or more serving cells associated with a first serving cell, wherein: the random access process is started on the first serving cell; and the one or more serving cells associated with the first cell comprise the first serving cell and the secondary cell which is configured to receive scheduling information for one or more random access responses and/or configured with the one or more search spaces (e.g., one or more searches of a first type).

In an example embodiment, a wireless device may receive configuration parameters of a plurality of cells comprising a primary cell and a secondary cell, wherein the configuration parameters indicate that the secondary cell is a scheduling cell for the primary cell. The wireless device may monitor one or more first search spaces of the primary cell for receiving downlink control information associated with scheduling of the primary cell based on the secondary cell being in a deactivated state. The wireless device may receive a command indicating activation of the secondary cell. The wireless device may monitor one or more second search spaces on the secondary cell for receiving downlink control information associated with scheduling of the primary cell based on the receiving the command. The wireless device may monitor one or more second search spaces on the secondary cell for receiving downlink control information associated with scheduling of the primary cell based on the secondary cell being in an activated state.

In an example embodiment, a wireless device may transmit a random access preamble to start a first random access process on a first cell to add the first cell as a primary cell. The wireless device may monitor the first cell for receiving a random access response. The wireless device may monitor the first cell for receiving a random access response based on the first random access process being for addition of the first cell. The wireless device may receive configuration parameters of a secondary cell, the configuration parameters indicating that the secondary cell is a scheduling cell for the primary cell. In an example, the configuration parameters may indicate that the secondary cell is for receiving a downlink assignment for one or more random access responses associated with one or more random access processes. In an example, the configuration parameters may indicate that the secondary cell is configured with one or more search spaces of a first type. The wireless device may receive a command indicating activation of the secondary cell. The wireless device may start a second random access process. The wireless device may monitor the secondary cell for receiving a random access response based on the secondary cell being in an activated state.

In an example, the first random access process may be for an initial access.

In an example, the command may be a cell activation/deactivation MAC CE. In an example, the cell activation/deactivation MAC CE may comprise a field corresponding to the secondary cell, a value of the filed indicating activation of the secondary cell.

In an example, the wireless device may not monitor the one or more first search spaces of the primary cell based on the secondary cell being in an activated state. The wireless device may not monitor the one or more first search spaces of the primary cell, for receiving downlink control information associated with scheduling of the primary cell, based on the secondary cell being in an activated state.

In an example, the wireless device may not monitor the one or more first search spaces of the primary cell for one or more RNTIs based on the secondary cell being in an activated state. The one or more RNTIs may comprise at least one of C-RNTI, CS-RNTI and RA-RANTI.

In an example embodiment, a wireless device may receive one or more messages (e.g., one or more RRC messages) comprising configuration parameters of a plurality of cells. The plurality of cells may comprise a primary cell and one or more secondary cells. The plurality of cells may be provided by one base station (e.g., in a single-connectivity scenario) or multiple base stations (e.g., in a multi-connectivity scenario). In case of multi-connectivity, the plurality of cells may be grouped into multiple cell groups (e.g., a master cell group (MCG) and a secondary cell group (SCG)). The MCG may comprise a primary cell. A secondary cell (SCell) in the SCG may be referred to as a primary secondary cell (e.g., PSCell). In example embodiments, the primary cell may refer to either the primary cell in the MCG or the PSCell in the SCG. In an example, the primary cell may be based on a DSS carrier shared between a first radio access technology (e.g., NR) and a second radio access technology (e.g., LTE).

A secondary cell, in the plurality of cells, may be a scheduling cell for the primary cell. For example, the secondary cell may be referred to as a scheduling secondary cell (sSCell). The sSCell may be configured as a scheduling SCell for the primary cell. For example, the configuration parameters may indicate that the SCell is a scheduling SCell for the primary cell. For example, the configuration parameters of the SCell may comprise one or more parameters indicating that the SCell is a scheduling cell for the primary cell. For example, the configuration parameters of the primary cell may comprise a parameter (e.g., indicating an identifier of the scheduling SCell) indicating that the SCell is a scheduling cell for the primary cell. For example, the SCell may be configured with one or more search spaces/CORESETs associated with scheduling of the primary cell. The one or more messages may comprise configuration parameters of the one or more search spaces/CORESETs indicating that the one or more search spaces/CORESETs, configured for the SCell, are associated with scheduling of the primary cell. In an example, the wireless device may determine that the secondary cell is a scheduling cell of the primary cell based on the configuration parameters of the one or more search spaces/CORESETs indicating that the one or more search spaces/CORESETs are associated with scheduling the primary cell.

The secondary cell that is the scheduling cell for the primary cell may be in a deactivated state or in an activated state. For example, the wireless device may receive activation/deactivation commands (e.g., using SCell Activation/Deactivation MAC CEs) indicating that the scheduling cell is activated or deactivated.

Figure 29:
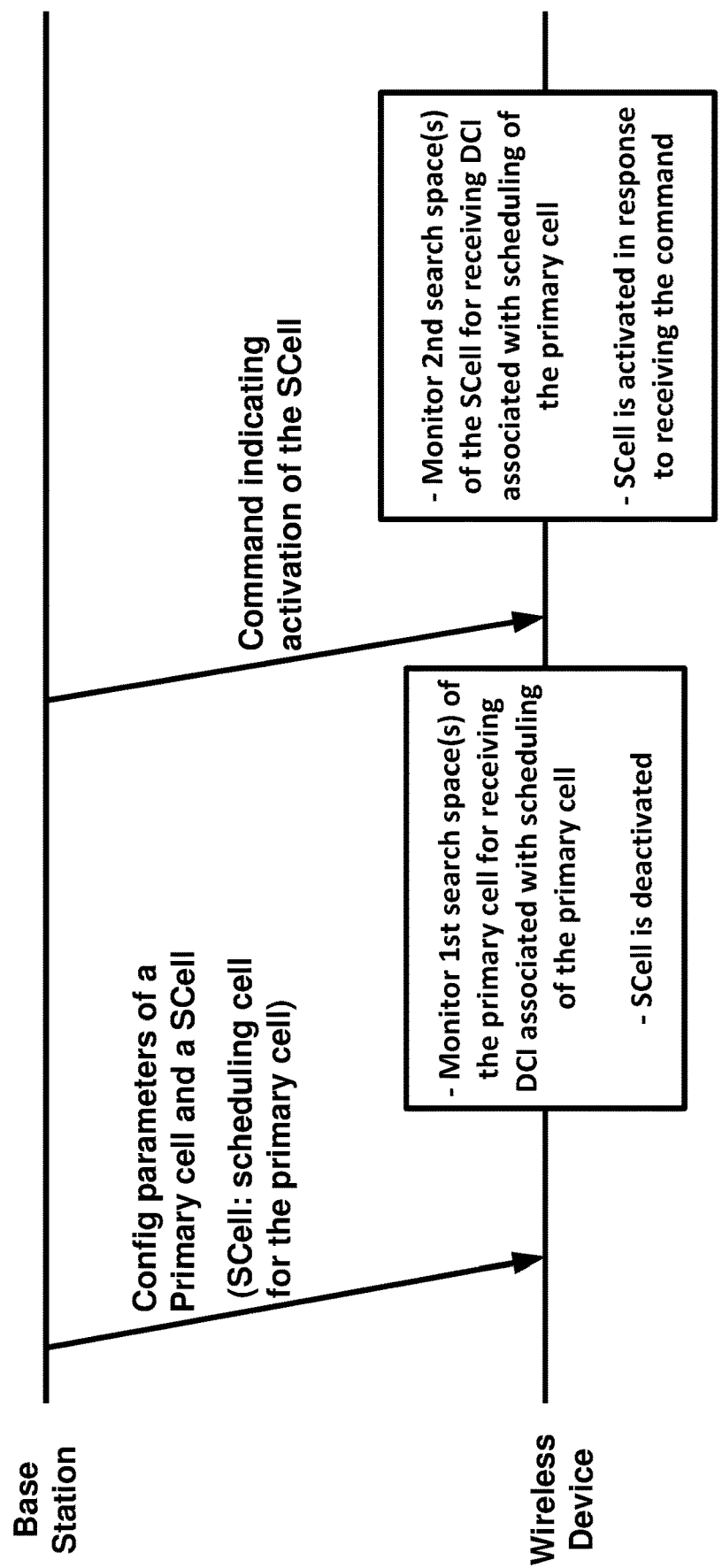
FIG. 29 shows an example process in accordance with several of various embodiments of the present disclosure.

In an example embodiment as shown in FIG. 29, in response to receiving a deactivation command or based on a SCell deactivation timer associated with the secondary cell expiring, the scheduling secondary cell for the primary cell may be in a deactivated state. The wireless device may monitor one or more first search spaces of the primary cell (e.g., one or more first UE specific search spaces (USSs) of the primary cell) for receiving downlink control information (DCIs) associate with scheduling of the primary cell, for example, scheduling of a PUSCH (e.g., for transmitting an uplink transport block (TB)) or a PDSCH (e.g., for receiving a downlink TB) on the primary cell. In an example, the wireless device may monitor the one or more first search spaces of the primary cell, for receiving DCIs associated with scheduling of the primary cell, based on the scheduling secondary cell of the primary cell being in a deactivated state. In response to the monitoring the one or more first search spaces of the primary cell, the wireless device may receive a first DCI comprising first scheduling information for a PDSCH (e.g., for receiving a downlink TB) or a PUSCH (e.g., for transmitting an uplink TB) on the primary cell. The wireless device may transmit the PUSCH (e.g., the uplink TB) or may receive the PDSCH (e.g., the downlink TB) via the primary cell and based on the scheduling information.

The wireless device may receive an activation command (e.g., using a SCell Activation/Deactivation MAC CE) indicating activation of the scheduling secondary cell. The wireless device may activate the scheduling secondary cell in response to the receiving the activation command. In response to receiving the activation command and activation of the scheduling secondary cell, search spaces of the scheduling secondary cell (e.g., one or more second search spaces (e.g., one or more second USSs), of the scheduling secondary cell, associated with scheduling of the primary cell) may be activated/usable. The wireless device may monitor the one or more second search spaces of the secondary cell for receiving DCIs associated with scheduling of the primary cell, for example, for scheduling of a PUSCH (e.g., for transmitting an uplink transport block (TB)) or a PDSCH (e.g., for receiving a downlink TB) on the primary cell. The wireless device may monitor the one or more second search spaces of the secondary cell for receiving DCIs associated with scheduling of the primary cell in response to receiving the command and in response to the scheduling secondary cell being activated. In response to the monitoring the one or more second search spaces of the scheduling secondary cell, the wireless device may receive a second DCI comprising second scheduling information for a PDSCH (e.g., for receiving a downlink TB) or a PUSCH (e.g., for transmitting an uplink TB) on the primary cell. The wireless device may transmit the PUSCH (e.g., the uplink TB) or may receive the PDSCH (e.g., the downlink TB) via the primary cell and based on the scheduling information.

Figure 30:
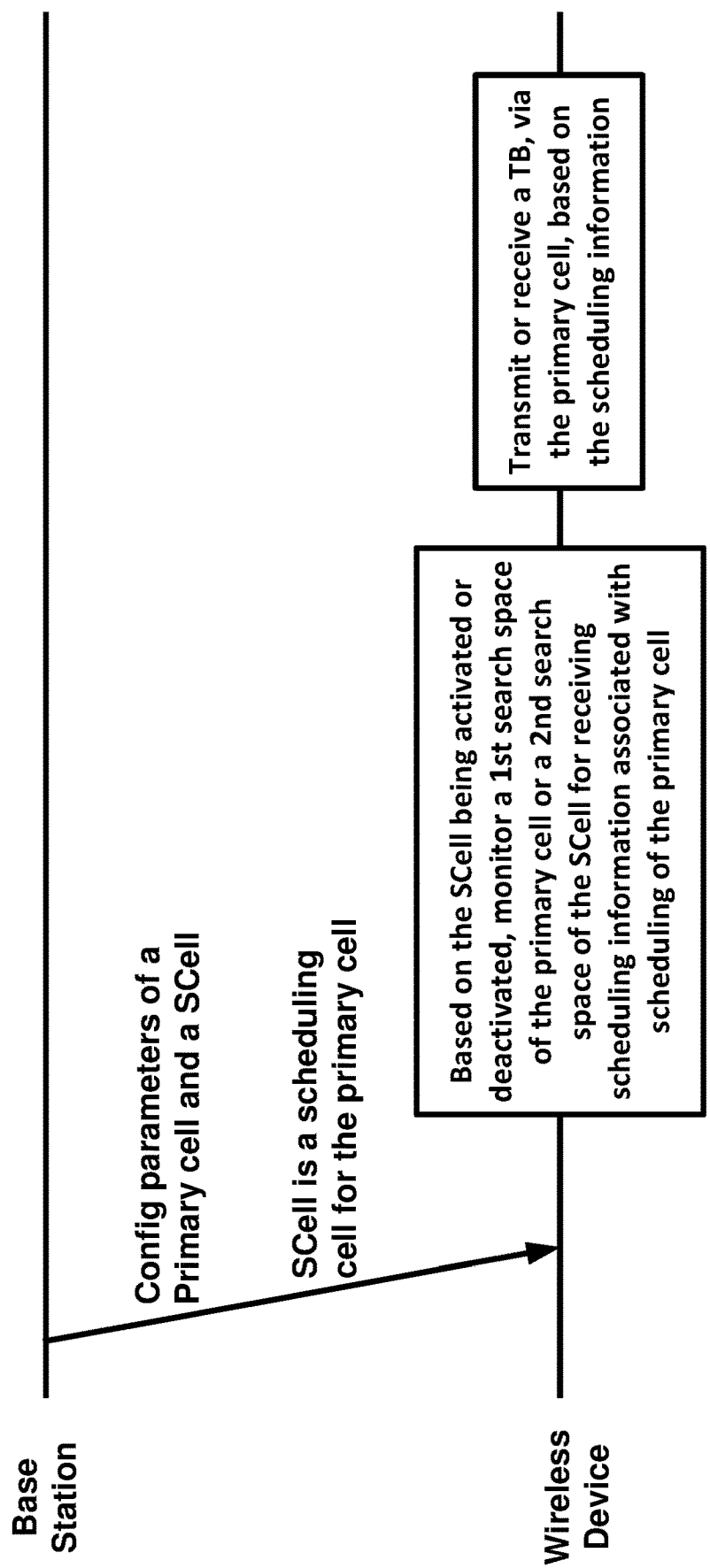
FIG. 30 shows an example process in accordance with several of various embodiments of the present disclosure.

In an example embodiment as shown in FIG. 30, based on the scheduling secondary cell being activated or being deactivated, the wireless device may monitor a first search space of a scheduling secondary cell or may monitor a second search space of the primary cell for receiving DCIs associated with scheduling of the primary cell, for example, for scheduling of a PUSCH (e.g., for transmitting an uplink transport block (TB)) or a PDSCH (e.g., for receiving a downlink TB) on the primary cell. For example, based on the scheduling secondary cell being activated (e.g., in response to receiving an activation command), the wireless device may monitor the first search space of the scheduling secondary cell for receiving DCIs associated with scheduling of the primary cell. For example, based on the scheduling secondary cell being deactivated (e.g., in response to receiving a deactivation command or in response to a deactivation timer associated with the scheduling secondary cell expiring), the wireless device may monitor the second search space of the primary cell for receiving DCIs associated with scheduling of the primary cell. The wireless device may transmit or may receive a TB via the primary cell based on the scheduling information.

Figure 31:
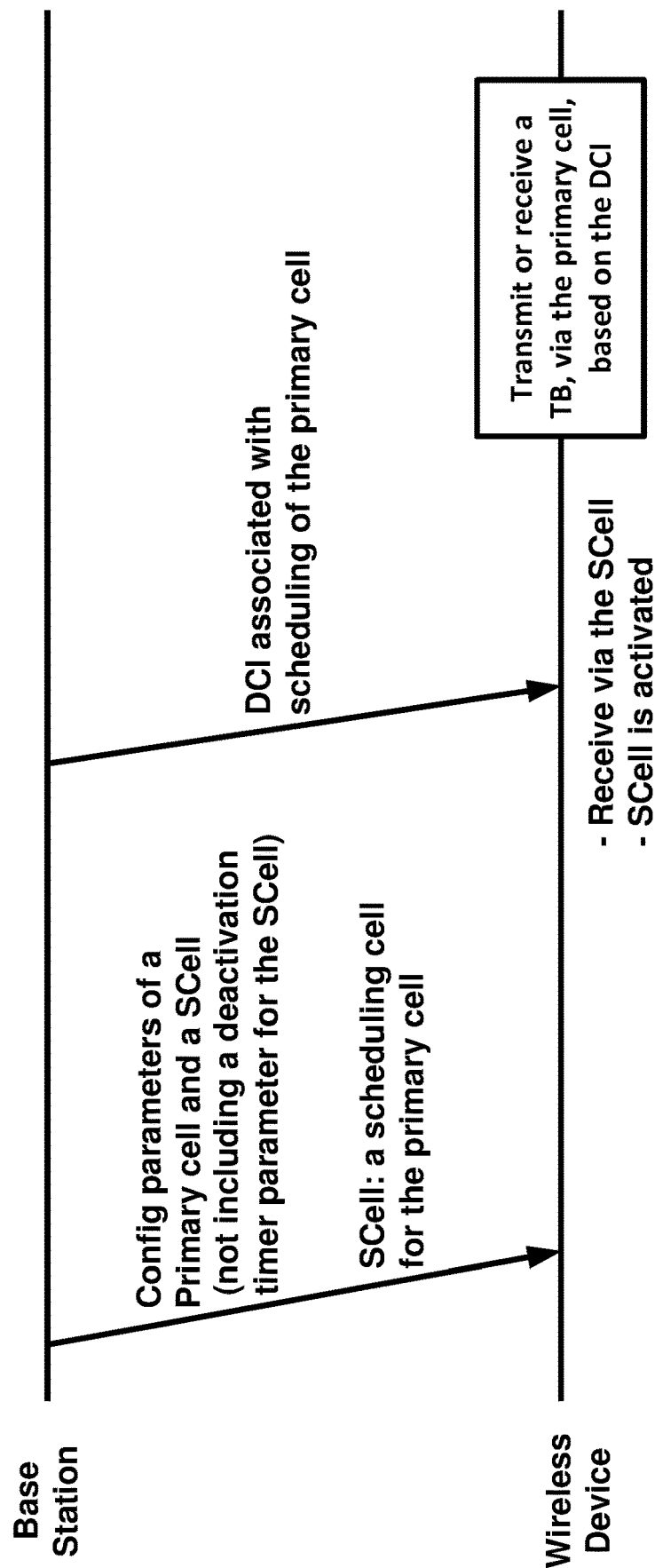
FIG. 31 shows an example process in accordance with several of various embodiments of the present disclosure.

In an example embodiment as shown in FIG. 31, the configuration parameters may not comprise a deactivation timer parameter for a secondary cell that is a scheduling cell for the primary cell. In an example, the configuration parameters may not comprise the deactivation timer parameter for the secondary cell based on the secondary cell being (e.g., being configured as) the scheduling cell for the primary cell. In an example, the secondary cell that is the scheduling cell for the primary cell (e.g., the scheduling secondary cell) may be activated in response to receiving the configuration parameters of the scheduling secondary cell. In an example, the scheduling secondary cell may be activated in response to receiving an activation command (e.g., a SCell Activation/Deactivation MAC CE) and may be deactivated in response to receiving a deactivation command (e.g., a SCell Activation/Deactivation MAC CE). The scheduling secondary cell may not be deactivated using a timer-based deactivation mechanism. In an example, the wireless device may apply a value of infinity for a deactivation timer of the scheduling secondary cell.

The wireless device may receive a DCI, via the scheduling secondary cell, comprising scheduling information for receiving a PDSCH (e.g., a downlink TB) or transmitting a PUSCH (e.g., an uplink TB). The wireless device may receive the DCI while the scheduling secondary cell is activated (e.g., in response to receiving an SCell activation command/MAC CE indicating activation of the scheduling secondary cell). In an example, the configuration parameters may comprise first configuration parameters of one or more search spaces of the scheduling secondary cell. The one or more search spaces may be associated with scheduling of the primary cell. The wireless device may receive the DCI based on monitoring the one or more search spaces of the scheduling secondary cell.

Figure 32:
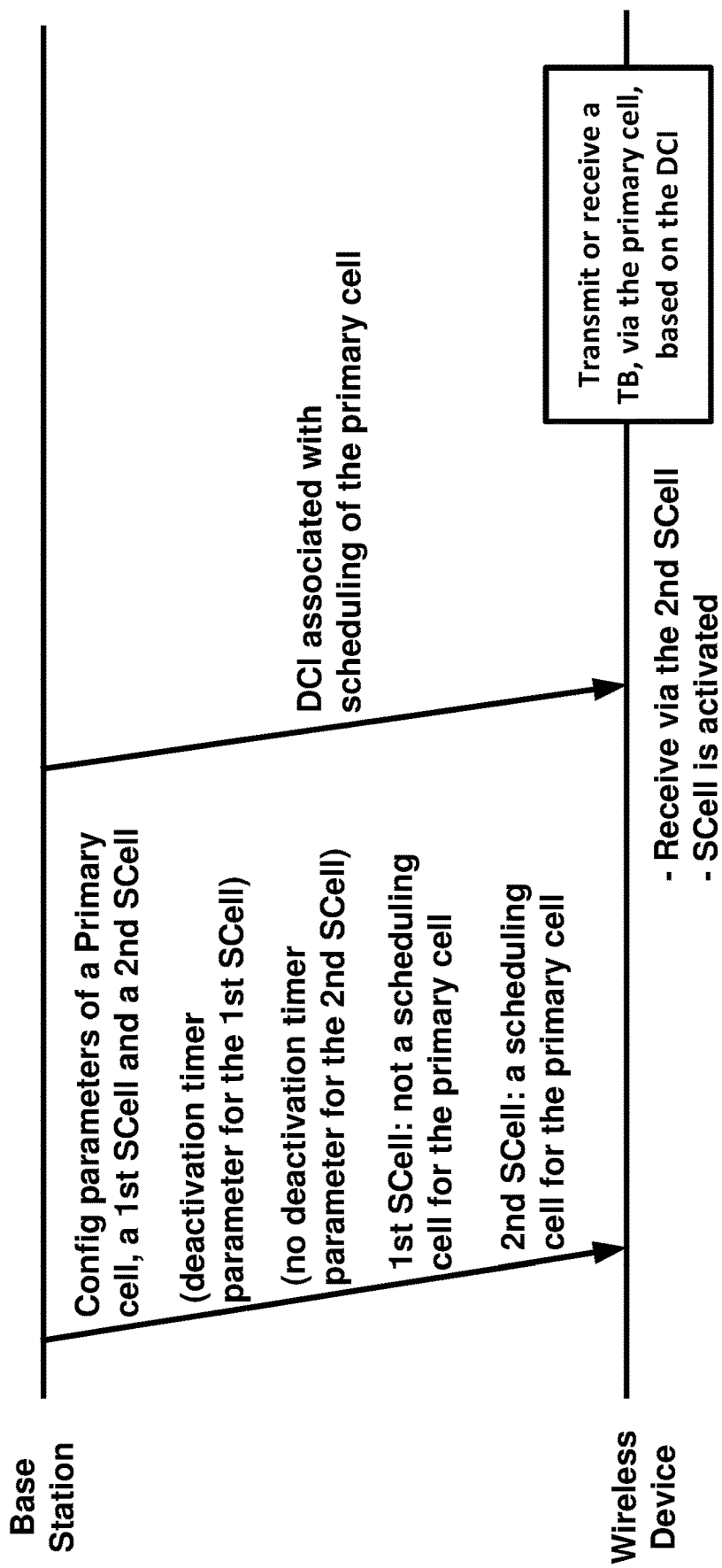
FIG. 32 shows an example process in accordance with several of various embodiments of the present disclosure.

In an example embodiment as shown in FIG. 32, a wireless device may receive configuration parameters of the primary cell, a first secondary cell and a second secondary cell. The first secondary cell may not be a scheduling cell for the primary cell while the second secondary cell may be a scheduling cell for the primary cell. For example, the configuration parameters may comprise one or more parameters indicating that the second secondary cell is a scheduling cell for the primary cell and that the first secondary cell is not a scheduling cell for the primary cell. For example, the configuration parameters may not comprise a parameter indicating that the first secondary cell is a scheduling cell for the primary cell. The configuration parameters may comprise a deactivation timer parameter, indicating a value of the deactivation timer of the first secondary cell, and may not comprise a deactivation timer parameter for the second secondary cell. In an example, the wireless device may apply a value of infinity for a deactivation timer of the second secondary cell. In an example, the configuration parameters may not comprise the deactivation timer parameter for the second secondary cell based on the second secondary cell being (e.g., being configured as) the scheduling cell for the primary cell.

In an example, the second secondary cell may be activated in response to receiving an activation command (e.g., a SCell Activation/Deactivation MAC CE) and may be deactivated in response to receiving a deactivation command (e.g., a SCell Activation/Deactivation MAC CE). The second secondary cell may not be deactivated using a timer-based deactivation mechanism. In an example, the wireless device may apply a value of infinity for a deactivation timer of the second secondary cell. The wireless device may use a timer-based deactivation mechanism for the first secondary cell. The wireless device may deactivate the first secondary cell based on the deactivation timer associated with the first secondary cell expiring.

The wireless device may receive a DCI, via the second secondary cell, comprising scheduling information for receiving a PDSCH (e.g., a downlink TB) or transmitting a PUSCH (e.g., an uplink TB) via the primary cell. The wireless device may receive the DCI while the second secondary cell is activated (e.g., in response to receiving an SCell activation command/MAC CE indicating activation of the second secondary cell). In an example, the configuration parameters may comprise first configuration parameters of one or more search spaces of the second secondary cell. The one or more search spaces may be associated with scheduling of the primary cell. The wireless device may receive the DCI based on monitoring the one or more search spaces of the second secondary cell.

Figure 33:
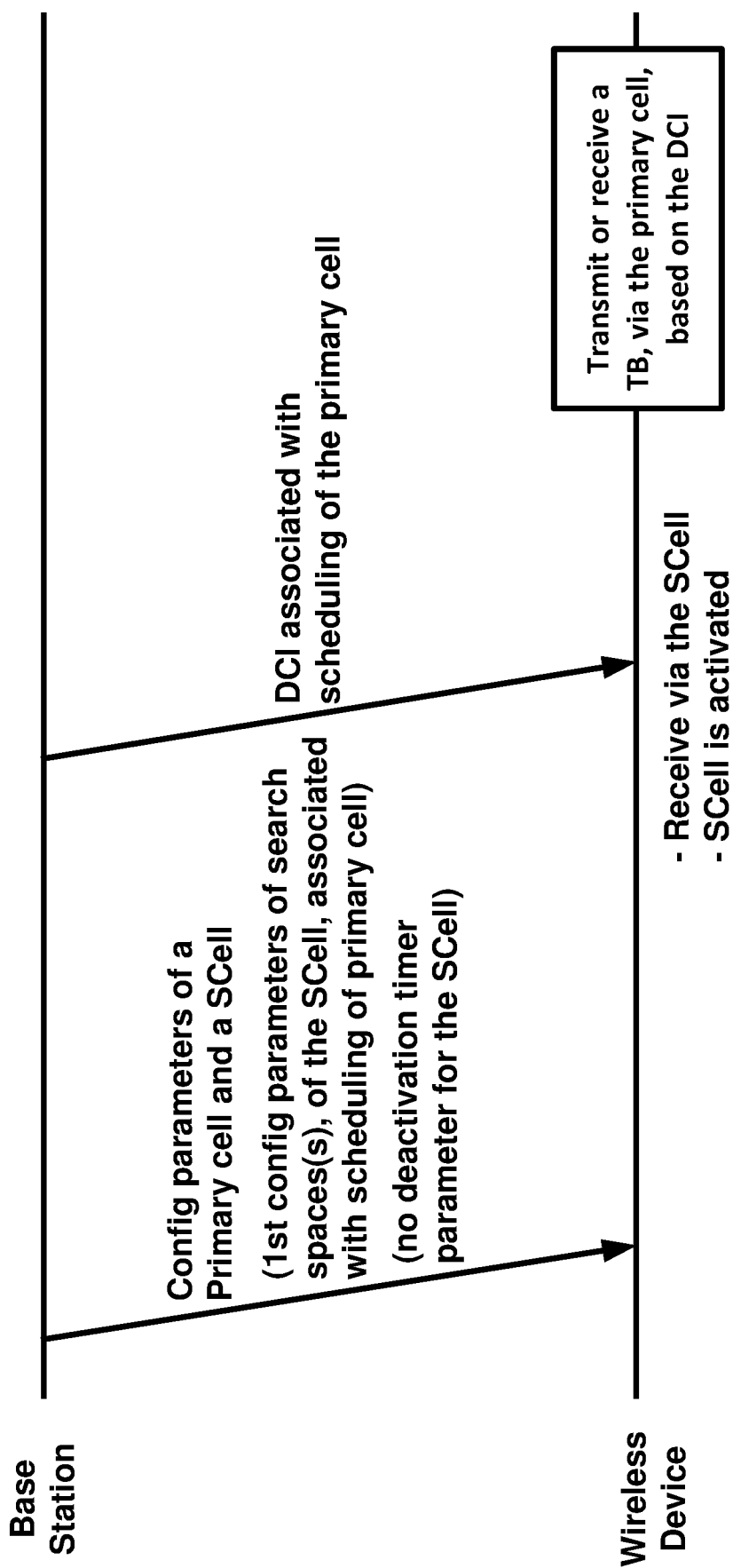
FIG. 33 shows an example process in accordance with several of various embodiments of the present disclosure.

In an example embodiment as shown in FIG. 33, a wireless device may receive configuration parameters of a primary cell and a secondary cell. The configuration parameters may comprise first configuration parameters of one or more search spaces, of the secondary cell, associated with scheduling of the primary cell. The configuration parameters may not comprise a deactivation timer parameter for the secondary cell. In an example, the configuration parameters may not comprise the deactivation timer parameter for the secondary cell based on the one or more search spaces, associated with scheduling of the primary cell, being configured for the wireless device. In an example, the wireless device may determine that the secondary cell is a scheduling cell for the primary cell based on the one or more search spaces, associated with scheduling of the primary cell, being scheduled for the secondary cell. In an example, the secondary cell may be activated in response to receiving the configuration parameters of the secondary cell. In an example, the secondary cell may be activated in response to receiving an activation command (e.g., a SCell Activation/Deactivation MAC CE) and may be deactivated in response to receiving a deactivation command (e.g., a SCell Activation/Deactivation MAC CE). The secondary cell may not be deactivated using a timer-based deactivation mechanism. In an example, the wireless device may apply a value of infinity for a deactivation timer of the secondary cell.

The wireless device may receive a DCI, via the secondary cell, comprising scheduling information for receiving a PDSCH (e.g., a downlink TB) or transmitting a PUSCH (e.g., an uplink TB). The wireless device may receive the DCI while the secondary cell is activated (e.g., in response to receiving an SCell activation command/MAC CE indicating activation of the secondary cell). The wireless device may receive the DCI based on monitoring the one or more search spaces of the scheduling secondary cell.

Figure 34:
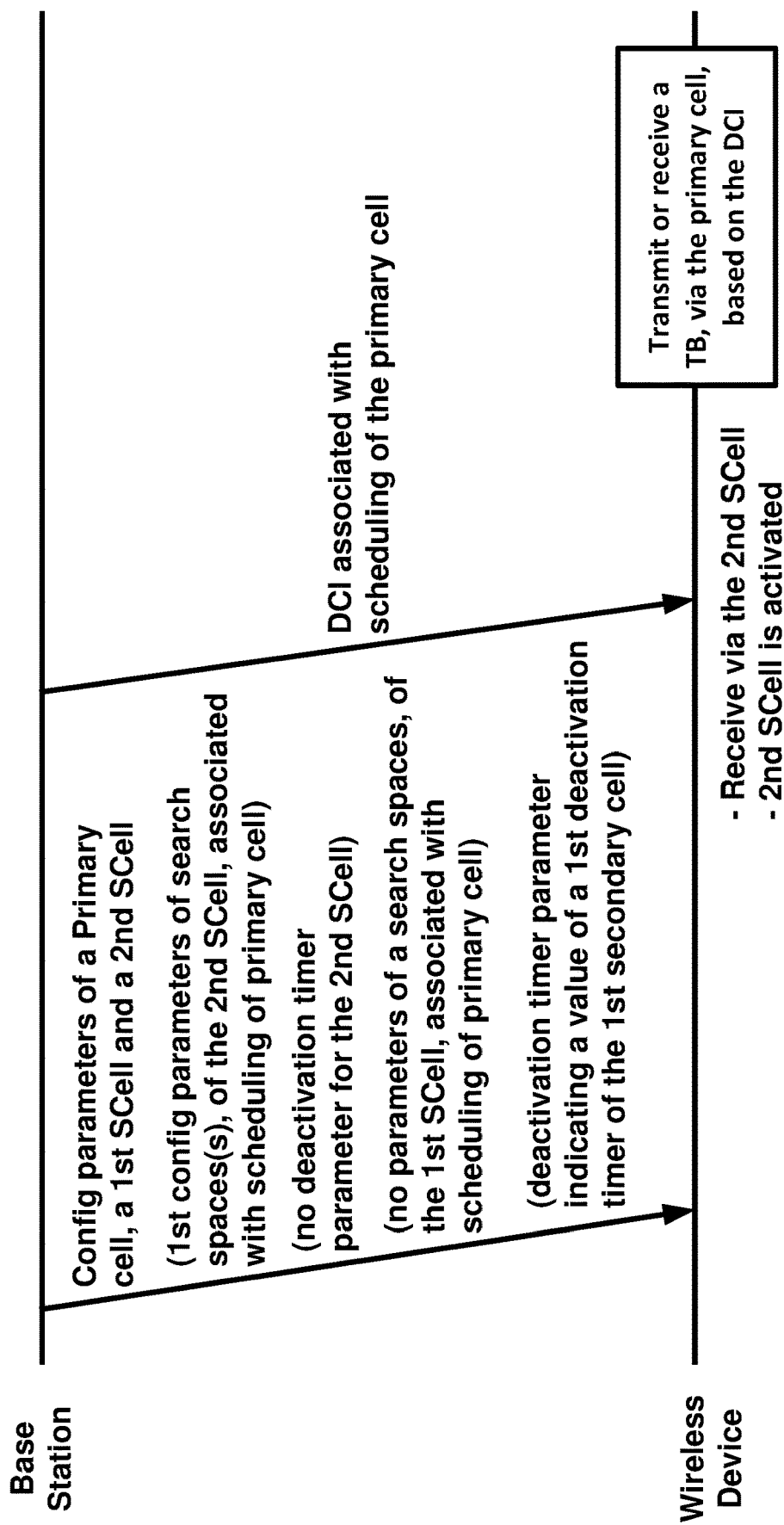
FIG. 34 shows an example process in accordance with several of various embodiments of the present disclosure.

In an example embodiment as shown in FIG. 34, a wireless device may receive configuration parameters of the primary cell, a first secondary cell and a second secondary cell. The configuration parameters may not comprise parameters of a search space, of the first secondary cell, associated with scheduling of the primary cell. The configuration parameters may comprise first configuration parameters of one or more search spaces, of the second secondary cell, associated with scheduling of the primary cell. In an example, the wireless device may determine that the second secondary cell is a scheduling cell for the primary cell based on the first configuration parameters of the one or more second search spaces, associated with scheduling of the primary cell, being configured for the secondar cell. The wireless device may determine that the first secondary cell is not a scheduling cell for the primary cell based on a search space, associated with scheduling of the primary cell, not being configured for the first secondary cell. The configuration parameters may comprise a deactivation timer parameter, indicating a value of the deactivation timer of the first secondary cell, and may not comprise a deactivation timer parameter for the second secondary cell. In an example, the wireless device may apply a value of infinity for a deactivation timer of the second secondary cell. In an example, the configuration parameters may not comprise the deactivation timer parameter for the second secondary cell based on the second secondary cell being configured with the one or more search spaces associated with scheduling of the primary cell.

In an example, the second secondary cell may be activated in response to receiving an activation command (e.g., a SCell Activation/Deactivation MAC CE) and may be deactivated in response to receiving a deactivation command (e.g., a SCell Activation/Deactivation MAC CE). The second secondary cell may not be deactivated using a timer-based deactivation mechanism. In an example, the wireless device may apply a value of infinity for a deactivation timer of the second secondary cell. The wireless device may use a timer-based deactivation mechanism for the first secondary cell. The wireless device may deactivate the first secondary cell based on the deactivation timer associated with the first secondary cell expiring.

The wireless device may receive a DCI, via the second secondary cell, comprising scheduling information for receiving a PDSCH (e.g., a downlink TB) or transmitting a PUSCH (e.g., an uplink TB) via the primary cell. The wireless device may receive the DCI while the second secondary cell is activated (e.g., in response to receiving an SCell activation command/MAC CE indicating activation of the second secondary cell). The wireless device may receive the DCI based on monitoring the one or more search spaces of the second secondary cell.

Figure 35:
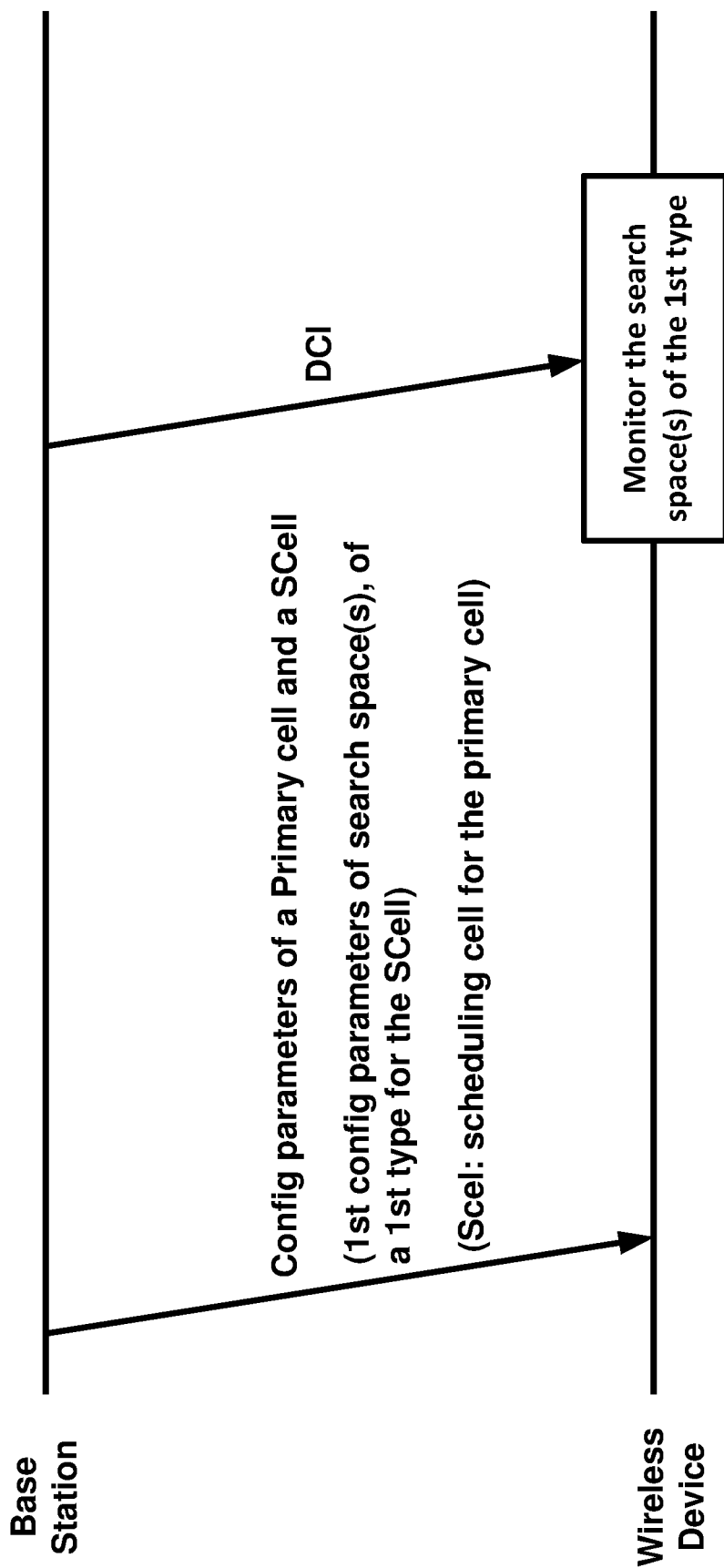
FIG. 35 shows an example process in accordance with several of various embodiments of the present disclosure.

In an example embodiment as shown in FIG. 35, a wireless device may receive configuration parameters of a primary cell and a secondary cell. The secondary cell may be a scheduling cell for the primary cell. In an example, the configuration parameters may comprise one or more parameters indicating that the secondary cell is a scheduling cell for the primary cell. The configuration parameters may comprise first configuration parameters, of one or more search spaces, of a first type. The configuration parameters may comprise first configuration parameters of one or more search spaces, of the first type, based on the secondary cell being (e.g., being configured as) the scheduling cell for the primary cell. In an example, a first type search space may be a common search space. In an example, a first type search space may be associated with scheduling of a primary cell, e.g., scheduling of a primary cell from a secondary cell.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 36:
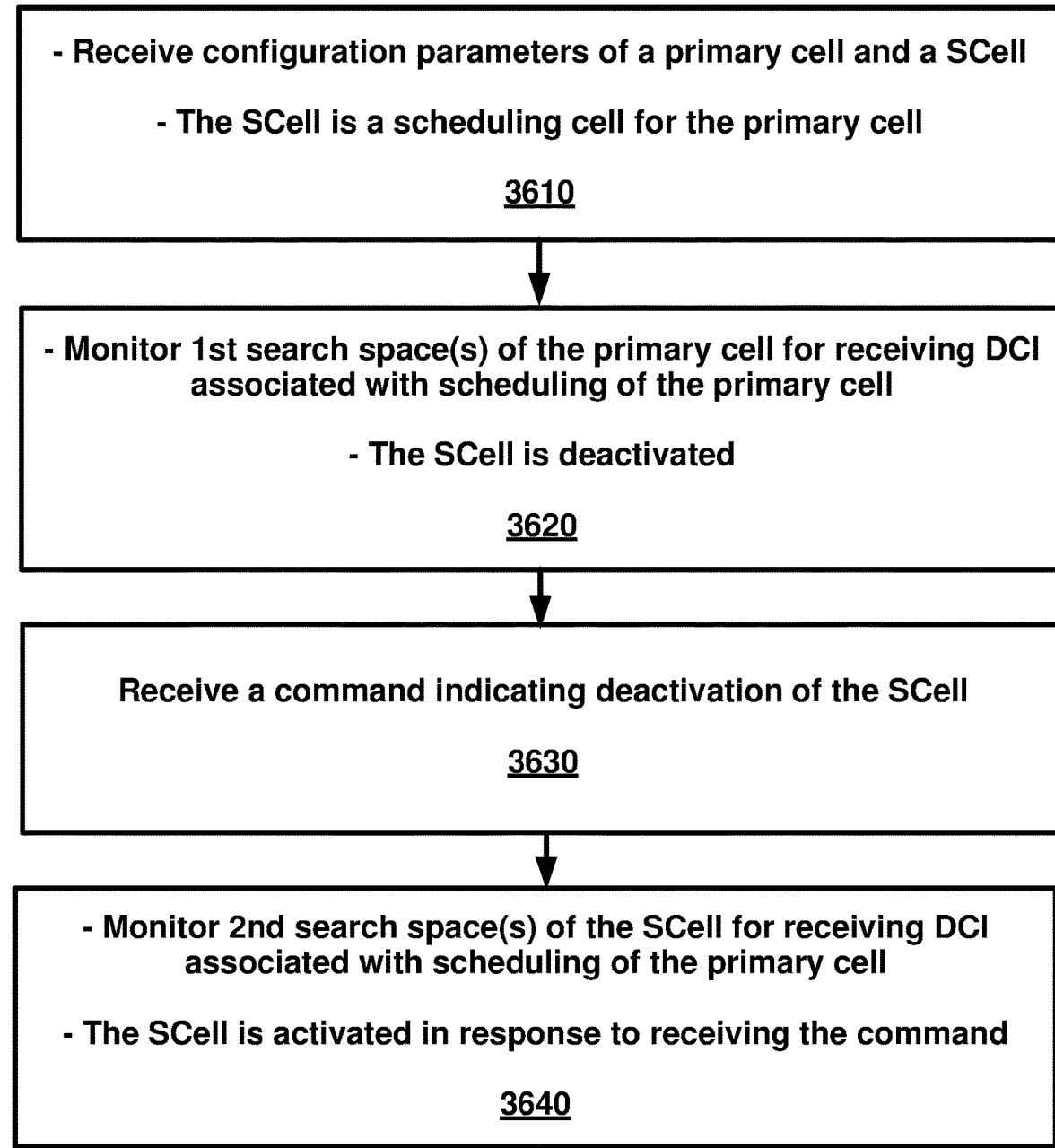
FIG. 36 shows an example flow diagram in accordance with several of various embodiments of the present disclosure.

FIG. 36 shows an example flow diagram in accordance with several of various embodiments of the present disclosure. At 3610, a wireless device may receive configuration parameters of a primary cell and a secondary cell, wherein the secondary cell may be a scheduling cell for the primary cell. At 3620, the wireless device may monitor one or more first search spaces of the primary cell for receiving downlink control information associated with scheduling of the primary cell, wherein the secondary cell is deactivated. At 3630, the wireless device may receive a command indicating activation of the secondary cell. At 3640, the wireless device may monitor one or more second search spaces of the secondary cell for receiving downlink control information associated with scheduling of the primary cell, wherein the secondary cell may be activated in response to receiving the command.

In an example embodiment, the configuration parameters, received at 3610, may comprise a first parameter indicating that the secondary cell is the scheduling cell for the primary cell.

In an example embodiment, the command, received at 3630, may be based on an activation deactivation medium access control (MAC) control element (CE) comprising a field associated with the secondary cell. A value of the field may indicate activation of the secondary cell.

In an example embodiment, the one or more first search spaces, monitored at 3620, and the one or more second search spaces, monitored at 3640, may be wireless device specific search spaces.

In an example embodiment, the primary cell may be based on a dynamic spectrum sharing (DSS) carrier. In an example embodiment, the DSS carrier may be shared between a first radio access technology and a second radio access technology.

In an example embodiment, the monitoring the one or more first search spaces of the primary cell, at 3620, for receiving downlink control information associated with scheduling of the primary cell, may be based on the secondary cell being deactivated.

In an example embodiment, the monitoring the one or more second search spaces of the secondary cell, at 3640, for receiving downlink control information associated with scheduling of the primary cell, may be based on the secondary cell being activated.

In an example embodiment, the configuration parameters, received at 3610, may comprise first configuration parameters of the one or more first search spaces, of the primary cell, and the one or more second search spaces of the secondary cell.

In an example embodiment, the wireless device may receive, based on the monitoring the one or more first search spaces of the primary cell, at 3620, a first downlink control information comprising first scheduling information of a first transport block. The wireless device may receive or may transmit the first transport block via the primary cell based on the first scheduling information. The wireless device may receive, based on the monitoring the one or more second search spaces of the secondary cell, at 3640, a second downlink control information comprising second scheduling information of a second transport block. The wireless device may receive or may transmit the second transport block via the primary cell based on the second scheduling information.

Figure 37:
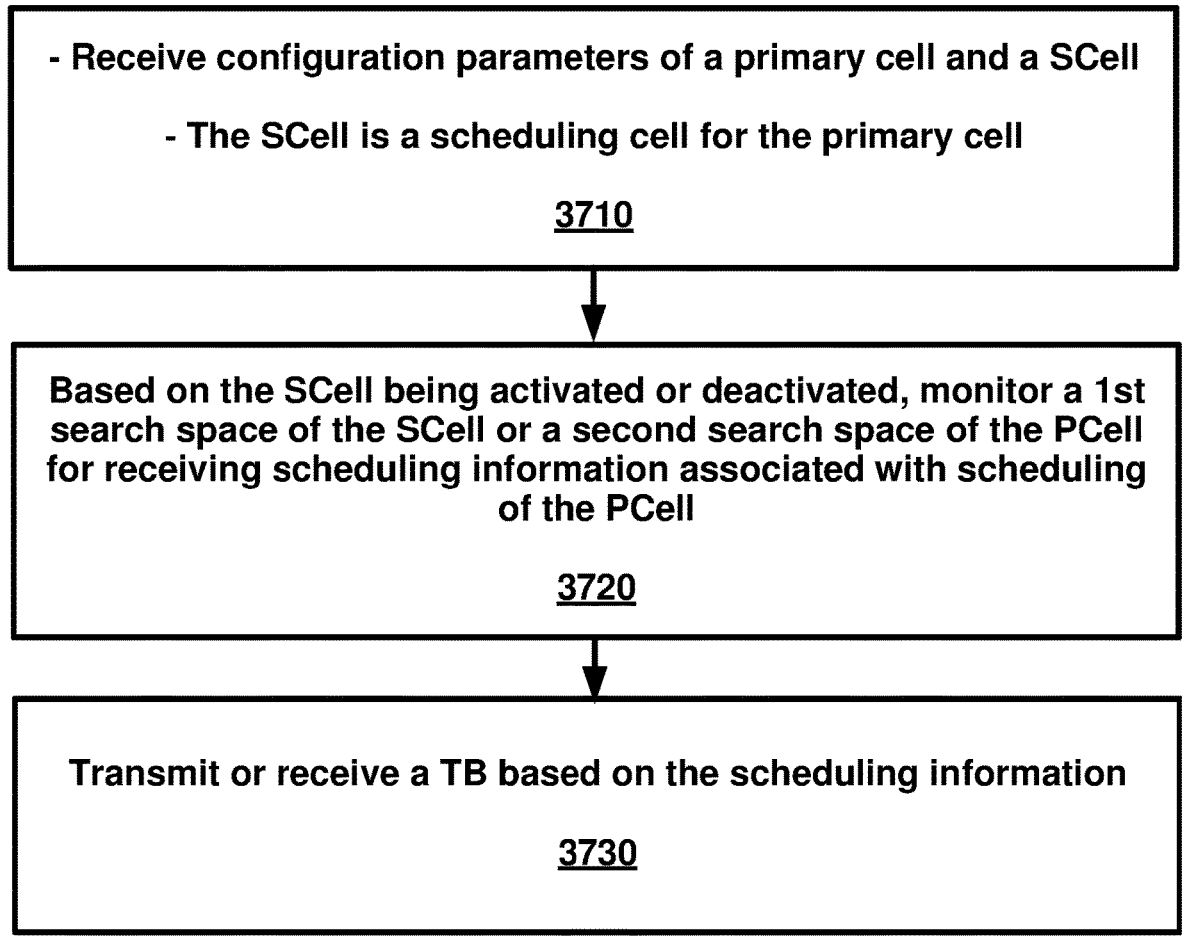
FIG. 37 shows an example flow diagram in accordance with several of various embodiments of the present disclosure.

FIG. 37 shows an example flow diagram in accordance with several of various embodiments of the present disclosure. At 3710, a wireless device may receive configuration parameters of a primary cell and a secondary cell, wherein the secondary cell may be a scheduling cell for the primary cell. At 3720, based on the secondary cell being activated or deactivated, the wireless device may monitor a first search space of the secondary cell or a second search space of the primary cell for receiving scheduling information associated with scheduling of the primary cell. At 3730, the wireless device may transmit or receive a transport block, via the primary cell, based on the scheduling information.

In an example embodiment, based on the secondary cell being activated, the wireless device may monitor, at 3720, the first search space of the secondary cell for receiving scheduling information associated with scheduling of the primary cell.

In an example embodiment, based on the secondary cell being deactivated, the wireless device may monitor, at 3720, the second search space of the primary cell for receiving scheduling information associated with scheduling of the primary cell.

Figure 38:
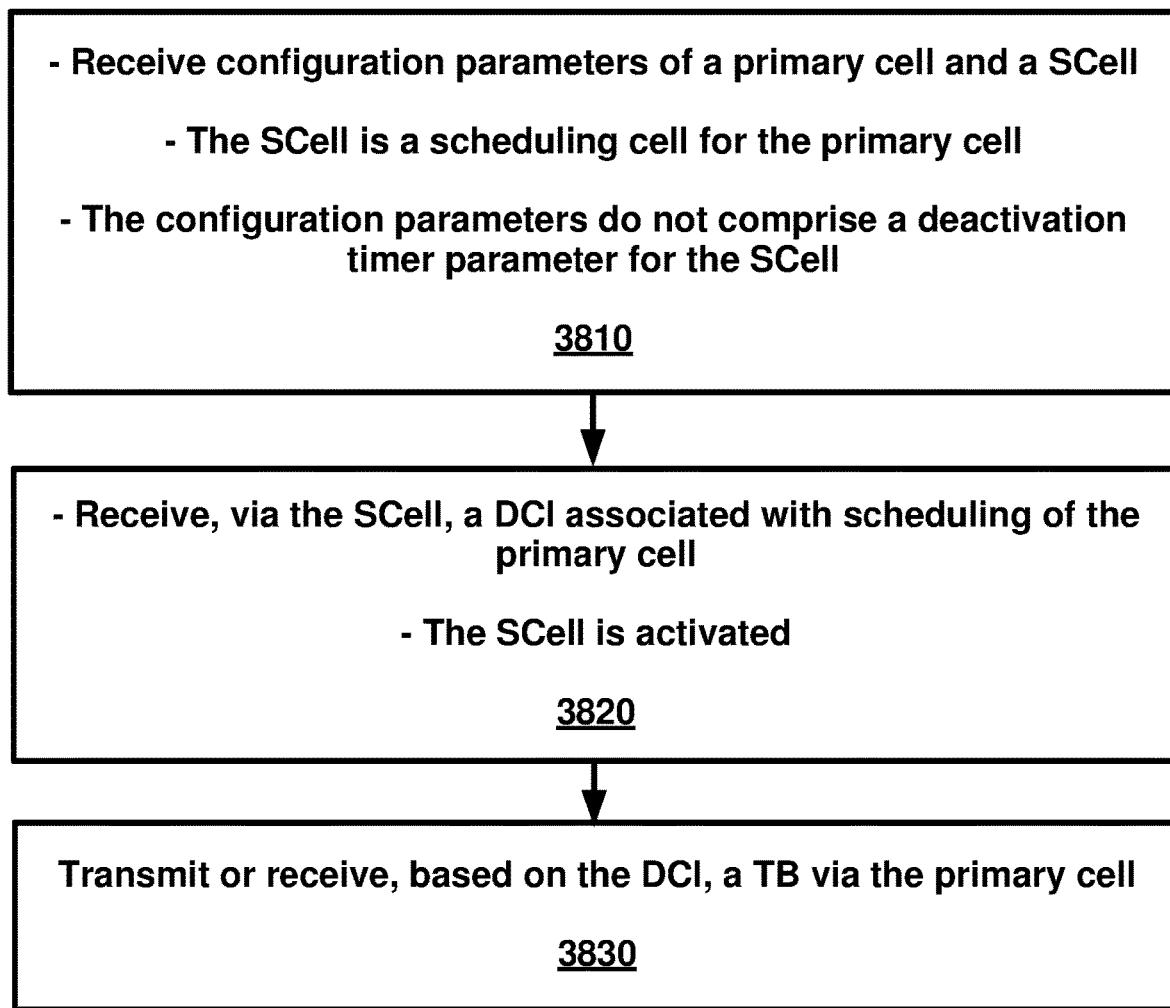
FIG. 38 shows an example flow diagram in accordance with several of various embodiments of the present disclosure.

FIG. 38 shows an example flow diagram in accordance with several of various embodiments of the present disclosure. At 3810, a wireless device may receive configuration parameters of a primary cell and a secondary cell. The secondary cell may be a scheduling cell for the primary cell. The configuration parameters may not comprise a deactivation timer parameter for the secondary cell. At 3820, the wireless device may receive, via the secondary cell, a downlink control information (DCI) associated with scheduling of the primary cell, wherein the secondary cell may be activated. At 3830, the wireless device may receive or may transmit, based on the DCI, a transport block via the primary cell.

In an example embodiment, the wireless device may apply infinity for a deactivation timer of the secondary cell.

In an example embodiment, the configuration parameters, received at 3810, may comprise a first parameter indicating that the secondary cell is the scheduling cell for the primary cell.

In an example embodiment, the configuration parameters, received at 3810, may comprise first configuration parameters of one or more search spaces of the secondary cell. The one or more search spaces may be associated with scheduling of the primary cell. Receiving the DCI, at 3820, may be based on monitoring the one or more search spaces.

In an example embodiment, the configuration parameters, received at 3810, may not comprise a deactivation timer parameter for the secondary cell based on the secondary cell being a scheduling cell for the primary cell.

In an example embodiment, the wireless device may receive an activation deactivation medium access control (MAC) control element (CE) indicating activation of the secondary cell.

FIG. 39 shows an example flow diagram in accordance with several of various embodiments of the present disclosure. At 3910, a wireless device may receive configuration parameters of a primary cell, a first secondary cell and a second secondary cell. The first secondary cell may be not a scheduling cell for the primary cell. The second secondary cell may be a scheduling cell for the primary cell. The configuration parameters may comprise a deactivation timer parameter indicating a value of a first deactivation timer of the first secondary cell. The configuration parameters may not comprise a deactivation timer parameter for the second secondary cell. At 3920, the wireless device may receive, via the second secondary cell, a downlink control information (DCI) associated with scheduling of the primary cell, wherein the second secondary cell may be activated. At 3930, the wireless device may receive or may transmit, based on the DCI, a transport block via the primary cell.

In an example embodiment, the wireless device may apply infinity for a second deactivation timer of the second secondary cell.

In an example embodiment, the configuration parameters, received at 3910, may comprise a first parameter indicating that the second secondary cell is the scheduling cell for the primary cell.

In an example embodiment, the configuration parameters, received 3910, may comprise first configuration parameters of one or more search spaces of the second secondary cell. The one or more search spaces may be associated with scheduling of the primary cell. Receiving the DCI, at 3920, may be based on monitoring the one or more search spaces.

In an example embodiment, the configuration parameters, received at 3910, may not comprise a deactivation timer parameter for the second secondary cell based on the second secondary cell being a scheduling cell for the primary cell.

In an example embodiment, the wireless device may receive an activation deactivation medium access control (MAC) control element (CE) indicating activation of the second secondary cell.

In an example embodiment, the wireless device may deactivate the first secondary cell based on the first deactivation timer expiring.

FIG. 40 shows an example flow diagram in accordance with several of various embodiments of the present disclosure. At 4010, a wireless device may receive configuration parameters of a primary cell and a secondary cell. The configuration parameters may comprise first configuration parameters of one or more search spaces, of the secondary cell, associated with scheduling of the primary cell. The configuration parameters may not comprise a deactivation timer parameter for the secondary cell. At 4020, the wireless device may receive, via the secondary cell, a downlink control information (DCI) associated with scheduling of the primary cell, wherein the secondary cell may be activated. At 4030, the wireless device may receive or may transmit, based on the DCI, a transport block via the primary cell.

In an example embodiment, the wireless device may apply infinity for a deactivation timer of the secondary cell.

In an example embodiment, receiving the DCI, at 4020, may be based on monitoring the one or more search spaces.

In an example embodiment, the configuration parameters, received at 4010, may not comprise a deactivation timer parameter for the secondary cell based on the one or more search spaces, associated with scheduling cell of the primary cell, being configured for the secondary cell.

In an example embodiment, the wireless device may receive an activation deactivation medium access control (MAC) control element (CE) indicating activation of the secondary cell.

FIG. 41 shows an example flow diagram in accordance with several of various embodiments of the present disclosure. At 4110, a wireless device may receive configuration parameters of a primary cell, a first secondary cell and a second secondary cell. The configuration parameters may comprise first configuration parameters of one or more search spaces, of the second secondary cell, associated with scheduling of the primary cell. The configuration parameters may not comprise parameters of a search space, of the first secondary cell, associated with scheduling of the primary cell. The configuration parameters may comprise a deactivation timer parameter indicating a value of a first deactivation timer of the first secondary cell. The configuration parameters may not comprise a deactivation timer parameter for the second secondary cell. At 4120, the wireless device may receive, via the second secondary cell, a downlink control information (DCI) associated with scheduling of the primary cell, wherein the second secondary cell may be activated. At 4130, the wireless device may receive or may transmit, based on the DCI, a transport block via the primary cell.

In an example embodiment, the wireless device may apply infinity for a second deactivation timer of the second secondary cell.

In an example embodiment, receiving the DCI, at 4120, may be based on monitoring the one or more search spaces.

In an example embodiment, the configuration parameters, received at 4110, may not comprise a deactivation timer parameter for the second secondary cell based on the one or more search spaces, associated with scheduling cell of the primary cell, being configured for the second secondary cell.

In an example embodiment, the wireless device may receive an activation deactivation medium access control (MAC) control element (CE) indicating activation of the second secondary cell.

In an example embodiment, the wireless device may deactivate the first secondary cell based on the first deactivation timer expiring.

FIG. 42 shows an example flow diagram in accordance with several of various embodiments of the present disclosure. At 4210, a wireless device may receive configuration parameters of a primary cell and a secondary cell. The secondary cell may be a scheduling cell for the primary cell. Based on the secondary cell being a scheduling cell for the primary cell, the configuration parameters may comprise first configuration parameters of one or more search spaces, of a first type, for the secondary cell. At 4220, the wireless device may receive a downlink control information (DCI) based on monitoring the one or more search spaces of the first type.

In an example embodiment, the configuration parameters, received at 4210, may comprise a second parameter indicating that the secondary cell is a scheduling cell for the primary cell.

In an example embodiment, the first type of the one or more search spaces may be associated with scheduling of the primary cell.

In an example embodiment, the first type of the one or more search spaces may be common search space.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
receiving, by a wireless device, configuration parameters of one or more first search spaces of a primary cell and one or more second search spaces of a secondary cell, wherein the secondary cell is a scheduling cell for the primary cell;
receiving scheduling information associated with scheduling of the primary cell, wherein:
in response to the secondary cell being deactivated, the receiving the scheduling information comprises monitoring the one or more first search spaces; and
in response to the secondary cell being activated, the receiving the scheduling information comprises monitoring the one or more second search spaces;
transmitting or receiving a transport block, via the primary cell, based on the scheduling information.

2. The method of claim 1, wherein one or more first configuration parameters, received by the wireless device, indicate that the secondary cell is the scheduling cell for the primary cell.

3. The method of claim 1, wherein the one or more first search spaces and the one or more second search spaces are wireless device specific search spaces.

4. The method of claim 1, wherein the primary cell is based on a dynamic spectrum sharing (DSS) carrier.

5. The method of claim 4, wherein the DSS carrier is shared between a first radio access technology and a second radio access technology.

6. The method of claim 1, wherein the receiving the scheduling information is based on a downlink control information comprising a field with a value indicating that the downlink control information is for scheduling of the primary cell via the secondary cell.

7. The method of claim 6, further comprising receiving a first configuration parameter indicating the value.

8. A wireless device comprising:
one or more processors; and
memory storing instructions that, when executed by the one or more processors, cause the wireless device to:
receive configuration parameters of one or more first search spaces of a primary cell and one or more second search spaces of a secondary cell, wherein the secondary cell is a scheduling cell for the primary cell;
receive scheduling information associated with scheduling of the primary cell, wherein:
in response to the secondary cell being deactivated, receiving the scheduling information comprises monitoring the one or more first search spaces; and
in response to the secondary cell being activated, receiving the scheduling information comprises monitoring the one or more second search spaces;
transmit or receive a transport block, via the primary cell, based on the scheduling information.

9. The wireless device of claim 8, wherein one or more first configuration parameters, received by the wireless device, indicate that the secondary cell is the scheduling cell for the primary cell.

10. The wireless device of claim 8, wherein the one or more first search spaces and the one or more second search spaces are wireless device specific search spaces.

11. The wireless device of claim 8, wherein the primary cell is based on a dynamic spectrum sharing (DSS) carrier.

12. The wireless device of claim 11, wherein the DSS carrier is shared between a first radio access technology and a second radio access technology.

13. The wireless device of claim 8, wherein receiving the scheduling information is based on a downlink control information comprising a field with a value indicating that the downlink control information is for scheduling of the primary cell via the secondary cell.

14. The wireless device of claim 13, wherein the instructions, when executed by the one or more processors, further cause the wireless device to receive a first configuration parameter indicating the value.

15. A system comprising:
a base station comprising: one or more first processors; and first memory storing instructions that, when executed by the one or more first processors, cause the base station to: transmit configuration parameters of one or more first search spaces of a primary cell and one or more second search spaces of a secondary cell, wherein the secondary cell is a scheduling cell for the primary cell; and transmit scheduling information associated with scheduling of the primary cell; and
a wireless device comprising: one or more second processors; and second memory storing instructions that, when executed by the one or more second processors, cause the wireless device to: receive the configuration parameters; receive the scheduling information, wherein: in response to the secondary cell being deactivated, receiving the scheduling information comprises monitoring the one or more first search spaces; and in response to the secondary cell being activated, receiving the scheduling information comprises monitoring the one or more second search spaces; and transmit or receive a transport block, via the primary cell, based on the scheduling information.

16. The system of claim 15, wherein one or more first configuration parameters, received by the wireless device, indicate that the secondary cell is the scheduling cell for the primary cell.

17. The system of claim 15, wherein the one or more first search spaces and the one or more second search spaces are wireless device specific search spaces.

18. The system of claim 15, wherein the primary cell is based on a dynamic spectrum sharing (DSS) carrier.

19. The system of claim 15, wherein receiving the scheduling information is based on a downlink control information comprising a field with a value indicating that the downlink control information is for scheduling of the primary cell via the secondary cell.

20. The system of claim 19, wherein the instructions, when executed by the one or more second processors, further cause the wireless device to receive a first configuration parameter indicating the value.

* * * * *